INVENTORS J. K. MIDDAUGH
W. R. YOUNG, JR.
BY Harold C. Herman
ATTORNEY

INVENTORS J. K. MIDDAUGH
W. R. YOUNG, JR.
BY Harold C. Herman
ATTORNEY

INVENTORS J. K. MIDDAUGH
W. R. YOUNG, JR.
BY Harold C. Herman
ATTORNEY

AUTOMATIC DATA READER

INVENTORS J. K. MIDDAUGH
W. R. YOUNG, JR.
BY Harold C. Herman
ATTORNEY

March 8, 1960 J. K. MIDDAUGH ET AL 2,927,730

AUTOMATIC DATA READER

Filed Oct. 31, 1956 42 Sheets-Sheet 5

INVENTORS J. K. MIDDAUGH
W. R. YOUNG, JR.
BY Harold C Herman
ATTORNEY

INVENTORS J. K. MIDDAUGH
W. R. YOUNG, JR.
BY
Harold C. Herman
ATTORNEY

INVENTORS J. K. MIDDAUGH
W. R. YOUNG, JR.
BY Harold C Herman
ATTORNEY

INVENTORS J. K. MIDDAUGH
W. R. YOUNG, JR.
BY Harold C. Herman
ATTORNEY

INVENTORS J. K. MIDDAUGH
W. R. YOUNG, JR.
BY Harold C. Herman
ATTORNEY

INVENTORS J. K. MIDDAUGH
W. R. YOUNG, JR.
BY Harold C. Herman
ATTORNEY

INVENTORS J. K. MIDDAUGH
W. R. YOUNG, JR.
BY Harold C Herman
ATTORNEY

March 8, 1960 J. K. MIDDAUGH ET AL 2,927,730

AUTOMATIC DATA READER

Filed Oct. 31, 1956 42 Sheets-Sheet 12

INVENTORS
J. K. MIDDAUGH
W. R. YOUNG, JR.
BY
Harold C. Herman
ATTORNEY

INVENTORS J. K. MIDDAUGH
W. R. YOUNG, JR.
BY Harold C Herman
ATTORNEY

AUTOMATIC DATA READER

INVENTORS J. K. MIDDAUGH
W. R. YOUNG, JR.
BY Harold C. Herman
ATTORNEY

AUTOMATIC DATA READER

Filed Oct. 31, 1956 42 Sheets-Sheet 15

INVENTORS J. K. MIDDAUGH
W. R. YOUNG, JR.
BY Harold C. Herman
ATTORNEY

March 8, 1960 J. K. MIDDAUGH ET AL 2,927,730

AUTOMATIC DATA READER

Filed Oct. 31, 1956 42 Sheets-Sheet 16

INVENTORS J. K. MIDDAUGH
W. R. YOUNG, JR.
BY Harold C. Herman
ATTORNEY

March 8, 1960 J. K. MIDDAUGH ET AL 2,927,730

AUTOMATIC DATA READER

Filed Oct. 31, 1956 42 Sheets-Sheet 17

INVENTORS J. K. MIDDAUGH
W. R. YOUNG, JR.
BY Harold C. Herman
ATTORNEY

INVENTORS J. K. MIDDAUGH
W. R. YOUNG, JR.
BY Harold C. Herman
ATTORNEY

INVENTORS J. K. MIDDAUGH
W. R. YOUNG, JR.
BY Harold C. Herman
ATTORNEY

INVENTORS J. K. MIDDAUGH
W. R. YOUNG, JR.
BY Harold C. Herman
ATTORNEY

AUTOMATIC DATA READER

INVENTORS J. K. MIDDAUGH W. R. YOUNG, JR.
BY Harold C. Herman
ATTORNEY

AUTOMATIC DATA READER

Filed Oct. 31, 1956 42 Sheets-Sheet 22

INVENTORS J. K. MIDDAUGH
W. R. YOUNG, JR.
BY Harold C. Herman
ATTORNEY

INVENTORS J. K. MIDDAUGH
W. R. YOUNG, JR.
BY Harold C. Herman
ATTORNEY

March 8, 1960 J. K. MIDDAUGH ET AL 2,927,730

AUTOMATIC DATA READER

Filed Oct. 31, 1956 42 Sheets-Sheet 24

INVENTORS J. K. MIDDAUGH
W. R. YOUNG, JR.
BY Harold C. Hewman
ATTORNEY

INVENTORS J. K. MIDDAUGH
W. R. YOUNG, JR.
BY Harold C. Herman
ATTORNEY

INVENTORS J. K. MIDDAUGH
W. R. YOUNG, JR.
BY Harold C. Herman
ATTORNEY

INVENTORS J. K. MIDDAUGH
W. R. YOUNG, JR.
BY Harold C. Herman
ATTORNEY

March 8, 1960 J. K. MIDDAUGH ET AL 2,927,730

AUTOMATIC DATA READER

Filed Oct. 31, 1956 42 Sheets-Sheet 28

INVENTORS J. K. MIDDAUGH
W. R. YOUNG, JR.
BY Harold C. Herman
ATTORNEY

INVENTORS J. K. MIDDAUGH
W. R. YOUNG, JR.
BY Harold C. Herman
ATTORNEY

INVENTORS J. K. MIDDAUGH
W. R. YOUNG JR.
BY Harold C. Herman
ATTORNEY

March 8, 1960 J. K. MIDDAUGH ET AL 2,927,730

AUTOMATIC DATA READER

Filed Oct. 31, 1956 42 Sheets-Sheet 31

INVENTORS J. K. MIDDAUGH
W. R. YOUNG, JR.
BY Harold C. Herman
ATTORNEY

INVENTORS J. K. MIDDAUGH
W. R. YOUNG, JR.
BY Harold C. Herman
ATTORNEY

INVENTORS J. K. MIDDAUGH
W. R. YOUNG, JR.
BY Harold C. Herman
ATTORNEY

INVENTORS J. K. MIDDAUGH
W. R. YOUNG, JR.
BY Harold C. Herman
ATTORNEY

INVENTORS J. K. MIDDAUGH
W. R. YOUNG, JR.
BY Harold C. Herman
ATTORNEY

INVENTORS J. K. MIDDAUGH
W. R. YOUNG JR.
BY Harold C. Herman
ATTORNEY

INVENTORS J. K. MIDDAUGH
W. R. YOUNG, JR.
BY Harold C. Herman
ATTORNEY

INVENTORS J. K. MIDDAUGH
W. R. YOUNG, JR.
BY Harold C. Herman
ATTORNEY

FIG. 39

| INDIVIDUAL LINE SUMMARIES | | | | | | | | | | | | | |
|---|---|---|---|---|---|---|---|---|---|---|---|---|---|
| TEST DAY | PERIOD BEGIN | LINE 11 | | LINE 27 | | LINE 32 | | LINE 4 | | LINE 6 | | TOTALS | |
| | | CCS | CA | CCS | CA | CCS | CA | CCS | CA | CCS | CA | CCS | CA |
| 22 | 9:00 AM | 1.5 | 1 | 2.0 | 2 | 2.5 | 2 | 0.0 | 0 | 1.3 | 1 | 7.3 | 6 |
| 22 | 10:00 AM | 1.7 | 1 | 1.5 | 1 | 2.2 | 2 | 1.3 | 1 | 0.0 | 0 | 6.7 | 5 |

FIG. 40

GROUP SUMMARIES

TABLE A

| TEST DAY | PERIOD BEGIN | CCS OF GROUP TRAFFIC | | | | SAMPLES X I DXTBN | | | |
|---|---|---|---|---|---|---|---|---|---|
| | | MN | MM | SM | SS | 3 | 4 | 5 | 6 |
| 22 | 9:00 AM | 18 | 3 | 5 | 0 | 10 | 8 | 3 | 1 |
| 22 | 10:00 AM | 14 | 5 | 2 | 2 | 16 | 7 | 2 | 0 |

TABLE B

| TEST DAY | PERIOD BEGIN | CCS OF GROUP TRAFFIC | | | | SIM BSY SPAN DXTBN | | | |
|---|---|---|---|---|---|---|---|---|---|
| | | INTRA | REV | NON CL | TOTAL | 3 | 4 | 5 | 6 |
| 22 | 9:00 AM | 0.0 | 2.7 | 30.3 | 33.0 | 28 | 14 | 3 | 0 |
| 22 | 10:00 AM | 3.2 | 2.2 | 34.1 | 39.5 | 32 | 15 | 7 | 1 |

TABLE C

| TEST DAY | PERIOD BEGIN | CCS OF GROUP TRAFFIC | | | | SIM BSY X I DXTBN | | | |
|---|---|---|---|---|---|---|---|---|---|
| | | INTRA | REV. | NON CL | TOTAL | 3 | 4 | 5 | 6 |
| 22 | 9:00 AM | 0.0 | 2.7 | 30.3 | 33.0 | 14 | 5 | 3 | 0 |
| 22 | 10:00 AM | 3.2 | 2.2 | 34.1 | 39.5 | 18 | 5 | 3 | 1 |

INVENTORS J. K. MIDDAUGH
W. R. YOUNG, JR.
BY Harold C Herman
ATTORNEY

INVENTORS J. K. MIDDAUGH
W. R. YOUNG, JR.
BY Harold C Herman
ATTORNEY

March 8, 1960 J. K. MIDDAUGH ET AL 2,927,730

AUTOMATIC DATA READER

Filed Oct. 31, 1956 42 Sheets-Sheet 41

INVENTORS J. K. MIDDAUGH
W. R. YOUNG, JR.
BY Harold C. Herman
ATTORNEY

FIG. 45

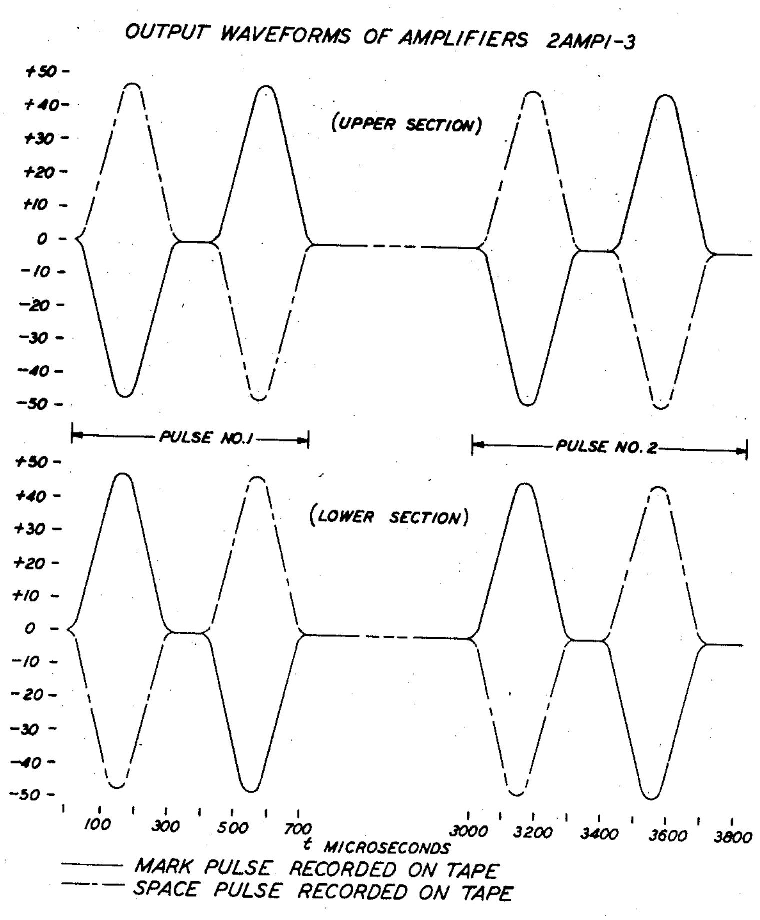

FIG. 44

| TRAFFIC CONDITION, ETC. | RECORDING CODE | | |
|---|---|---|---|
| | TRACK 1 | TRACK 2 | TRACK 3 |
| NOT BUSY | + | 0 | 0 |
| NON-CLASSIFIED BUSY | + | + | 0 |
| INTRA-GROUP BUSY | + | + | + |
| REVERTIVE CALL | + | 0 | + |
| CLASSIFIED BUSY A | + | − | 0 |
| CLASSIFIED BUSY B | + | − | − |
| CLASSIFIED BUSY C | + | 0 | − |
| INCOMPLETE SCAN | + | + | − |
| DIAL TONE TIMING | 0 | + | 0 |
| END OF REQUEST (MATCH) | 0 | − | + |
| END OF REQUEST (SERVE) | 0 | + | + |
| END OF REQUEST (ABANDON) | 0 | + | − |
| END OF REQUEST (ALL TRUNKS BUSY) | 0 | − | − |
| RECORDING SESSION BEGINNING | − | 0 | 0 |

+ = POSITIVE
− = NEGATIVE
0 = NEUTRAL

INVENTORS J. K. MIDDAUGH
W. R. YOUNG, JR.
BY Harold C. Herman
ATTORNEY

United States Patent Office 2,927,730

Patented Mar. 8, 1960

2,927,730

AUTOMATIC DATA READER

Jack K. Middaugh, Metuchen, and William R. Young, Jr., Summit, N.J., assignors to Bell Telephone Laboratories, Incorporated, New York, N.Y., a corporation of New York Application October 31, 1956, Serial No. 619,421

25 Claims. (Cl. 235—61.9)

This invention relates to data processing equipment and more particularly to data processing equipment which analyzes magnetically recorded data and provides a typewritten record in accordance with the analysis.

In automatic telephone switching systems it is desirable to determine the traffic conditions of the various lines, trunks and circuits in the system in order to provide optimum service consistent with economy of operation. The traffic information is utilized to determine how many trunks, circuits, switching devices, etc. are needed to handle a given volume of traffic without decreasing the quality of telephone service. The traffic conditions of the lines, trunks, etc. may be determined by periodically sampling the electrical condition of each line, trunk, etc. Equipment for periodically sampling and recording traffic conditions is disclosed in the patent application Serial No. 455,154, filed on September 10, 1954, by W. R. Young, Jr., and also in the patent application Serial No. 619,424 filed on even date herewith by J. K. Middaugh. The traffic sampling and recording equipment periodically records on a magnetic tape a group of coded signals which represents the traffic condition of a group of lines, trunks, etc. The lines, trunks and circuits are identified in the recording on a time division basis and the traffic conditions in the recording are determined by the coding of the recorded signals. In order to utilize the recorded information it must be coded and analyzed with the information relating to specific lines, trunks and circuits and to particular traffic conditions sorted and accumulated.

It is a general object of this invention to provide a data reader which automatically decodes, accumulates and analyzes magnetically recorded coded signals.

Another object of this invention is to analyze groups of coded signals by simultaneously sorting them on a time basis and on a coded basis.

In an illustrative embodiment of this invention the foregoing objects are accomplished by an automatic data reader which reads the magnetically recorded information and which processes it in accordance with the settings of a number of manual switches. The manual switches are part of a data analysis and control circuit which determines the type of data analysis to be performed. Under control of the manual switches in the data analysis and control circuit, the analysis of the recorded sginals may be on an individual line basis or on a group basis. For the individual line analysis, specific coded signals for selected lines, trunks and circuits are accumulated, and for the group analysis specific coded signals for the entire groups of lines, trunks and circuits are accumulated.

A feature of this invention relates to the provision of an automatic data reader which can analyze groups of coded signals on an individual and on a group basis.

When the group basis analysis is selected, the specific coded signals for the entire group of lines, trunks and circuits may be accumulated in three different ways:

(*a*) The coded signals may be accumulated to determine the distribution of dial-tone delays;

(*b*) The coded signals may be accumulated to determine the distribution of consecutive groups of coded signals in which a given number of lines, trunks, etc. are simultaneously busy; and (*c*) The coded signals may be accumulated to determine the distribution of simultaneously busy lines, trunks, etc. in the groups of coded signals.

Features of this invention pertain to means for determining the distribution of dial-tone delays, to means for determining the distributions of consecutive groups of coded signals in which a predetermined number of lines are simultaneously busy, and to means for determining the distribution of simultaneous busy lines for the groups of coded signals.

The coded signals may be accumulated and analyzed in a total of four different ways: by individual line analysis and by the three types of group analyses. In each of the four types of coded signal analyses, the coded signals are also sorted on a time division basis to identify the specific lines, trunks, etc.

Another feature of this invention relates to means for sorting the coded signals on a time division basis and on an individual or group basis while recognizing only predetermined coded signals.

Still another feature of this invention pertains to means for accumulating predetermined coded signals which are simultaneously sorted on an individual basis or on one of a number of group bases and also on a time basis.

The data analysis and control circuit determines which type of analysis is to be performed and a patch circuit determines which coded signals are to be considered in the analysis. For example, the patch circuit may be preset to consider only coded signals which indicate that a particular line was busy for an intragroup call to another line in the same group of lines. The patch circuit is highly flexible so that different coded signals may be accumulated for different lines, trunks, etc. in the group.

The signals are recorded by the traffic sampling and recording equipment disclosed in the above-identified disclosures by W. R. Young, Jr., and J. K. Middaugh on a three-track magnetic tape, with the coded signals corresponding to one of the lines, trunks, etc. including a positive, a negative or a neutral signal on each of the three tracks. In the automatic data reader, the coded signals on the three tracks of the magnetic tape are read and supplied to a signal translator. The signal translator decodes the signals and drives a time and scan program circuit and also the data analysis and control circuit by providing one pulse for each line, trunk, etc. in the group thereto. The time and scan program circuit is preset to determine the duration of the data accumulation period, and the data analysis control circuit provides for the recognition only of signals corresponding to preselected lines, trunks, etc. When the analysis is on a group basis, the data analysis and control circuit may be preset to inhibit the recognition of signals from one or more lines, trunks, etc.

A further feature of this invention pertains to means for inhibiting the recognition of coded signals occurring in predetermined time slots where each time slot corresponds to one of the lines, trunks, etc. The time slots correspond to the lines, trunks, etc. because the lines, trunks, etc. are identified on a time division basis.

The signal translator decodes the coded signals and provides an indication thereof to the patch circuit. The patch circuit recognizes only predetermined ones of the signals in accordance with its presetting and provides an indication thereof to the data analysis and control circuit. In the data analysis and control circuit, when there is a coincidence between line selection and coded signal selection, a count pulse is provided to a register circuit.

Still another feature of this invention relates to means for recognizing only the first of a number of count pulses in a series of count pulses where each count pulse corresponds to a particular line and the series of count pulses are provided by reading successive groups of the coded signals. By providing only one pulse for each series of pulses, the number of calls made to and from a subscriber line may be computed.

Still a further feature of this invention pertains to means for calculating the total busy duration of a particular line, trunk, etc. by multiplying the number of count pulses corresponding thereto by a duration factor. The duration factor is determined by the interval between samplings of the line or between recording groups of coded signals by the traffic sampling and recording equipment.

The accumulated data in the register at the end of each accumulation period is supplied to a print program circuit under control of the time and scan program circuit. The output of the register is a step analog potential which is translated by the print program circuit to a binary coded teletypewriter signal. The coded teletypewriter signal is provided from the print program circuit to a teletypewriter which translates the coded signals to a typewritten output.

A further feature of this invention relates to the provision of an automatic data reader which analyzes traffic information recorded on a magnetic tape and which provides the results of its analysis in readily usable printed tabulated form.

Further objects, features and advantages will become apparent upon consideration of the following description and drawings wherein:

Fig. 1 is a functional representation of the automatic data reader of this invention;

Figs. 2–37, when arranged in accordance with Fig. 38, are a detailed circuit arrangement of the automatic data reader of this invention wherein:

Fig. 39 is a sample of the output of the automatic data reader for individual line analysis;

Fig. 40 is a sample of the outputs of the automatic data reader for group analysis;

Fig. 44 is a table of the recorded signals on the magnetic tape utilized in the reader circuit of the automatic data reader; and Fig. 45 illustrates the waveforms of the coded signals at the output of the preamplifier of the automatic data reader.

GENERAL DESCRIPTION

Figure 1:
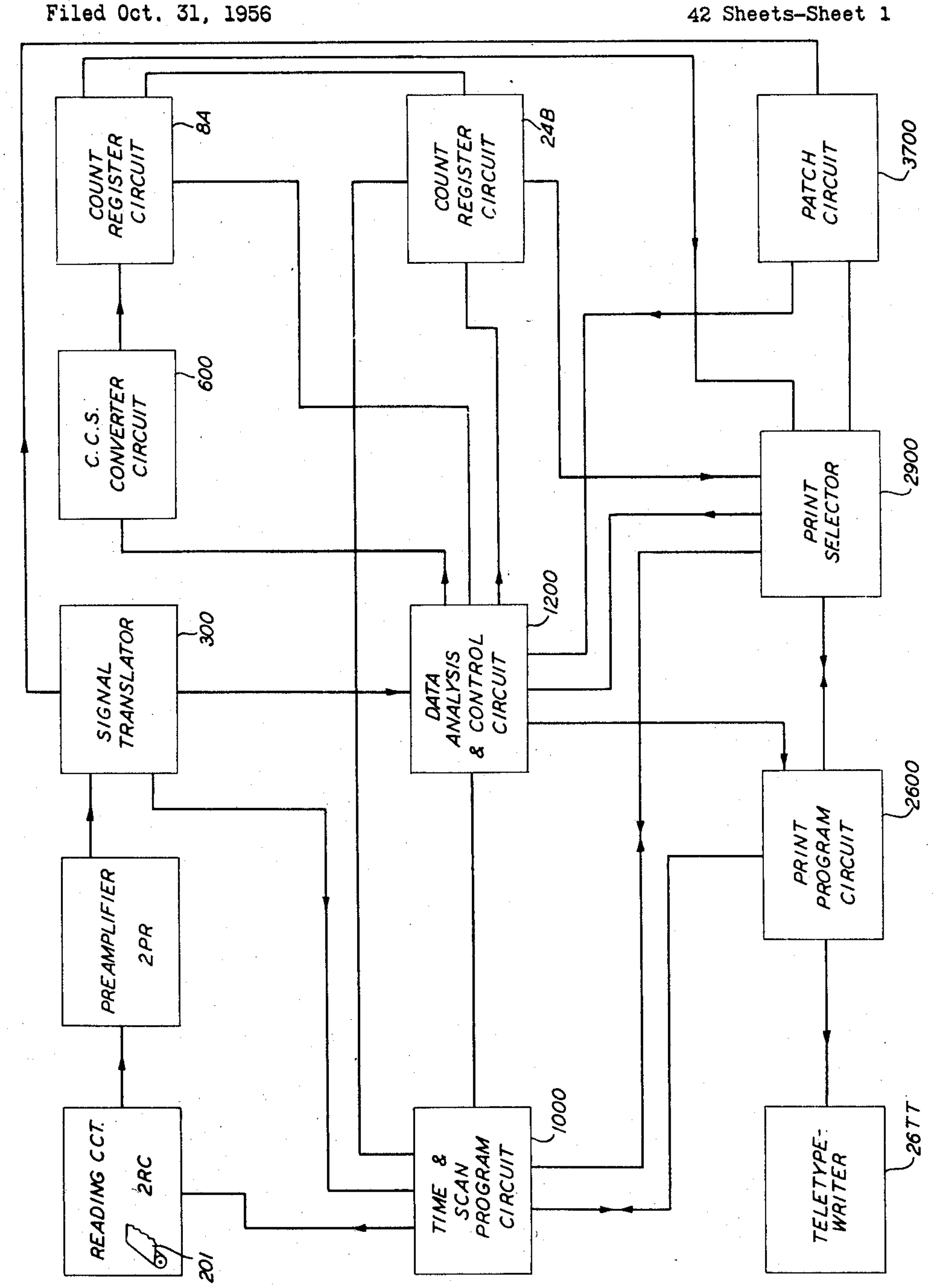
Figure 2:
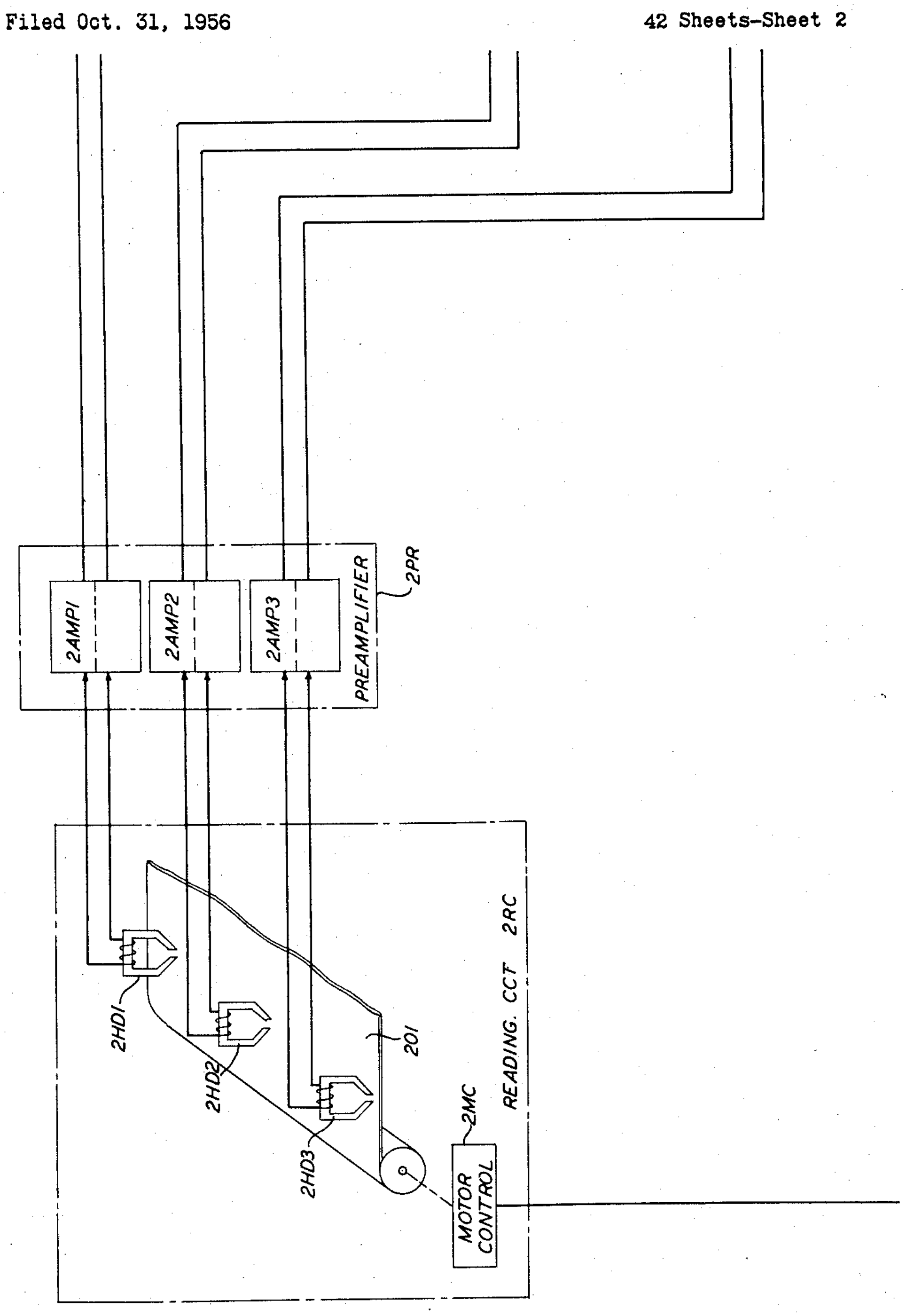
Fig. 2 illustrates the reading circuit and preamplifier of the automatic data reader.
Figure 3:
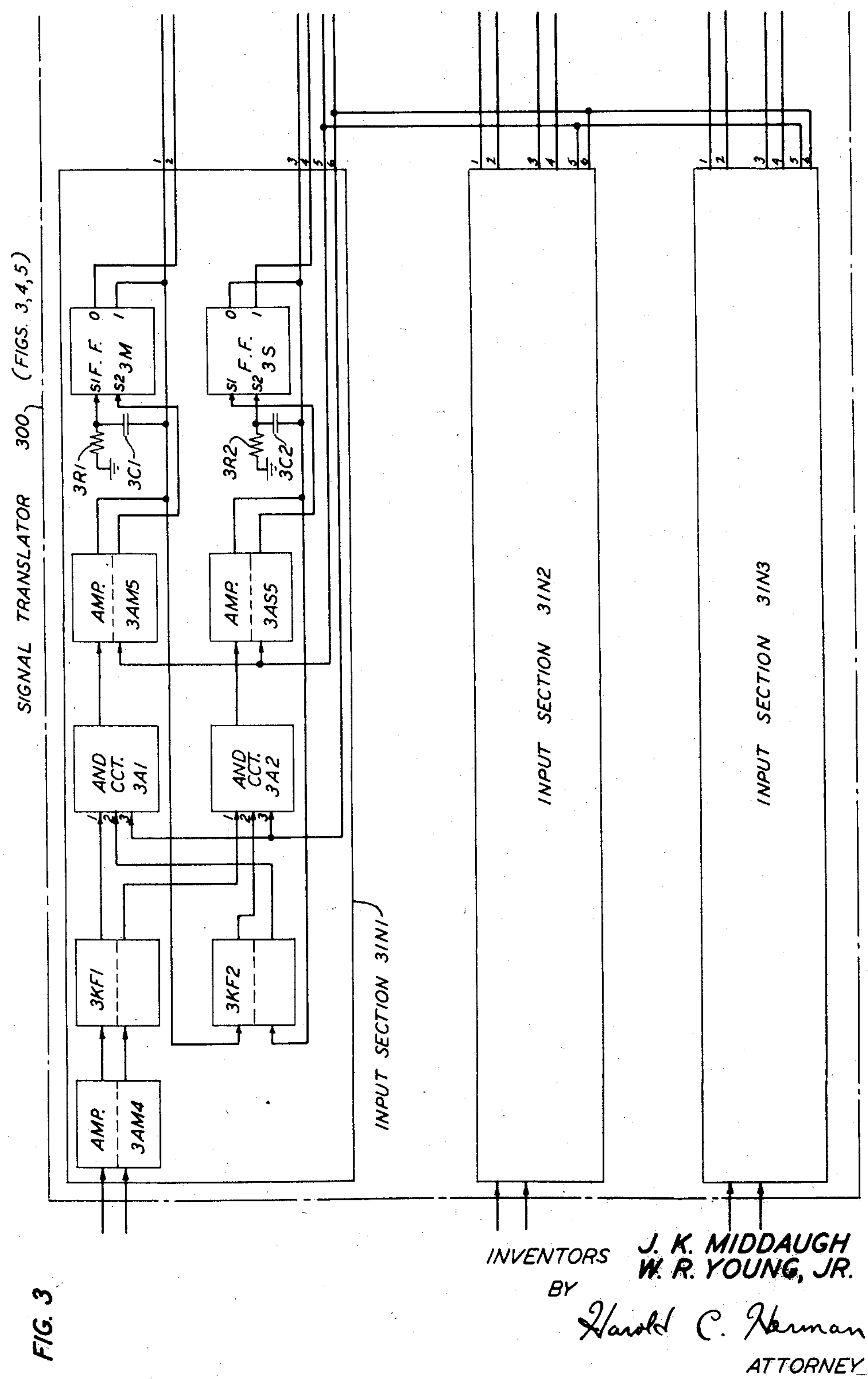
Figs. 3–5 illustrate the signal translator of the automatic data.
Figure 4:
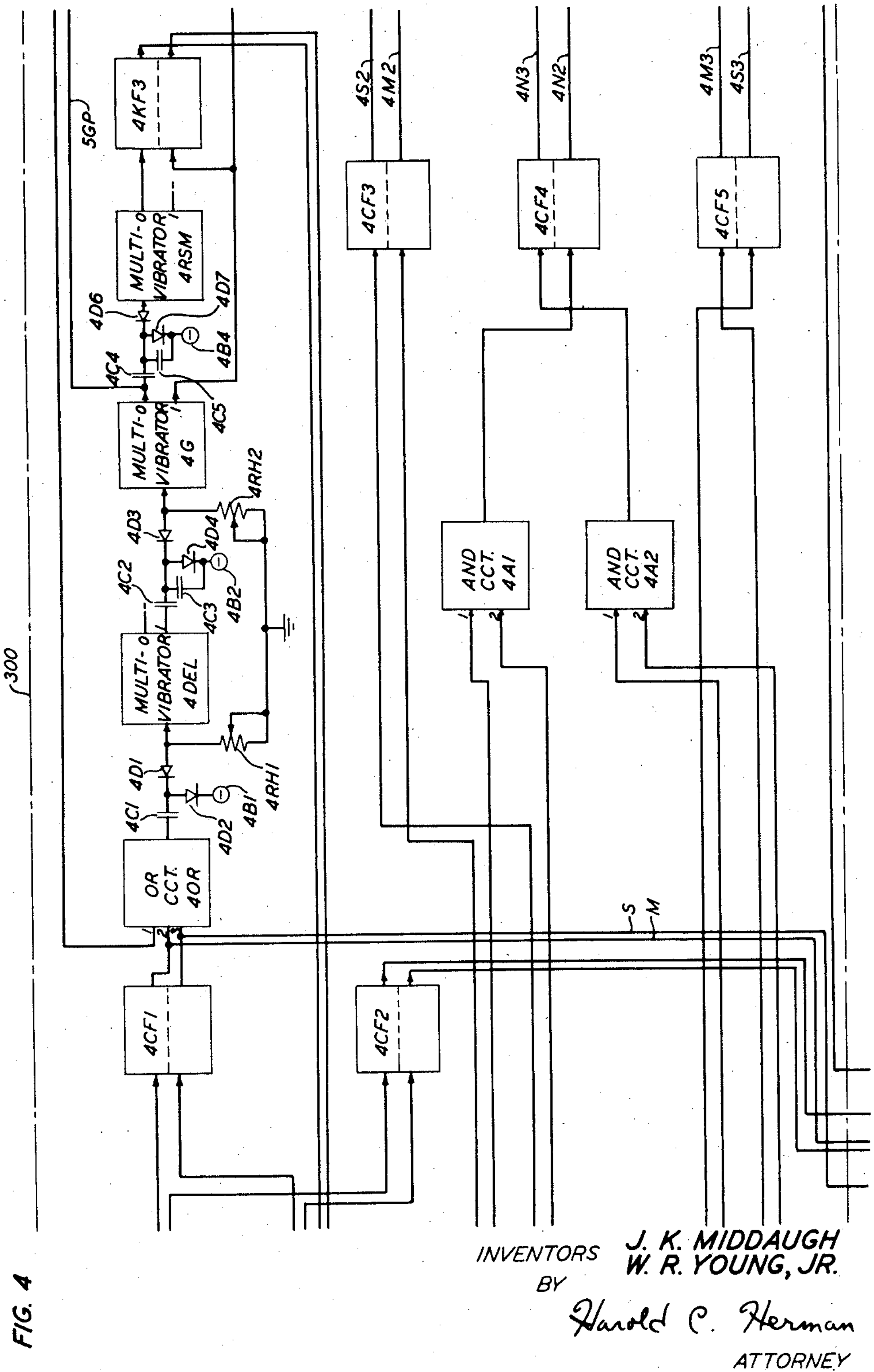
Figure 5:
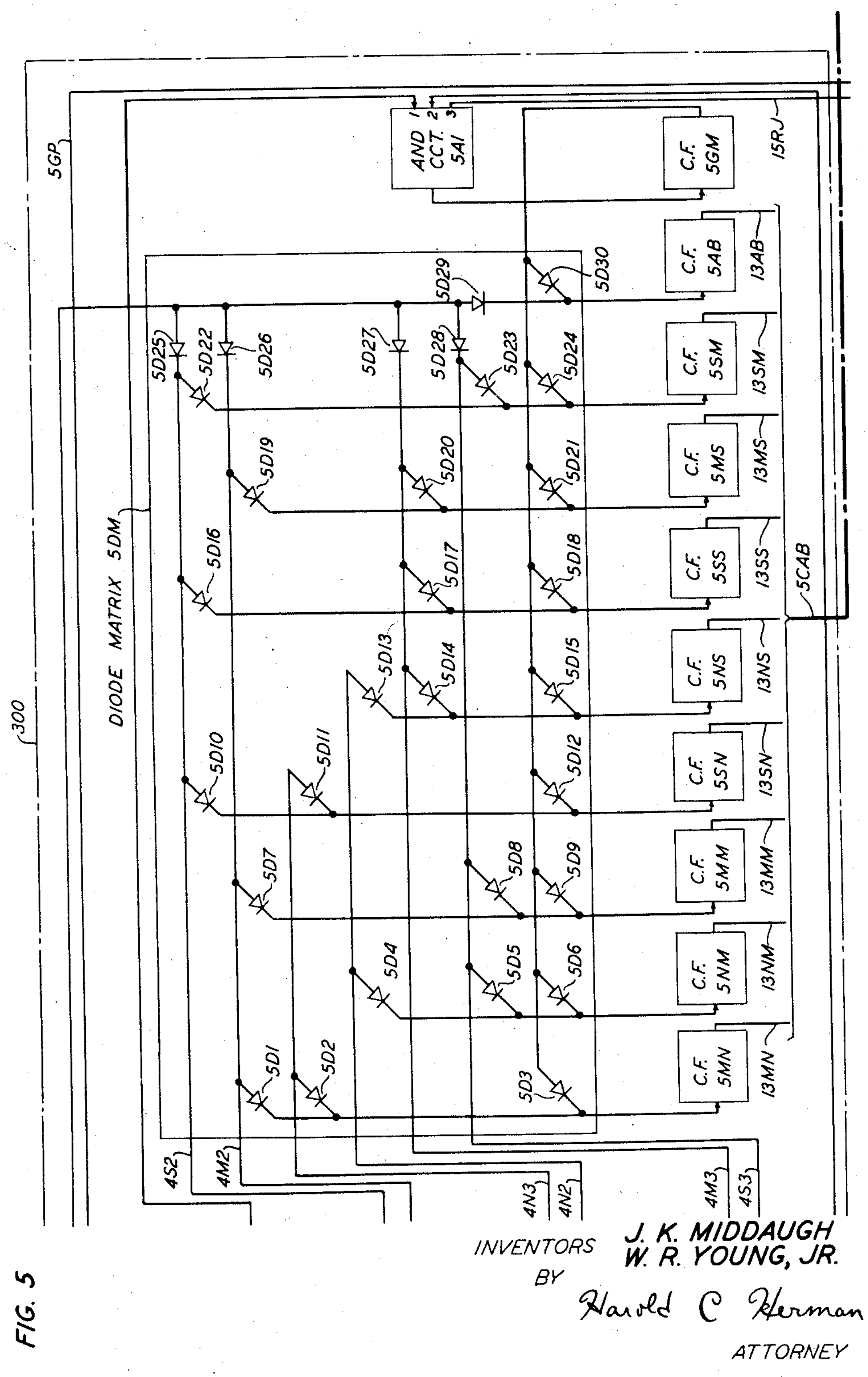
Figure 6:
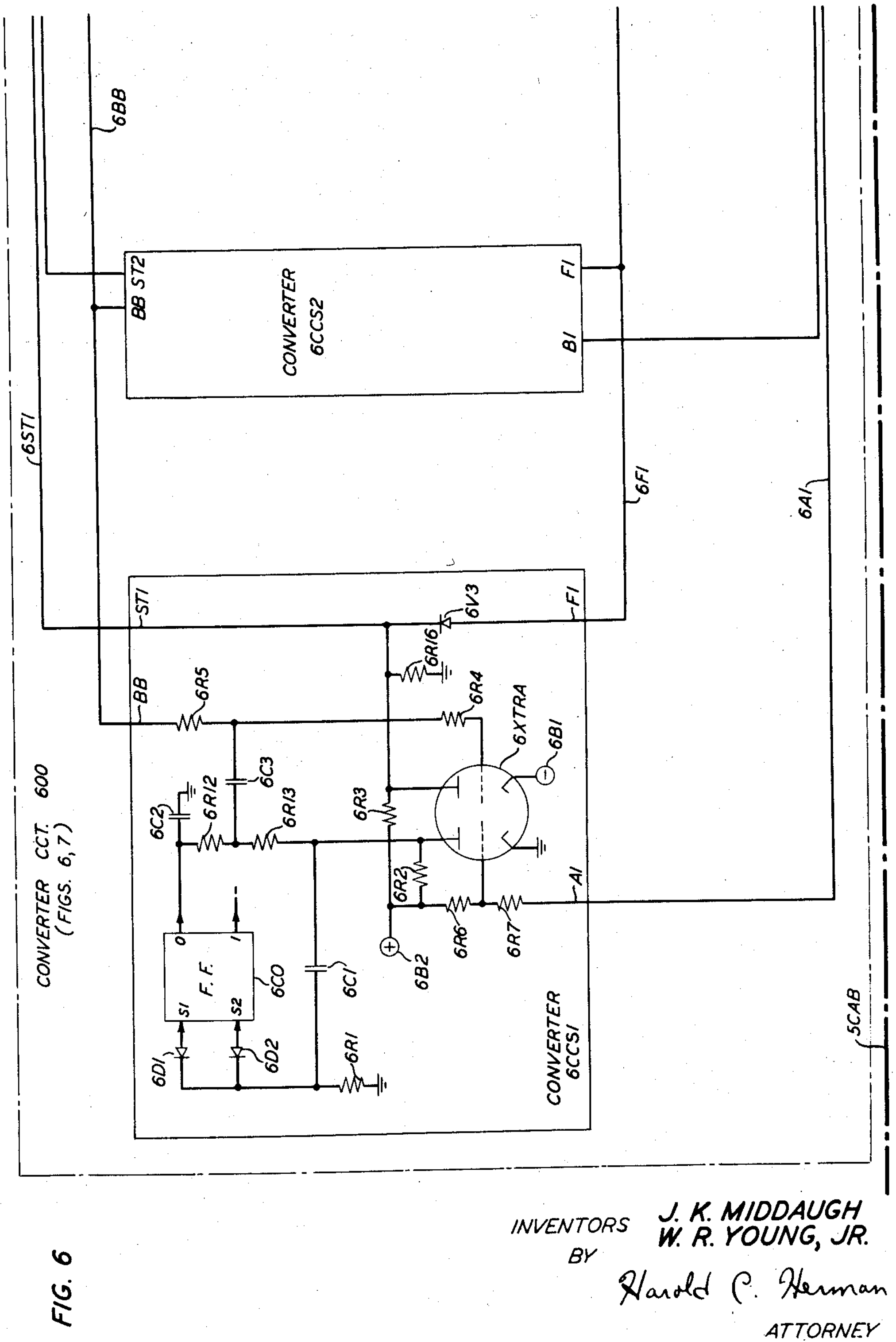
Figs. 6 and 7 illustrate the CCS converter circuit of the automatic data reader.
Figure 7:
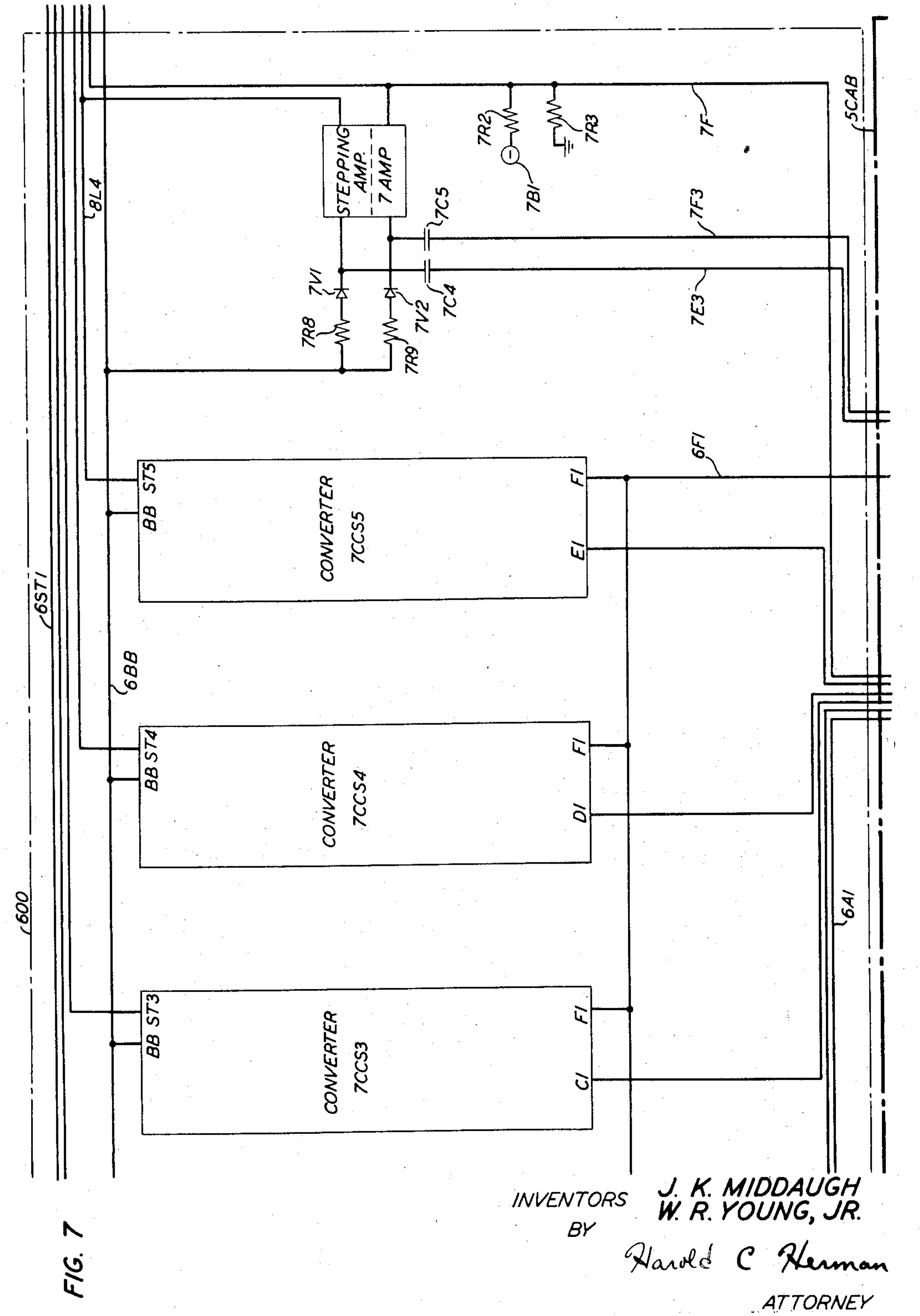

Referring to Fig. 1, the functionally illustrated automatic data reader is a highly flexible reading device which is utilized to analyze data recorded on a magnetic tape 201. The first digit or digits of each of the reference numbers of the components shown in Fig. 1 and in Figs. 2 through 37, as well, indicates the figure or at least one of the figures of the detailed circuit drawing in which the component appears. For example, the reading circuit 2RC is shown in Fig. 2 of the detailed circuit drawing.

The magnetic tape 201, which provides the input to the automatic data reader, has three tracks on which a coded representation of the data to be analyzed is recorded. The coded representation of the data includes positive signals, negative signals and neutral signals which are recorded on the tape 201 by traffic recorders of the type described in the above-identified disclosures by W. R. Young, Jr., and J. K. Middaugh. When these traffic recorders are utilized the recorded signals represent the traffic conditions at various lines, trunks, etc. Fig. 44 is a table of the coded signals and the traffic conditions represented thereby as recorded on the magnetic tape 201. For example, as indicated in Fig. 44, a positive signal on track 1 and a neutral signal on tracks 2 and 3 indicate that the traffic condition is "not busy" or idle. On the magnetic tape the particular line or trunk to which the traffic condition applies is identified on the time division or sequential basis. By time division basis is meant that the first set of coded signals corresponds to the first line that is sampled, the second set to the second line, etc.

The sets of coded signals are arranged in groups, with each group of signals representing the sampling of the traffic conditions of each of the group of lines and trunks which are sampled. The traffic recorders periodically sample the traffic conditions of the lines and trunks, and groups of coded signals corresponding to the traffic conditions of the lines and trunks are periodically recorded on the magnetic tape 201 during a number of daily recording sessions. A large amount of blank tape does not occur between groups of signals on the tape 201 because the traffic recorders operate on a start-stop basis during recording sessions.

The automatic data reader is highly flexible because it can be utilized to analyze the traffic conditions recorded on the magnetic tape 201 in a number of different ways. The information recorded on the tape 201 can be analyzed on an individual line basis or on a group basis. By individual line basis is meant that the traffic conditions on a particular line or on a particular group of lines can be separately analyzed. For example, the total busy duration of the twelfth line that is sampled may be computed. By group basis is meant that the traffic conditions of all the lines and trunks in the sample group are simultaneously analyzed. For example, the total duration of intraoffice calls for all the lines in the group may be computed.

Referring to Fig. 40, the middle four columns of Tables A, B and C are utilized to print the accumulated group information. Tables B and C have a column for the group intraoffice calls. Four such accumulations may be accomplished during the group analysis of the data on tape 201.

In addition to the four group accumulations one of the following three types of distribution analyses may be accomplished when group analysis is provided:

(1) Distribution of dial-tone delay;

(2) Distribution of simultaneously busy lines per scan; and (3) Distribution of consecutive scans that a given number of lines are simultaneously busy.

When the distribution of dial-tone delays is determined, the group analysis relates to the way the dial-tone request is terminated. For example, the number of times the dial-tone request is terminated because all trunks are busy may be determined.

For each of the three types of group analyses and for the individual line analysis the automatic data reader automatically reads, decodes, sorts and accumulates the recorded signals on the tape 201 and provides in tabulated form the results of the analysis. Samples of the output are shown in Figs. 39 and 40 with Fig. 39 illustrating an individual line analysis output and Fig. 40 illustrating an output for each of the three types of group analyses.

In order to set up the automatic data reader for accumulating data, various components in the automatic data reader are manually set to determine the type of analysis and the information to be printed by a teletypewriter 26TT. For the individual line analysis, a data analysis control circuit 1200 is set to identify five lines or five groups of lines for which the traffic information is to be accumulated and analyzed. For example, the circuit 1200 may be set so that the traffic information of lines 11, 27, 32, 40–9 and 60–69 will be analyzed. A time and scan program circuit 1000 is set to identify the particular recording session which is to be analyzed and the accumulation period during which information is to be registered in the count register circuits 8A and 24B. For example, the duration of each accumulation period may be one hour so that the traffic information which was recorded during one hour of the operation of the traffic recorder is accumulated before the teletypewriter 26TT is operated. For each of the five lines or groups of lines for which the traffic information is to be accumulated a number of different types of information may be considered. For example, revertive calls on a particular line may be considered or intragroup calls for a particular line may be considered. The particular coded signals which are considered by the automatic data reader are determined by the setting of the patch circuit 3700. The data analysis and control circuit 1200 determines whether the analysis is on an individual or a group basis and the patch circuit 3700 determines which coded signals are to be considered. If the analysis is on an individual basis the data analysis and control circuit 1200 also determines for which lines the information is to be considered, and if the analysis is on a group basis, the data analysis and control circuit 1200 also determines which type of group analysis is to be utilized.

The analysis is a two-directional analysis being both on a time division basis and on a coded signal sorting basis. The time division basis analysis is to consider or reject traffic information only for the selected lines, and the coded signal sorting basis is to consider or reject specific kinds of traffic information.

The sequence of operations for reading the magnetic tape 201 and for decoding, accumulating and analyzing the data recorded thereon is initiated by manually operating the time and scan program circuit 1000. Another sequence of operations may be simultaneously initiated for printing a heading for the accumulated data by manually operating the print program circuit 2600. The two sequences of operations may occur simultaneously because the sequence for printing the heading delays the printing of the accumulated data at the end of the accumulation period. In the following description the sequence for accumulating data is first described, then the sequence for printing the heading is described and finally the sequence for printing the accumulated data is described. From the time the circuit 1000 and the circuit 2600 are manually operated, the three sequences are automatic with the accumulation of data being interrupted at the end of each accumulation period in order to print the accumulated data. The sequences of operations initiated by the operation of the circuit 1000 and by the circuit 2600 are independent so that either or both may be initiated.

When the time and scan program circuit 1000 is operated, it initiates the operation of the reading circuit 2RC which reads the magnetically recorded coded signals on the tape 201. The magnetic tape 201 is advanced at a speed of 7½ inches per second so that the time between successive coded signals is approximately 2.3 milliseconds, and the time between groups of coded signals is approximately 100 milliseconds. If the magnetic tape 201 was prepared by a traffic recorder of the type described in the above-identified disclosure by J. K. Middaugh, each group of recorded signals represents the traffic conditions existing on 60 subscriber lines and on ten trunks so that a total of 70 sets of coded signals are included in each group or sampling cycle. With seventy sets of coded signals, the reading time of the group of signals is approximately one minute and 40 seconds. As indicated from an analysis of the coding shown in Fig. 44, a positive signal or a mark appears in track 1 for each of the 70 sampled lines and trunks independent of its traffic condition. The 70 positive marks on track 1 are utilized to identify the sampled lines and trunks on a time division basis. Preceding the 70 coded signals in each group of coded signals, one or more negative signals are recorded on track 1 to signify the beginning of a sampling cycle.

The coded signals which are read in the reading circuit 2RC are provided through the preamplifier 2PR to the signal translator 300. The waveforms provided from the preamplifier 2PR are shown in Fig. 45. As shown in Fig. 45, each recorded signal on a track of the magnetic tape 201 provides for two waveforms which are mirror images and which include both negative and positive pulses. The translator 300 functions to determine the polarity of the recorded signals and to convert the recorded information into direct-current signals which are suitable for data processing or analysis. With the tape moving at a speed of 7½ inches per second, the time between the two pulses due to a recorded signal is approximately 400 microseconds whereas the time between successive signals is, as described above, approximately 2.3 milliseconds. The translator 300 discriminates between these two durations to determine the polarity of the recorded signal.

When a negative signal, signifying the beginning of a sampling cycle, is read on track 1 of tape 201, the translator 300 recognizes that a negative signal is provided on track 1 and that a neutral signal is provided on tracks 2 and 3. When the signal translator 300 determines that the coding is a negative signal on track 1 and a neutral signal on tracks 2 and 3, it provides a readying pulse or signal to the data analysis and control circuit 1200.

Assume that the first set of coded signals after the negative readying signal on track 1 is a positive signal on tracks 1 and 2 and a neutral signal on track 3. The positive signal recorded on track 1 of the tape 201 signifies that any information recorded on tracks 2 and 3 is a measure of line usage. As is hereinafter described, if a positive signal is not present on track 1 the data recorded on tracks 2 and 3 is a measurement of the dial-tone speed. The signals recorded on track 1 also identify the subscriber line or trunk on which traffic data is being taken and are utilized to identify the time the measurements were made. There are nine possible combinations of no-signal, mark or space signals on tracks 2 and 3 and examples of the nine combinations are tabulated in Fig. 44. The signal translator 300 first determines, as described above, whether the recorded signal on each track is positive, negative or neutral and thereafter decodes the information recorded on tracks 2 and 3.

Whenever a positive signal is read on track 1 of the tape 201, a minus 80-volt signal is supplied from the signal translator 300 to the time and scan program circuit 1000 and to the data analysis and control circuit 1200. With the positive signals on track 1 occurring every 2–3 milliseconds, the negative signals are supplied from the signal translator 300 every 2–3 milliseconds during a sampling cycle, and the duration between cycles, or groups of signals, is 50 to 100 milliseconds. The circuit 1000 counts the number of cycles or groups of signals and, as is hereinafter described, it stops the reading circuit 2RC and operates the print program circuit 2600 when it counts up to 240 cycles or scans. A count of 240 represents a duration of one hour of traffic information because the sampling cycles are taken at 15-second intervals and 15 times 240 is 3600 seconds or one hour.

The data analysis and control circuit 1200 counts the negative pulses provided thereto from the translator 300, and selects the negative pulses corresponding on a time division basis with the line and trunk preselection described above. As described above, it is assumed that the circuit 1200 is set to analyze the traffic information of lines 11, 27, 32, 40–9 and 60–9.

The signals on tracks 2 and 3 are decoded by the translator 300, and the decoded signals are supplied to the patch circuit 3700. The patch circuit 3700 is manually preset to recognize only selected ones of the decoded signals. Assume, for example, that all busy indications for the selected lines are to be considered. Referring to Fig. 44 a positive signal is recorded on track 1 and a positive or a negative signal is recorded on either or both of tracks 2 and 3 to indicate that a line or a trunk is busy. The patch circuit 3700 is preset to provide selected ones of the decoded signals to the data analysis and control circuit 1200. If, for example, the patch circuit 3700 is set to recognize only decoded signals corresponding to intragroup calls, all other decoded signals are inhibited. Generally, however, when the analysis is on an individual basis, the accumulative busy information corresponding to each of the selected lines is desired. In such a case any busy indication is recognized. If the coded signals indicate an idle condition, the signal translator 300 does not provide any signal to the patch circuit 3700 so that a signal is not provided from the patch circuit 3700 to the data analysis and control circuit 1200.

The decoded signal from the patch circuit 3700 is provided to the data analysis and control circuit 1200 at the same time that the minus 80-volt line identifying pulse is provided from the signal translator 300 to the circuit 1200.

In the illustrative example being described, the circuit 1200 is set to accumulate the traffic information only for lines 11, 27, 32, 40–9 and 60–9 so that the decoded signals for the first 11 lines 00–10 of the group of lines 00–59 are not recognized in the circuit 1200. When there is a coincidence between an identifying pulse which corresponds to a selected line from the translator 300, and a decoded signal from the patch circuit 3700, a count pulse is provided from the circuit 1200 to the converter circuit 600. The converter circuit 600 multiplies the number of count pulses provided thereto from the circuit 1200 by a factor of 15 and supplies the result to a count register circuit 8A. The number of count pulses are multiplied by 15 because the groups of coded signals are recorded at 15-second intervals so that each count pulse represents a duration of 15 seconds. hTe counter register circuit 8A separately accumulates the busy duration for each of the selected lines or groups of lines and it also accumulates an indication of the total busy duration of all the selected lines.

The first time a busy indication for a selected line is supplied to the circuit 1200, it supplies a count pulse to the count register circuit 24B in addition to the count pulse to the circuit 600. If the selected line remains busy for a number of groups of coded signals, subsequent count pulses are provided to the circuit 600 but not to the circuit 24B. The circuit 1200 discriminates, in this manner, between the duration of successive groups of coded signals to provide for an indication of the number of calls on the selected lines. An indication of the number of calls on the selected lines are provided to the count register circuit 24B because only one count pulse is provided for each busy duration of a selected line thereto. The count register circuit 24B separately accumulates the number of calls for each of the selected lines or group of lines.

The recorded signals on tape 201 are in this manner simultaneously sorted and analyzed in two different ways:

(1) The signals are sorted on a time basis under control of the data analysis and control circuit 1200; and (2) The signals are sorted on a coding basis under control of the panel 3700.

It is only when both the time slot, which identifies the line, and the coding, which identifies the traffic condition, match the manually preselected conditions that a count pulse is provided from the circuit 1200. One count pulse is provided to the circuit 600 everytime the recorded signals for lines 11, 27, 32, 40–9 and 60–9 indicate a busy condition, and one count pulse is provided to circuit 24B everytime a call is initiated by or to the lines 11, 27, 32, 40–9 and 60–9.

The sequence of operations for accumulating and analyzing the recorded signals on tape 201 continues in this manner as one group of signals after another is analyzed until the end of the accumulation period. The accumulation period, as described above, is determined by presetting the time and scan program circuit 1000. As assumed above, the accumulation period is one hour. At the end of the one hour accumulation period, as is hereinafter described, the time and scan program circuit 1000 stops the reading circuit 2RC and operates the print program circuit 2600.

During the time that the coded signals on the tape 201 are being analyzed and accumulated in the count register circuits 8A and 24B, the print program circuit 2600 may be operated to intitiate a sequence of operations for printing a heading for the accumulated data. As described above, the sequence of operations for printing a heading may be simultaneous with the sequence of operations for accumulating the data.

Figure 43:
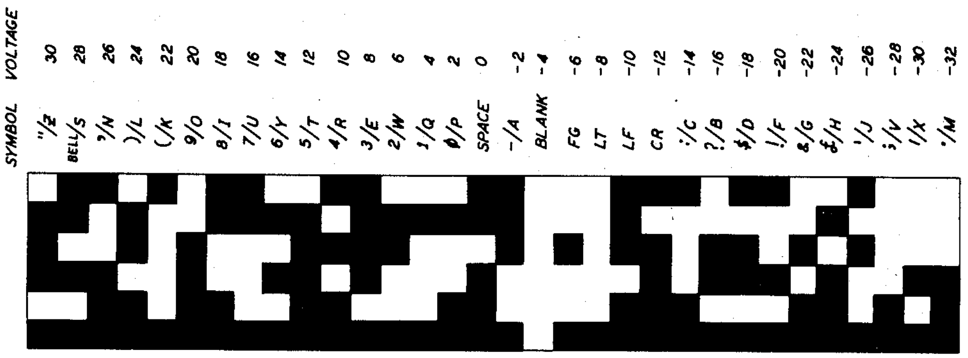
Fig. 43 is a front view of the photographic mask utilized in the print program circuit of the automatic data reader.
Figure 41:
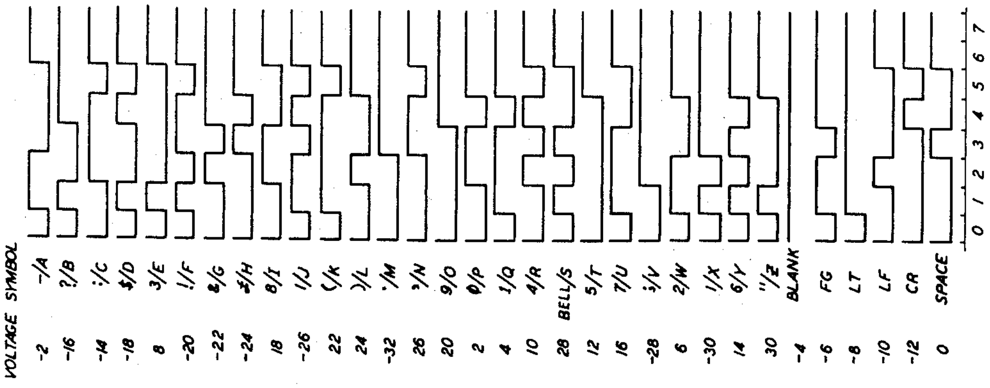
Fig. 41 illustrates the coding of input waveforms provided to the teletypewriter of the automatic data reader.

When the circuit 2600 is operated to initiate a heading printing sequenec of operations, it controls the operation of a print selector 2900. Referring to Figs. 39 and 40, the heading includes a number of sections. The words "test day" and "period begin" are utilized in each of the four types of headings shown in Figs. 39 and 40. When the print selector 2900 is operated by the circuit 2600 it successively connects analog potentials to the print program circuit 2600 which represents the words "test period." The coding of the analog potentials is shown in Fig. 41 which illustrates the teletypewriter coded signals and in Fig. 43 which illustrates a photographic mask utilized in circuit 2600. For example, as shown in Figs. 41 and 43, a minus 6-volt potential is supplied to the circuit 2600 to indicate that the next signal is for a figure instead of a letter. Thereafter a plus 12-volt potential is provided to the circuit 2600 to indicate that the symbol is 5/T. The 32 symbols listed in Figs. 41 and 43 are the usual teletypewriter signals.

The rest of the words and figures in each of the headings is determined by the setting of the patch circuit 3700 and of the data analysis and control circuit 1200. For example the words "CCS of group traffic" are printed if the data analysis and control circuit 1200 is set for group instead of individual analysis. The source of the analog potentials for the heading is located in the print selector 2900 so that the analog potentials for the group or the individual heading are successively supplied from the print selector 2900 through the circuit 1200 to the print program circuit 2600. The digits in the first line of the heading shown in Fig. 39 are also supplied under control of the circuit 1200 and the symbols at the central portion of the second line of the group heading are controlled by the patch circuit 3700. When the signals are controlled by the patch circuit 3700 the analog potentials are successively connected from the print selector 2900 through the patch circuit 3700 and back through the print selector 2900 to the print program circuit 2600. The last part of the first and the second lines of the group headings are also determined by the circuit 1200. In this manner under control of the setting of the circuits 1200 and 3700, the print selector 2900 successively connects analog potentials to the print program circuit 2600. The print program circuit 2600 translates the analog potential to the teletypewriter coded signals shown in Fig. 41 and provides the teletypewriter signals to the teletypewriter 26TT. Under control of the coded signals, the teletypewriter 26TT prints one of the headings illustrated in Figs. 39 and 40.

During the time the automatic data reader is printing the heading for the accumulated data, the recorded signals on the tape 201 are being read, analyzed and accumulated in the register circuits 8A and 24B. The accumulation sequence of operations continues until 240 scans or groups of signals are counted by the time and scan program circuit 1000. When the time and scan program circuit 1000 operates at the end of the accumulation period, it stops the reading circuit 2RC and initiates a sequence for printing the accumulated data in the circuits 8A and 24B by operating the print program circuit 2600. When the print program circuit 2600 is operated by the circuit 1000, it initiates the operation of the selector circuit 2900 which in turn successively connects output potentials from the circuits 8A and 24B to the circuit 2600. The output of the circuit 8A and the output of the circuit 24B is a step analog potential with each step also being coded as shown in Fig. 41. The print program circuit 2600 converts the step analog potentials from the circuits 8A and 24B in accordance with the teletypewriter code shown in Fig. 41 and supplies the teletypewriter coded signals to the teletypewriter 26TT.

When the print program circuit 2600 completes its operation, and the accumulated information in registers 8A and 24B is printed, the circuit 2600 supplies a control potential to the time and scan program circuit 1000. Responsive to the control potential, the time and scan program circuit 1000 halts the operation of the print program circuit 2600 and reoperates the reading circuit 2RC to start another accumulation period. One accumulation period automatically follows another with each accumulation period resulting in printing one line of accumulated data until the entire tape 201 has been read and analyzed.

When the analysis is on a group basis, the data analysis and control circuit 1200 may be set to inhibit the recognition of the coded signals from five selected lines and groups of lines. The coded signals for all the rest of the lines in the group are cumulatively considered and supplied as count pulses to the count register circuit 8A. When the data analysis and control circuit 1200 is set for group analysis, the count register circuits 8A and 24B are serially connected to form a number of five-stage decade registers. A larger capacity is necessary because the coded signals for the entire group of lines are considered. The path circuit 3700 is set for group analysis in the same manner as for individual line analysis to determine which of the coded signals are to be recognized.

Referring to Fig. 40, the middle four columns of each table are utilized for the accumulated group information. For example, in Table B the total busy duration of all revertive calls, or NM signals, on all of the lines in the group are accumulated. Four such accumulations may be accomplished for the group analysis. The coded signals which are considered are determined by the setting of the patch circuit 3700. In addition to these four columns, one of the following three types of distribution information may be determined for the group analysis:

(1) Dial-tone speed;

(2) Number of simultaneous busy lines per scan; and (3) Consecutive numbers of scans that a given number of lines are simultaneously busy.

These three types of group analyses are illustrated in Fig. 40, Tables A through C. Whent he data analysis and control circuit 1200 is set to determine the distribution of dial-tone delays the group information in the middle four columns shown in Table A of Fig. 40 relates to the way the request for dial tone was terminated. Referring to Fig. 44, which illustrates the recorded signals on the tape 201, the coded signals relating to the dial-tone delay and the way the dial-tone request was terminated have a neutral signal recorded on track 1 of tape 201 whereas the coded signals relating to busy or idle line conditions have a positive signal recorded on track 1 of the tape 201. When the circuit 1200 is set to determine the distribution of dial-tone delays, all the signals having a positive mark in track 1 are ignored. The group information therefore in the middle four columns of Table A in Fig. 40 can relate only to those signals which do not have a mark in track 1. As shown in Fig. 40, Table A, with reference to Fig. 44, the four different ways of terminating a service request are accumulated When the traffic recorder measures the wait time or dial-tone speed, a positive signal is recorded in track 2 and the neutral signal is recorded in tracks 1 and 3 for every $\frac{1}{10}$ of a second delay. The automatic data reader utilizes the wait time coded signals to measure the duration of the dial-tone delay.

When a coded signal is read which indicates that the dial-tone request was terminated because dial tone was provided, an indication thereof and of the duration of the dial-tone delay is provided to the circuits 8A and 24B from the circuit 1200. If, however, a call for which dial-tone delay is being measured terminated for any of the three other reasons, all trunks busy, abandoned call, etc., the circuit 1200 is reset and no indication is provided to the circuits 8A and 24B. The circuit 1200 is reset by the decoded dial-tone termination signal provided from the translator 300 through the patch circuit 3700.

For the example shown in Table A of Fig. 40, the distribution of the dial-tone delays is for 3, 4, 5 and 6 seconds. If the dial-tone delay is greater than 6 seconds, the accumulated data in each of the four columns under the digits 3, 4, 5 and 6 is increased by 1. If, for example, the dial-tone delay is 4 seconds, only the first two columns are affected. The sequence of operations for printing the accumulated dial-tone data is similar to that described above for the printing of the individual data analysis.

When the circuit 1200 is set to determine the number of simultaneous busy lines during each scan, the heading for the accumulated data is illustrated in Table C of Fig. 40. To determine the number of simultaneous busy lines during each scan, the circuit 1200 is set to ignore the coded signals which do not have a mark signal in track 1 of the tape 201. With the circuit 1200 set in this manner, the dial-tone delay indications and the termination indications are ignored and the busy indications are considered. The patch circuit 3700 may be set to accumulate any of the busy indications. As indicated in Fig. 40, Table C, the intragroup busy indications are accumulated, the revertive call indications are accumulated, the non-classified busy indications are accumulated and the total of the intragroup, revertive, and non-classified indications are also accumulated. The decoded busy signals are provided through the patch circuit 3700 to the circuit 1200 in exactly the same way as for the dial-tone group analysis and for the individual data analysis.

The circuit 1200, which counts the number of busy lines, is reset by the time and scan program circuit 1000 at the end of each scan or group of coded signals. If the circuit 1200 has registered a number of busy lines which is greater than predetermined numbers of lines, indications thereof are provided to the register circuits 8A and 24B. As indicated in Table C, Fig. 40, the circuit 1200 is set to provide indications to the circuits 8A and 24B if more than 3, 4, 5 or 6 lines are simultaneously busy during a scan. For the simultaneous busy indications any type of busy indication may be considered. For example, the distribution of intragroup busy indications for each scan may be determined. The sequence of operations for printing the distribution of simultaneous busy lines for each scan is the same as that described above for printing the distribution of dial-tone delays. The sequence of operatons therefor for accumulating the simultaneous busy indications for each scan is similar to that described above for accumulating the distribution of dial-tone delays except that the input information from the circuit 3700 is busy indications instead of dial-tone delay indications and the information is read from the circuit 1200 under control of the circuit 1000 instead of under control of the terminating indication from the circuit 3700.

The sequence of operations for determining the distribution of scanning cycles for which a predetermined number of lines are simultaneously busy is also similar to that described above for the sequence of operations for determining the distribution of simultaneous busy indications for each scan. The circuit 1200, however, is set to count the scanning cycles for which a predetermined number, for example 5 lines, are busy. The busy indications are provided from the circuit 3700 to the circuit 1200 where they are counted. At the end of each scan a control potential is provided from the circuit 1000 to the circuit 1200. If the circuit 1200 has counted more than five busy lines, it counts the scan and does not provide any information to the circuits 8A and 24B. The control pulse from the circuit 1000 resets the part of the circuit 1200 which counts the busy indications from the circuit 3700. During the next scan, if more than five lines are busy, the sequence is repeated with two scans being registered in the circuit 1200. When a scan is read that has less than five busy lines, the control pulse from the circuit 1000 resets the data analysis and control circuit 1200 and causes it to supply the number of scanning cycles for which five or more lines were simultaneously busy to the circuits 8A and 24B. As shown in Fig. 40, Table B, if five lines were busy for six or more scans, a count pulse is registered for each of the four columns. If five lines were busy for only four successive scans a count pulse is registered for only the first two columns.

The sequence of operations for printing the accumulated data in the circuits 8A and 24B is the same for all three types of group analyses.

When the circuit 1200 is set for group analysis and busy indications are considered, busy indications for specific lines or groups of lines may be rejected. To reject information for specific lines the circuit 1200 is set to identify the line or the group of lines and the information corresponding thereto is rejected. The coded signals corresponding to all the other lines in the group are accumulated, however, just as if the group were the size of the original group less the number of rejected lines.

DETAILED CIRCUIT DESCRIPTION

Figure 38:
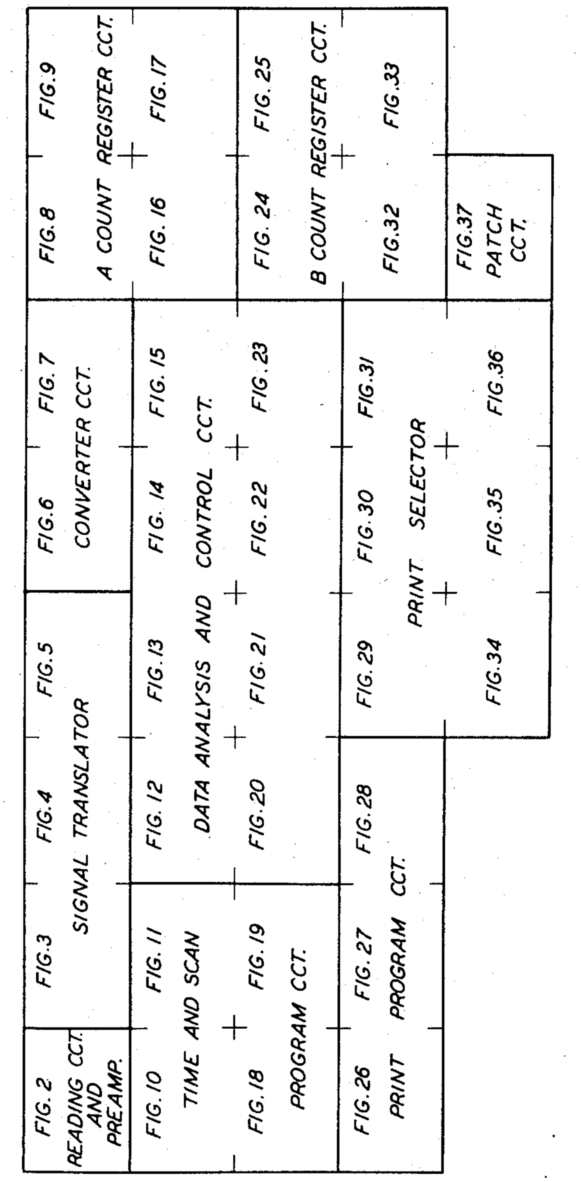
Fig. 38 illustrates the arrangement of Figs. 2–37.

In the detailed circuit drawing shown in Figs. 2–37, when arranged in accordance with Fig. 38, the designations of the various components include the figure number in which the component appears, and also one or more letters designating the function of the component. For example, the component 2AMP1, which is one of three amplifiers 2AMP1–3, appears in Fig. 2.

The automatic data reader is a highly flexible reading device which is utilized to analyze data recorded on a magnetic tape 201. In the illustrative embodiment described herein, the magnetic tape 201 has three tracks on which a coded representation of the data is recorded. The coded representation of the data includes positive signals, negative signals and neutral signals which may be recorded on the tape 201 by traffic recorders of the type described in the above-identified disclosures by W. R. Young, Jr., and J. K. Middaugh. When such traffic recorders are utilized, the recorded signals represent traffic conditions at various lines, trunks, etc. which are periodically sampled by the recorders. Fig. 44 is a table of the coded signals and the traffic conditions represented thereby as recorded on a tape 201 by the recorders described in the above-identified disclosures by W. R. Young, Jr., and J. K. Maddaugh. For example, as indicated in Fig. 44, a positive signal in track 1 and a neutral signal in tracks 2 and 3 indicate that the traffic condition of a particular line or trunk is not busy, or idle. On the tape 201, the particular line or trunk, to which the traffic condition applies, is identified on a sequential basis, with the first set of signals corresponding to the first line that is sampled, the second set to the second line, etc.

The sets of signals are arranged in groups, with each group of signals representing one sampling of the traffic conditions of the group of lines and trunks. The lines and trunks are periodically scanned or sampled and the groups of signals, corresponding to the traffic conditions thereof, are periodically recorded during a number of daily recording sessions. A large amount of blank tape does not occur between groups of signals on the tape 201 because the traffic recorders operate on a stop-start basis during the recording sessions.

The automatic data reader is highly flexible because it can be utilized to analyze the traffic conditions recorded on the magnetic tape 201 in a number of different ways. More specifically, the information recorded on the tape 201 can be analyzed in the following four different ways which are illustrated in Figs. 39 and 40.

(1) Individual line or trunk usage. (Fig. 39)

(2) Dial-tone speed. (Fig. 40, A)

(3) Number of simultaneous busy lines or trunks for each scan. (Fig. 40, B)

(4) Consecutive number of scans that a given number of lines or trunks are simultaneously busy. (Fig. 40, C)

The operation of the automatic data reader, which is different for each of the above four types of analyses, is separately described for each type of analysis.

*Individual line or trunk usage*

The automatic data reader includes a number of switches which are manually set to determine the type of analysis and the information to be printed by a teletypewriter 26TT. The teletypewriter 26TT provides the output of the reader in tabulated form illustrated in Figs. 39 and 40. To illustrate the operation of the automatic data reader, each of the switch settings necessary to set up the reader for analyzing individual line and trunk usage is first briefly described. Thereafter the sequence of operations of the automatic data reader, in accordance with the settings of the various switches, is described in detail. The description of the sequence of operations will include a description of the switches and components mentioned in the brief description of the switch settings. A specific analyzing situation is assumed in the following description of the switch settings and sequence of operations. For example, it is assumed that the traffic data of lines 11, 27, 32, 40–9 and 60–9 is to be analyzed, with data being accumulated in one-hour intervals and with every type of busy indication being considered. For such assumptions, the following is a list of switch settings together with a brief description of the function of each setting:

(A) Switches 11SW1–4 in circuit 1000 are utilized to identify the particular recording session which is to be analyzed;

(1) Switch 11SW1 in circuit 1000 is set at position 00 to indicate that the recording session, which is to be analyzed, commenced on the hour and not the half hour;

(2) Switch 11SW2 in circuit 1000 is set at the AM position to indicate that the recording session, which is to be analyzed, was the first recording session of the day;

(3) Switches 11SW3 and 11SW4 in circuit 1000 are set, respectively, at positions 20 and 2 to indicate that both the tens digit and the units digit are 2 to identify the day during which the recording was made;

(B) Switch 18SW1 in circuit 1000 is set at positions 4, 8 and 12 to indicate that the traffic conditions will be accumulated and analyzed on a one-hour basis;

(C) Switch 18SW2 in circuit 1000 is set at positions 4, 8 and 12 to indicate that the sequence from one accumulation period to the next will be automatic;

(D) Switches 12UA–E and 13TA–E in the circuit 1200 are set to identify the lines for which the traffic data is to be analyzed;

(1) The units switch 12UA and the tens switch 13TA are both set at position 1 to indicate that traffic data of line 11 will be accumulated;

(2) The units switch 12UB and the tens switch 13TB are set respectively at positions 7 and 2 to indicate that traffic data of line 27 will be accumulated;

(3) The units switch 12UC and the tens switch 13TC are set respectively at positions 2 and 3 to indicate that the traffic data of line 32 will be accumulated;

(4) The units switch 12UD is set at position BK and the tens switch 12TD is set at position 4 to indicate that the traffic data of the group of lines 40–49 will be accumulated as one total;

(5) The units switch 12UE is set at position BK and the tens switch 12TE is set at position 5 to indicate that the traffic data of the group of lines 50–59 will be accumulated as one total;

(E) The switch 12SW1 in circuit 1200 is set at the mark position to provide signals corresponding to the marks, or positive signals, on track 1 of tape 201 to the circuit 1000, and to ignore signals for which a mark pulse does not appear on track 1 of the tape 201;

(F) The switch 15GI in circuit 1200 is set at the positions 2,5,8, etc. to indicate that the analysis is on an individual line and not group basis;

(G) The reset switch or key 32SW is operated to reset the count registers 8A and 24B by connecting the grounded resistor 32R1 thereto;

(H) The reset switch or key 10SW1 in circuit 1000 is operated to reset the scan counter 10SC by connecting battery 10B1 thereto;

(I) The panel 37DT in the patch circuit 3700 is set to establish connection from the lead 13AB to the leads C1–5 to indicate that all busy indications for each of the lines selected by switches 12UA–E and 13TA–E are to be accumulated;

(J) The inhibit switches 27SW1–2 in circuit 2600 are set to their off inhibit position so that both the heading and the accumulated data are printed;

(K) The switch 11SW5 in circuit 1000 is set at position C0 to indicate that the traffic conditions were on concentrator lines and that the traffic recorder, of the type described in the above-identified disclosure by J. K. Middaugh, was utilized;

(L) Switch 11RS in circuit 1000 is operated to return an hour counter 11HC in circuit 1000 to normal;

(M) Switch 11AD in circuit 1000 is operated and released a number of times equal to the hour of the day at which the recording session began; and (N) Switch 28SW1 in the print program circuit 2600 is operated to initiate a sequence of operation for printing the heading shown in Fig. 39 and switch 19ST in the time and scan program circuit 1000 is operated to initiate the actual accumulation of traffic data.

The two sequences of operations may occur simultaneously with the sequence for printing the heading terminating while traffic data is being accumulated. In the following description, the sequence for accumulating data is first described, then the sequence for printing the heading is described, and finally the sequence for printing the accumulated data is described. The three sequences are automatic from the time the switches 19ST and 28SW1 are operated. If the switch 19ST, but not the switch 28SW1, is operated, the heading is not printed and if the switch 28SW1, but not the switch 19ST, is operated, the heading is printed but data is not accumulated.

Figure 8:
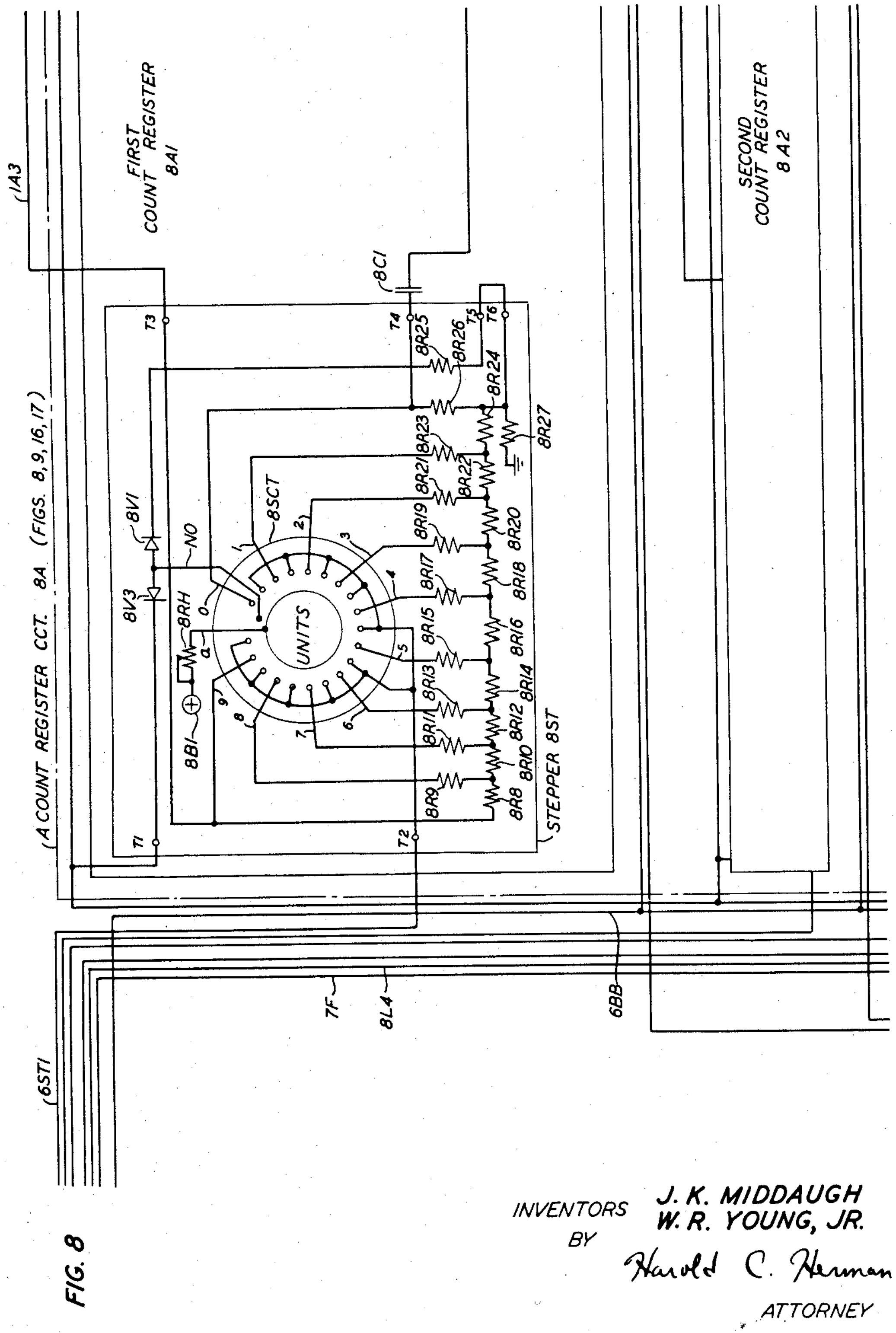
Figs. 8, 9, 16 and 17 illustrate one count register circuit of the automatic data reader.
Figure 9:
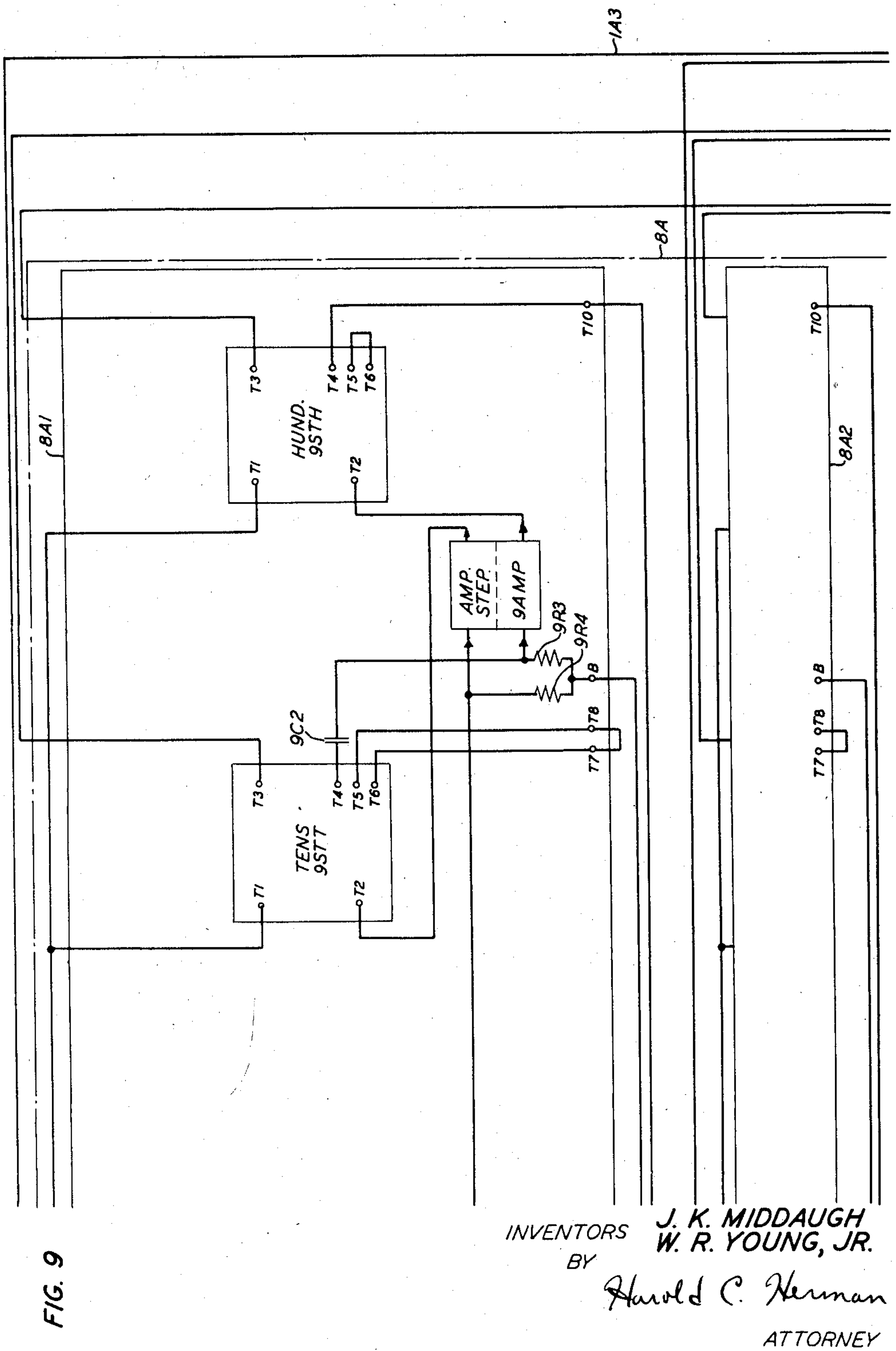
Figure 10:
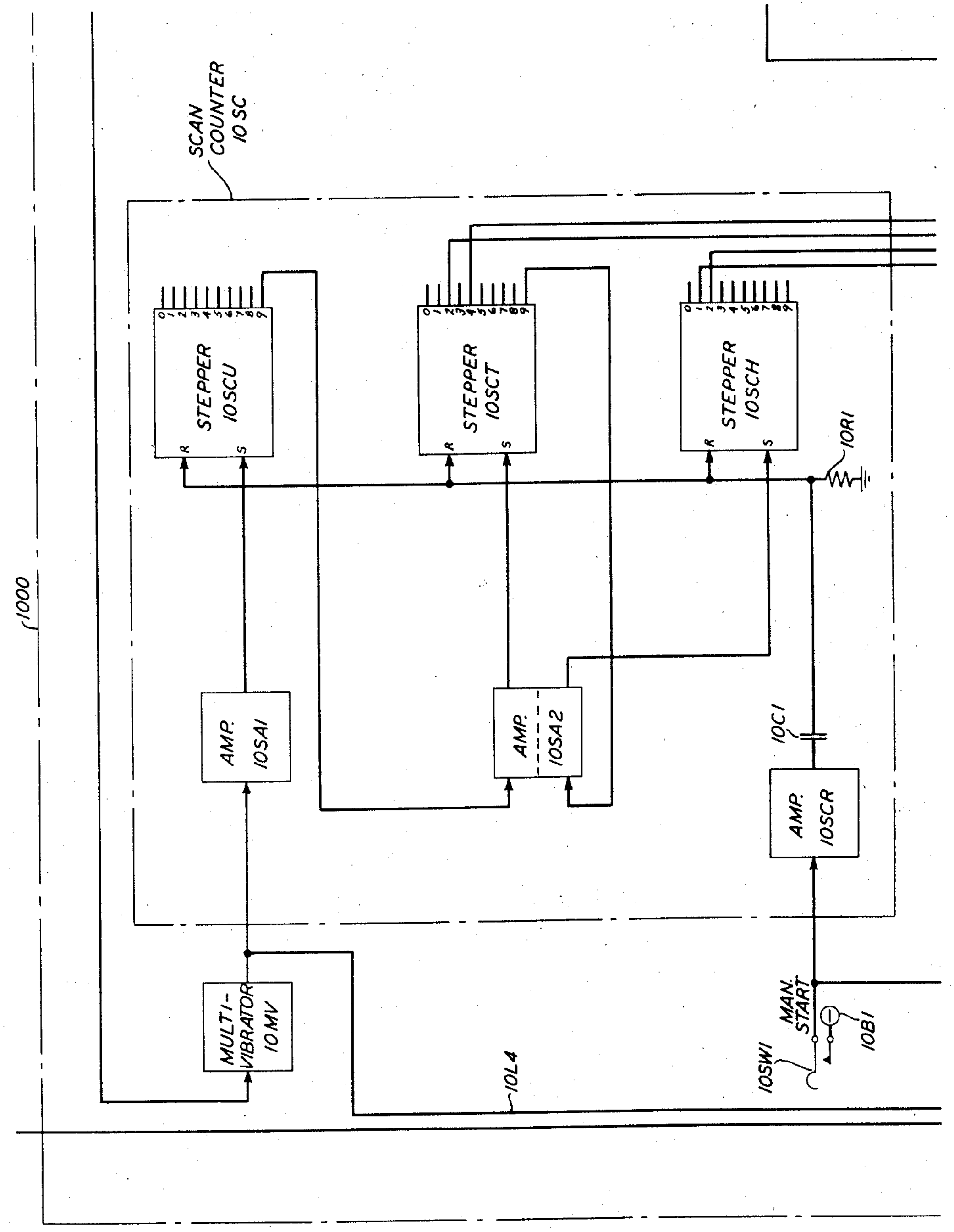
Figs. 10, 11, 18 and 19 illustrate the time and scan program circuit of the automatic data reader.
Figure 11:
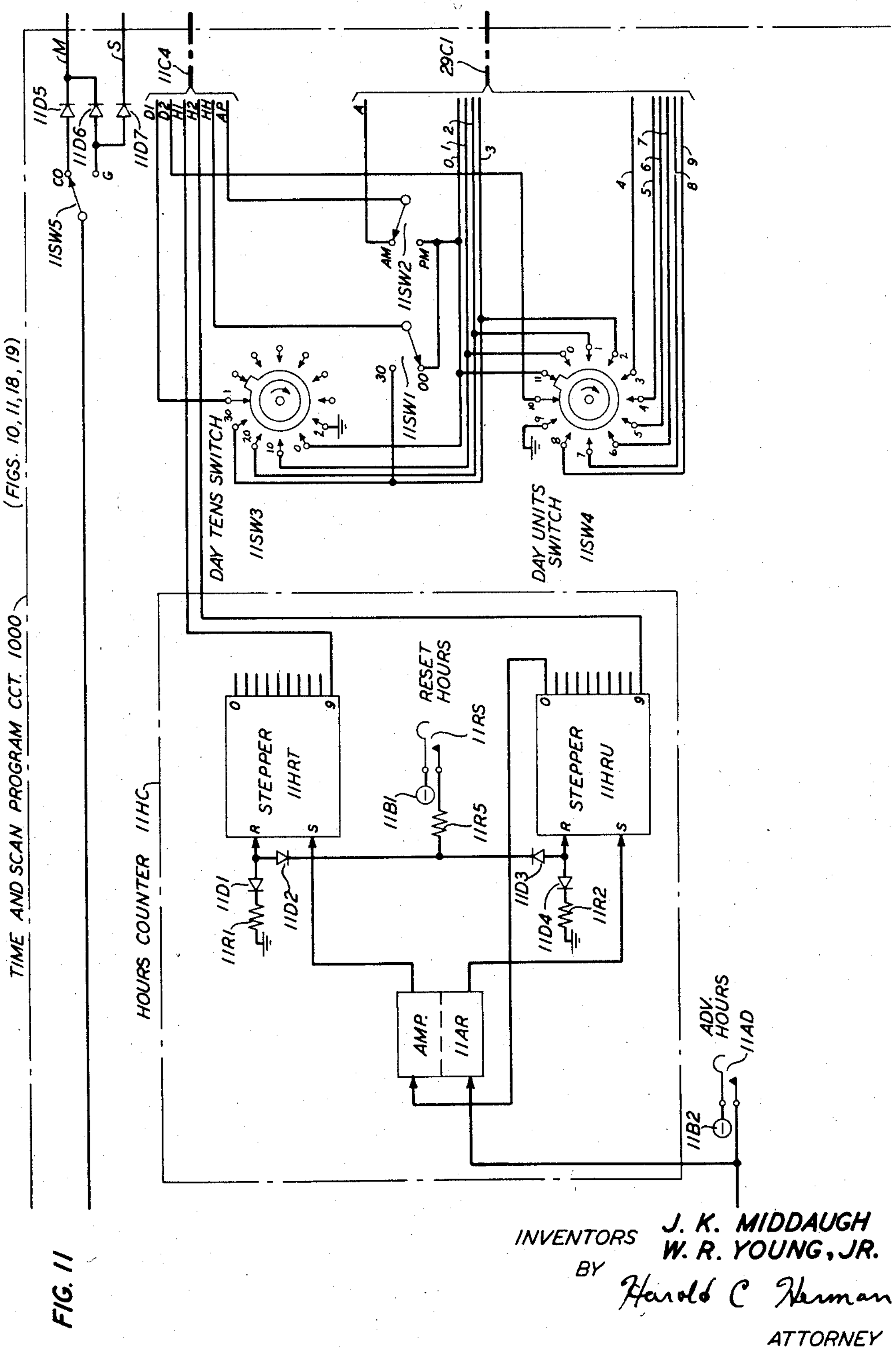
Figure 24:
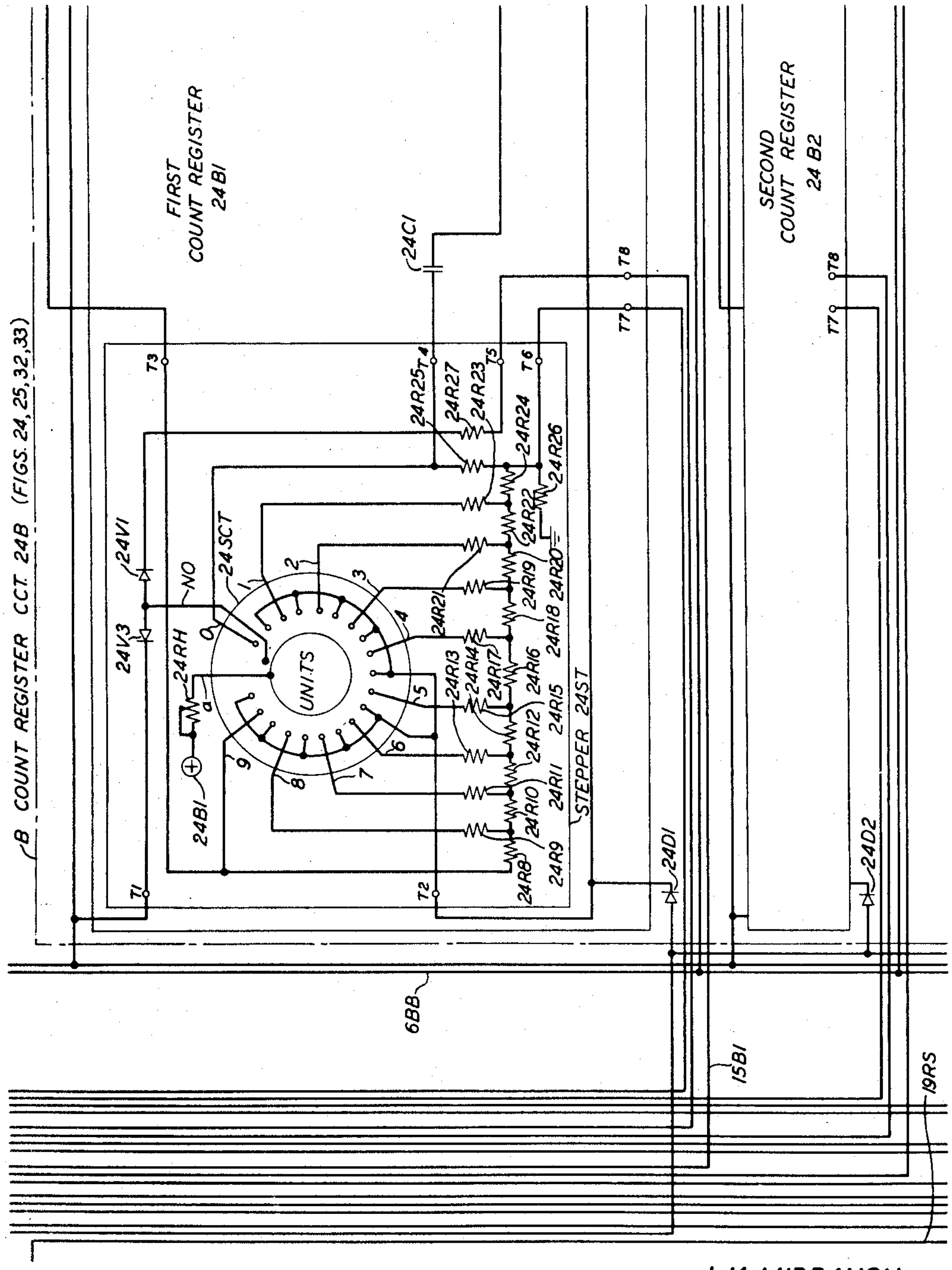
Figs. 24, 25, 32 and 33 illustrate a second count register circuit of the automatic data reader.
Figure 25:
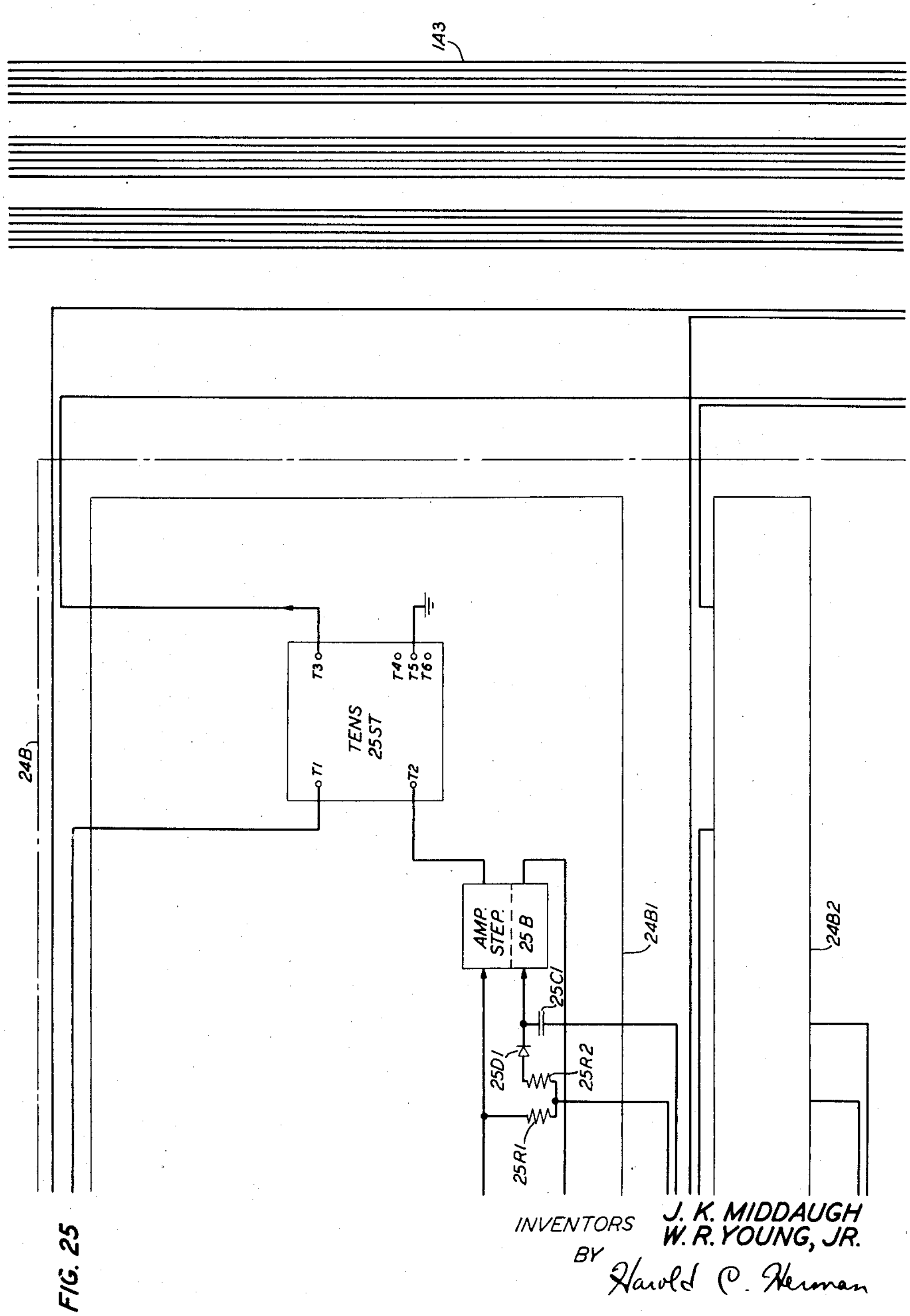
Figure 26:
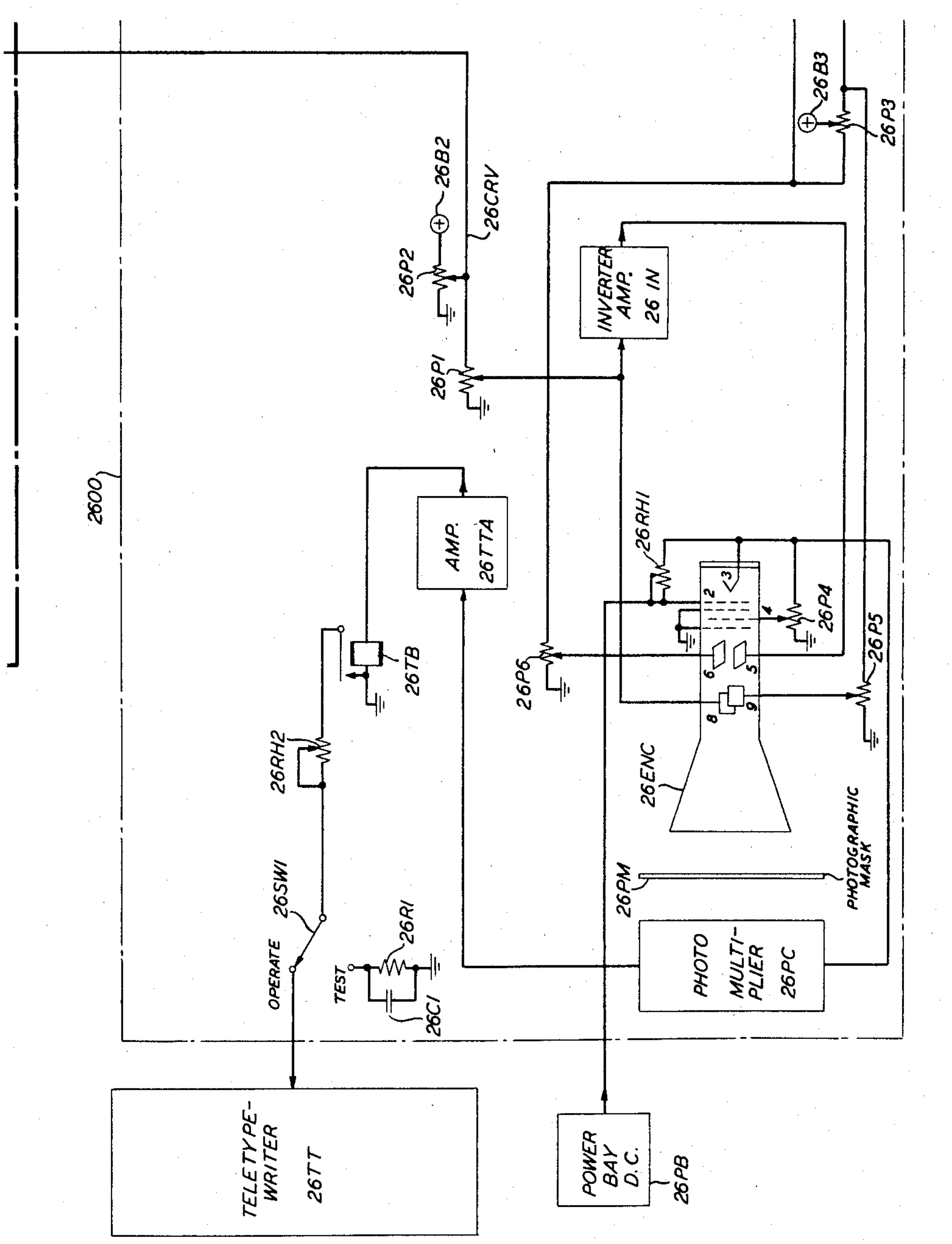
Figs. 26–28 illustrate the teletypewriter and print program circuit of the automatic data reader.
Figure 27:
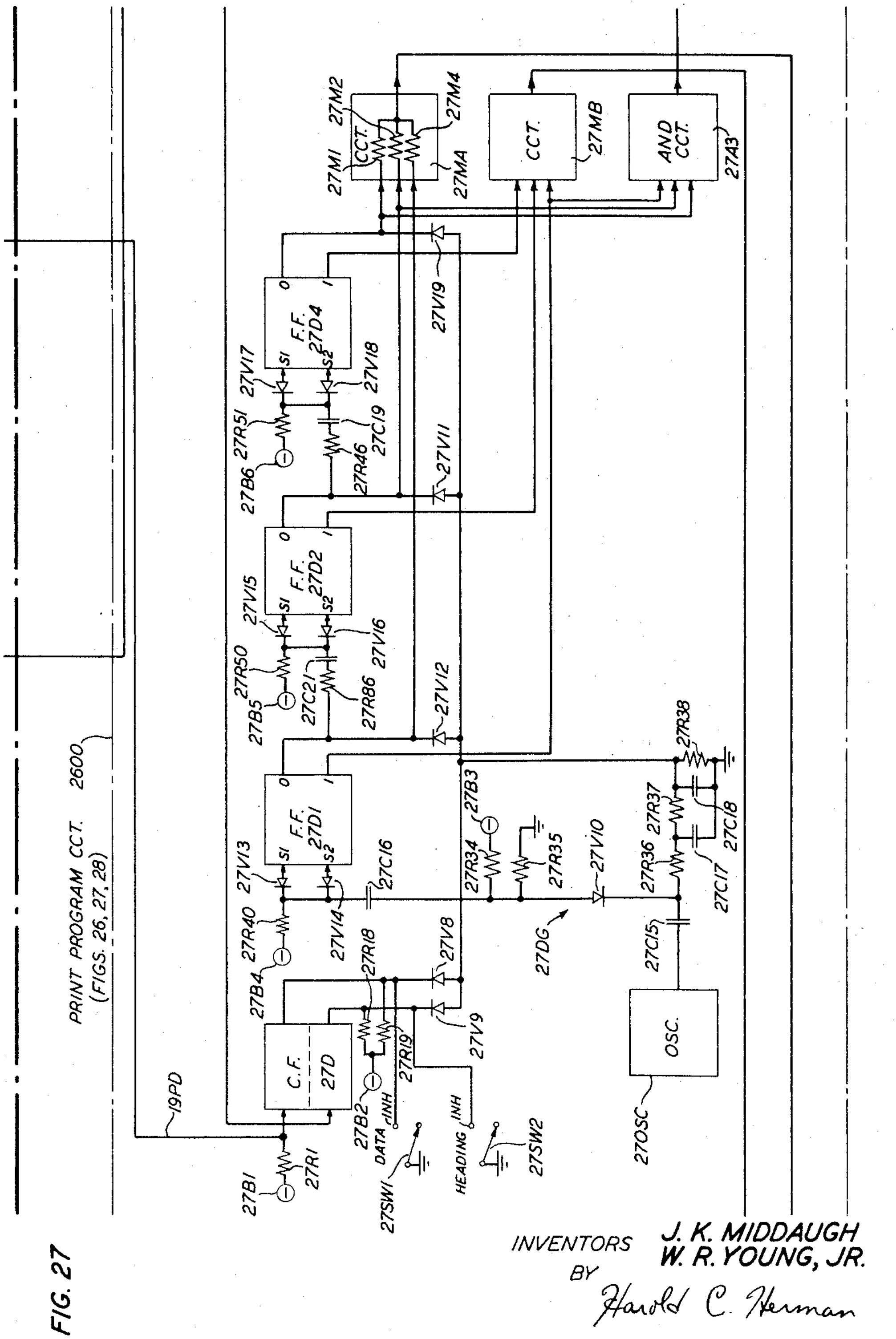
Figure 28:
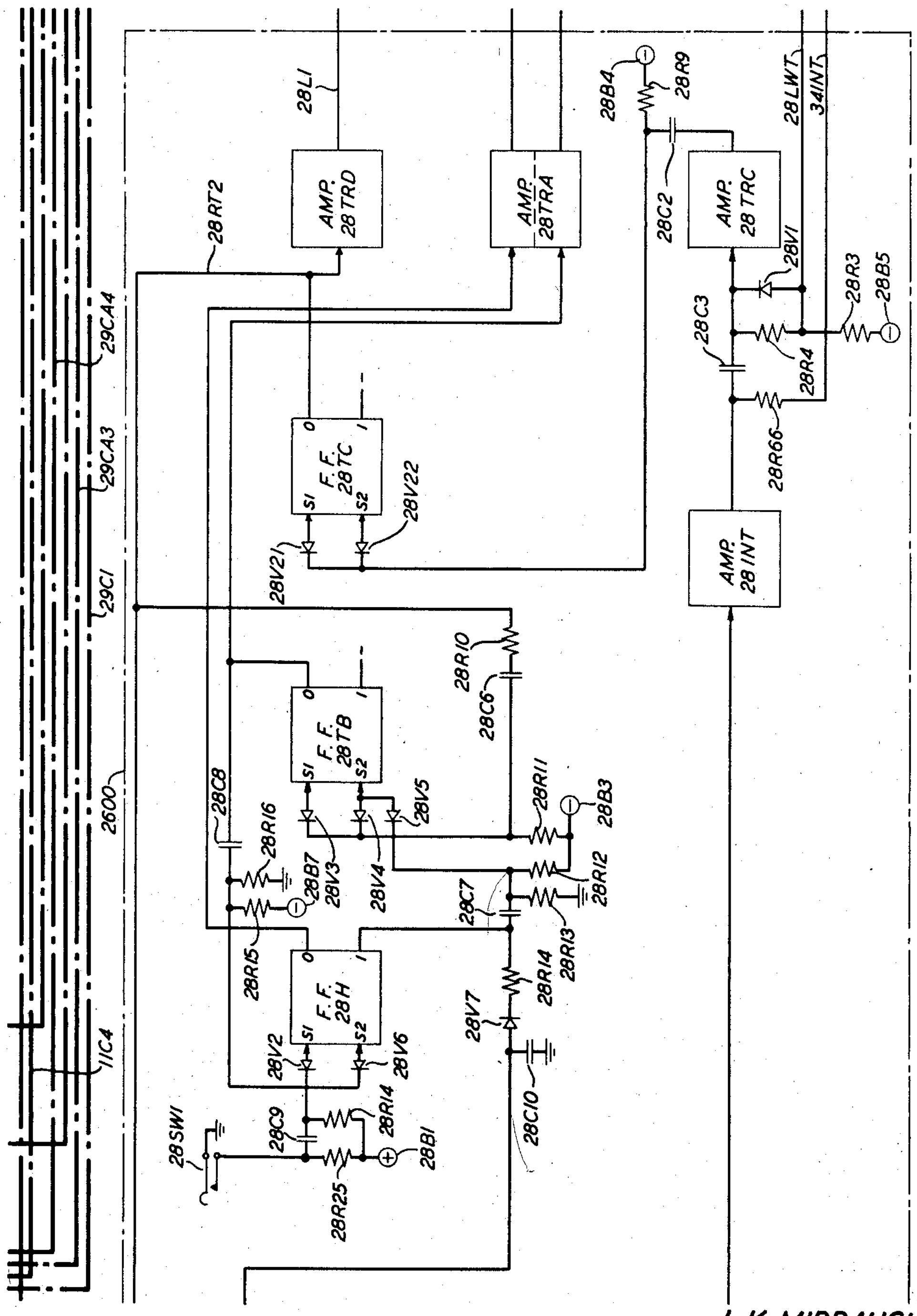
Figure 29:
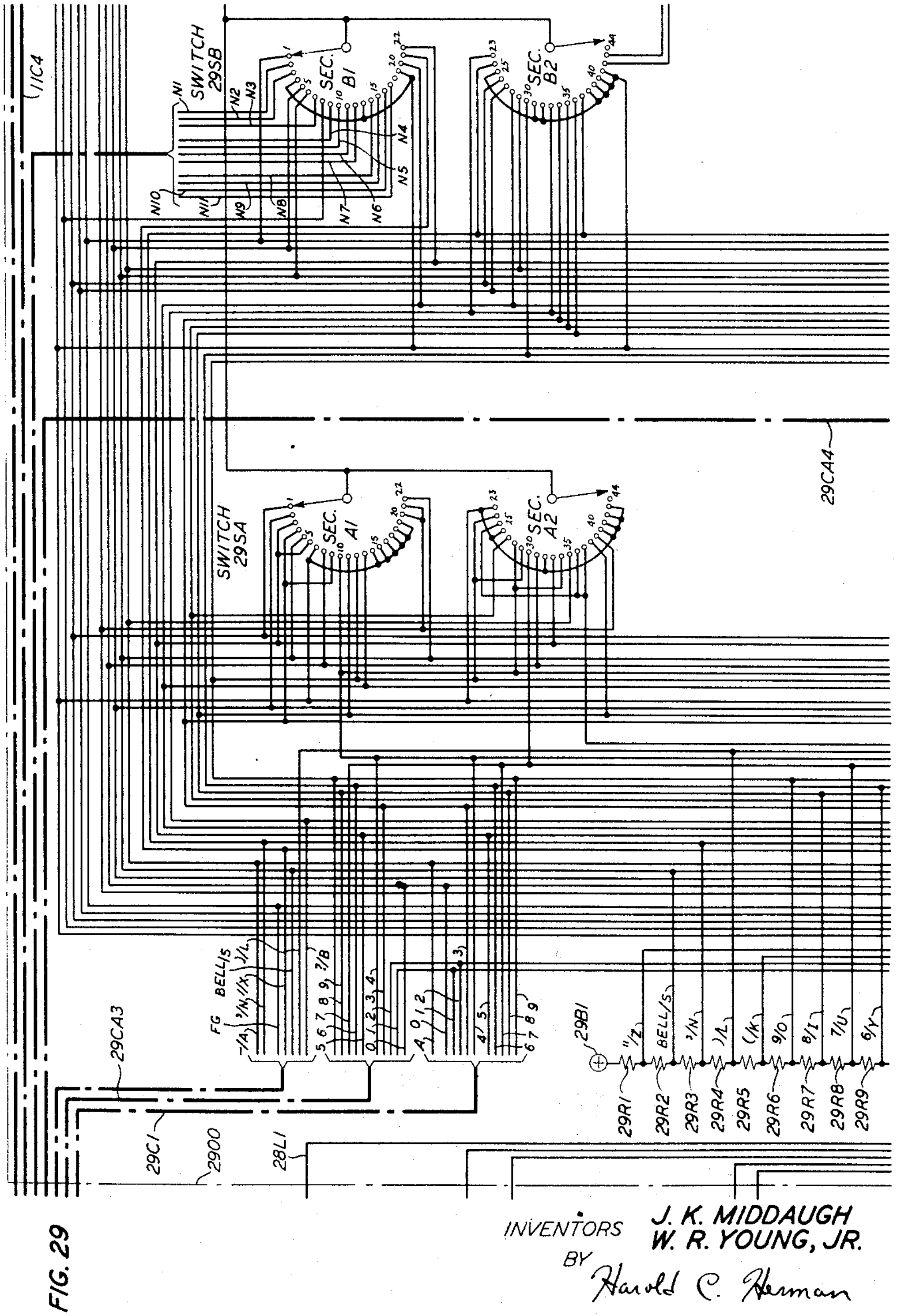
Figs. 29–31 and 34–36 illustrate the print selector of the automatic data reader.
Figure 30:
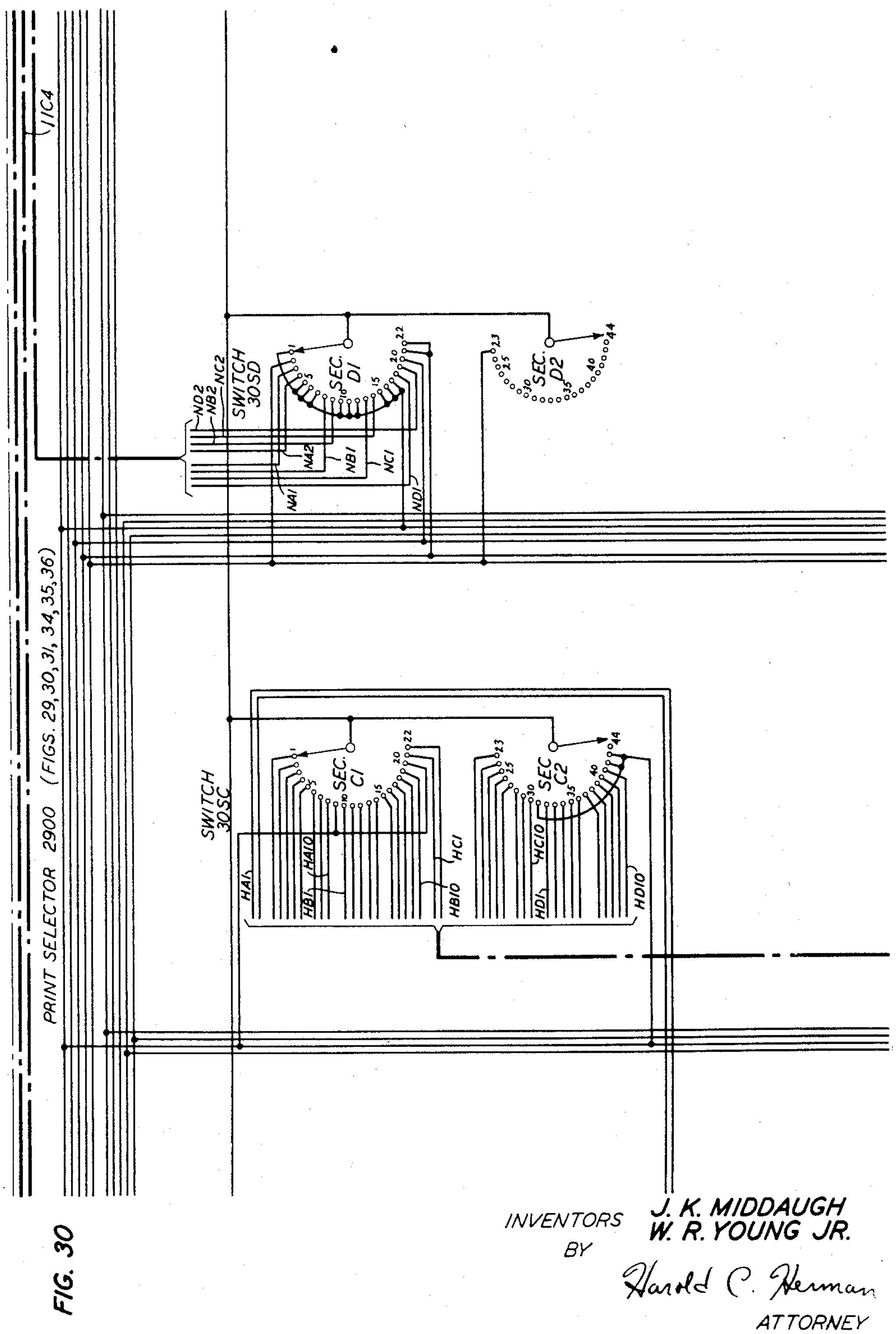
Figure 31:
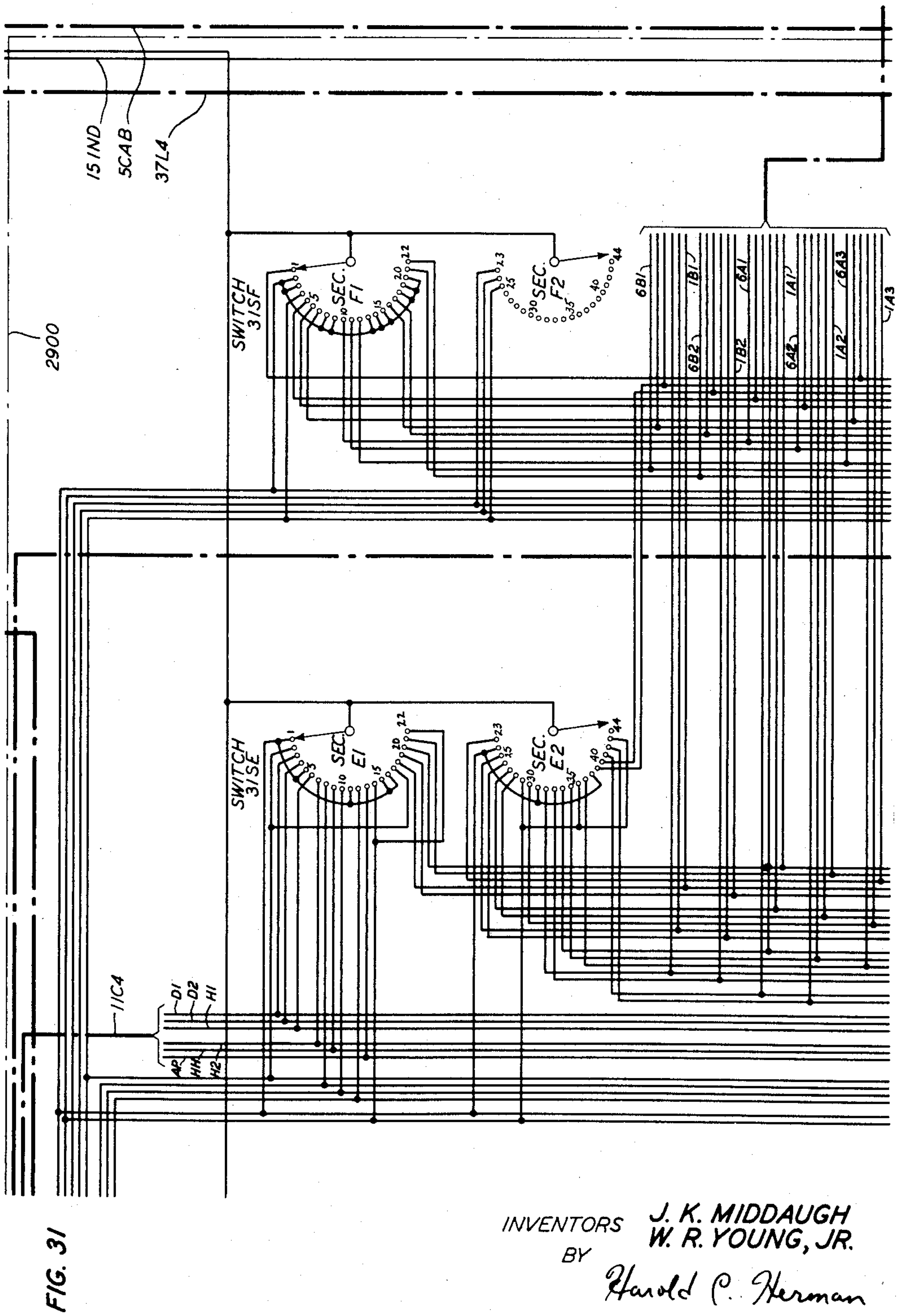
Figure 32:
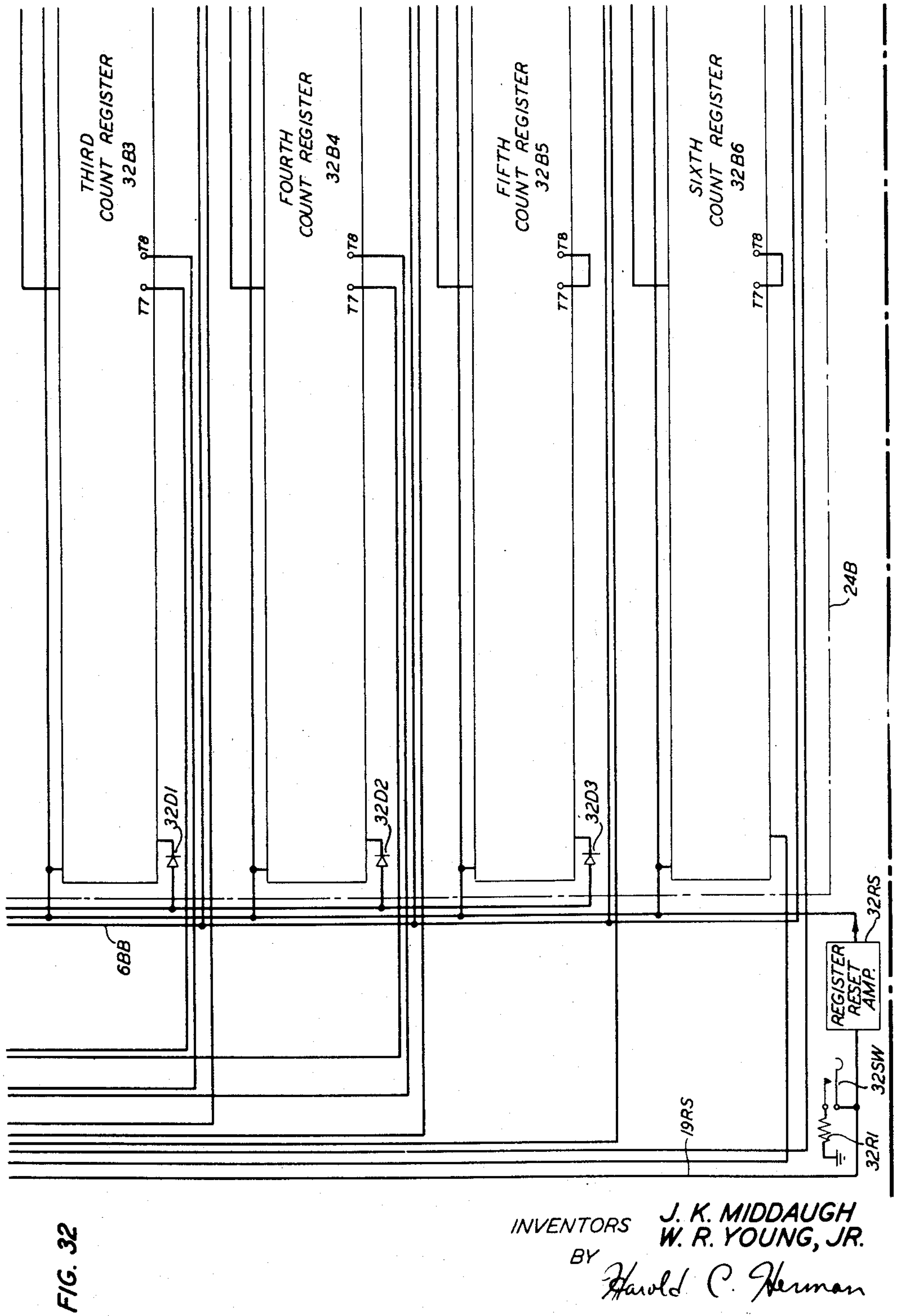
Figure 33:
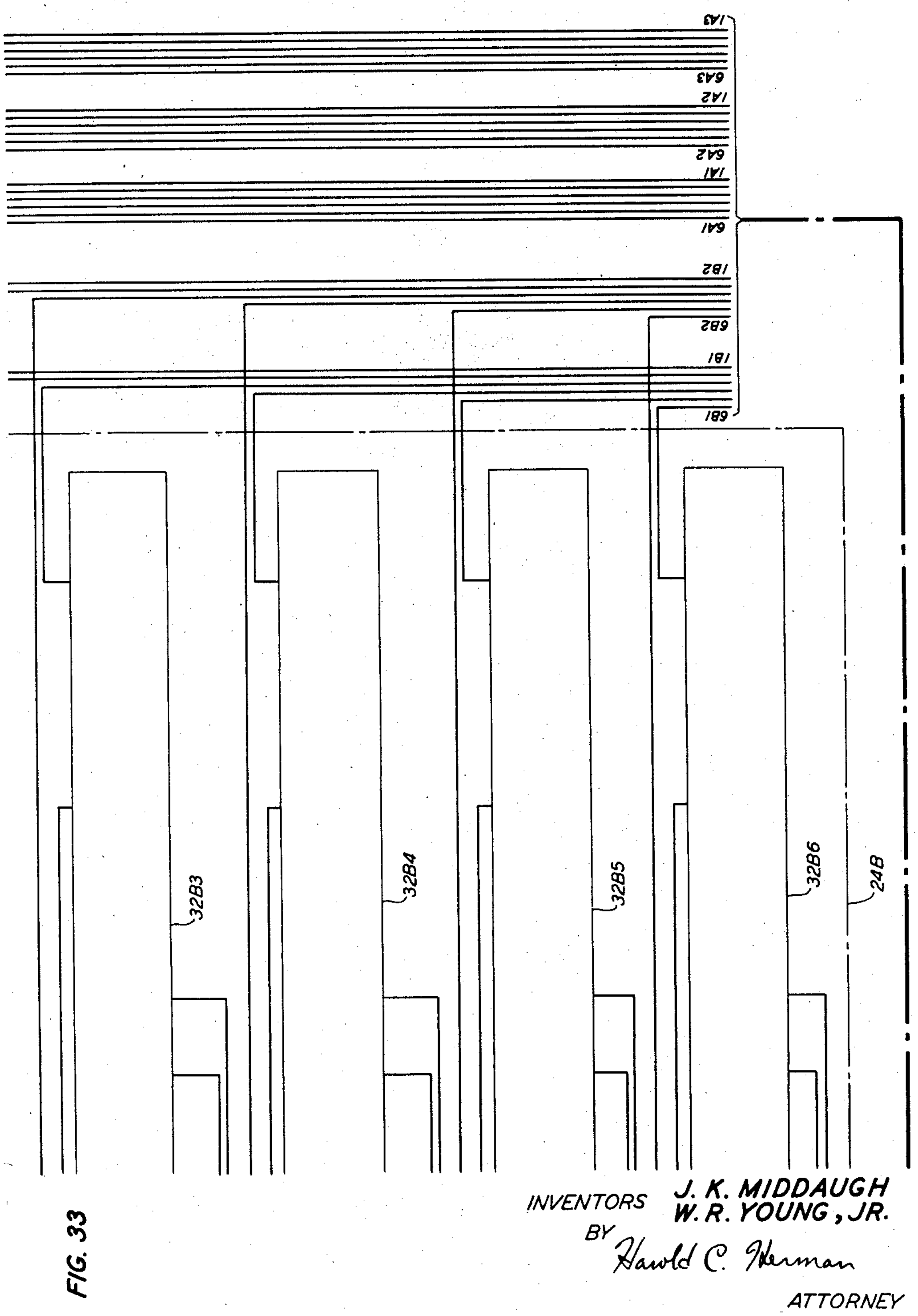
Figure 34:
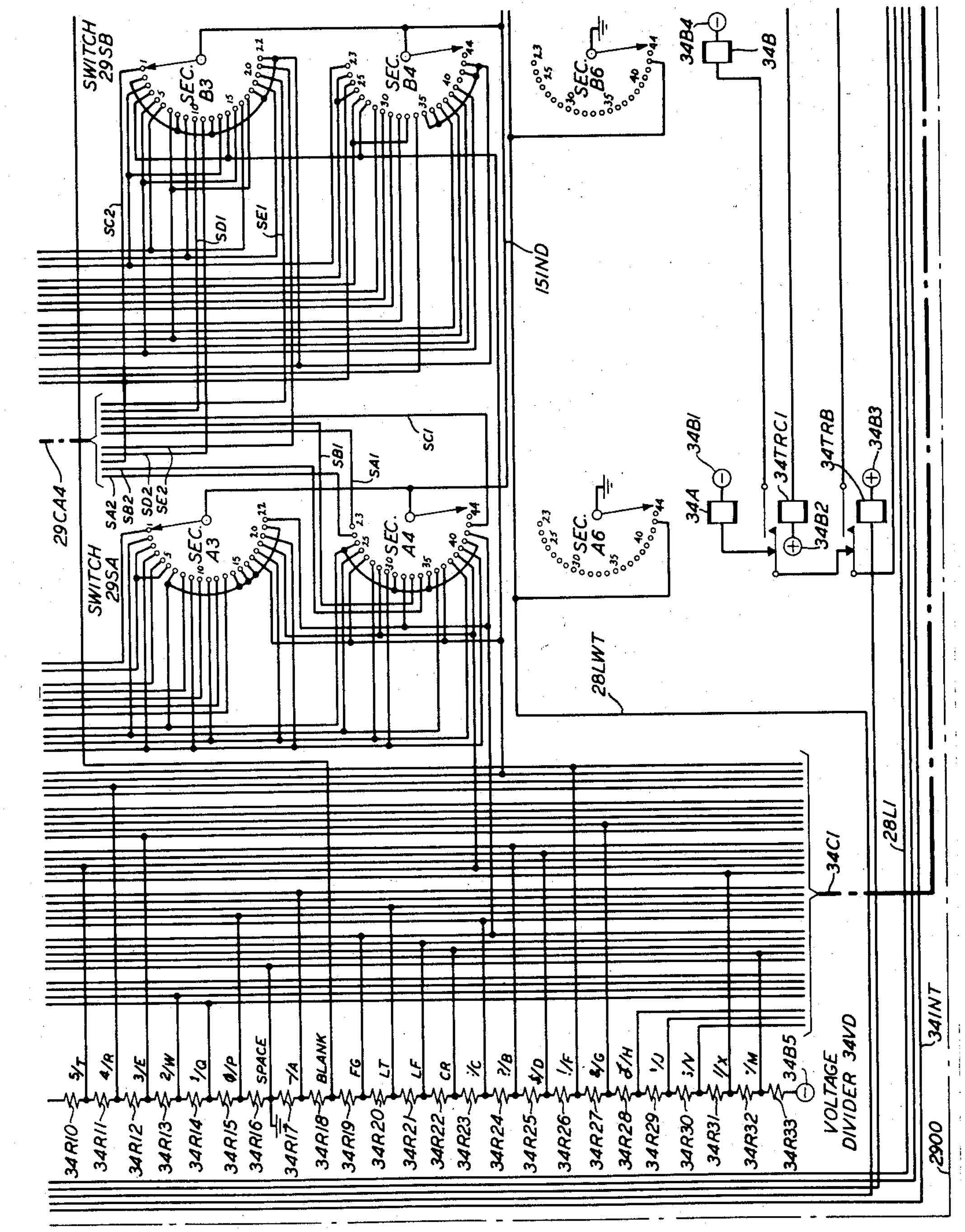
Figure 35:
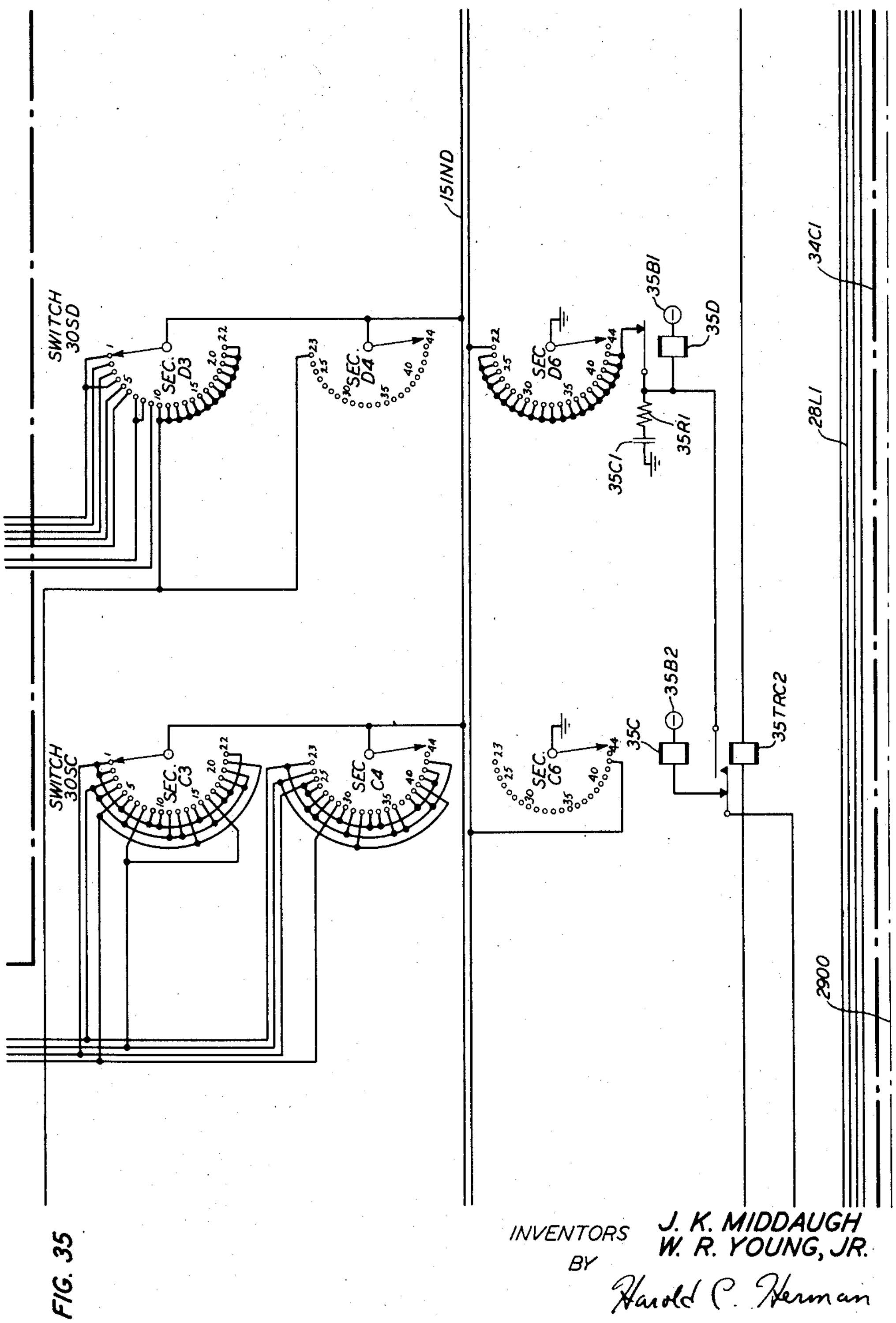
Figure 36:
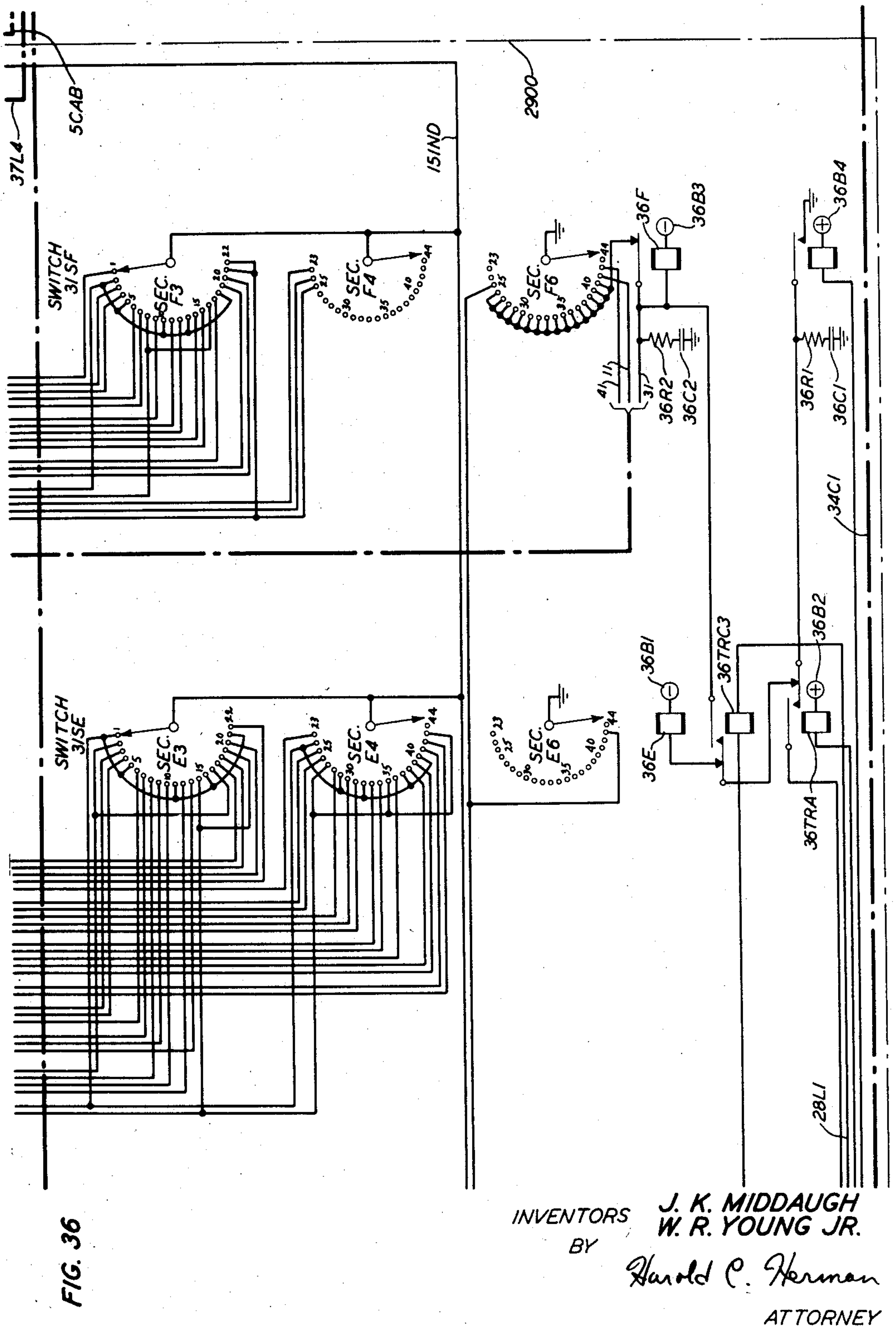
Figure 37:
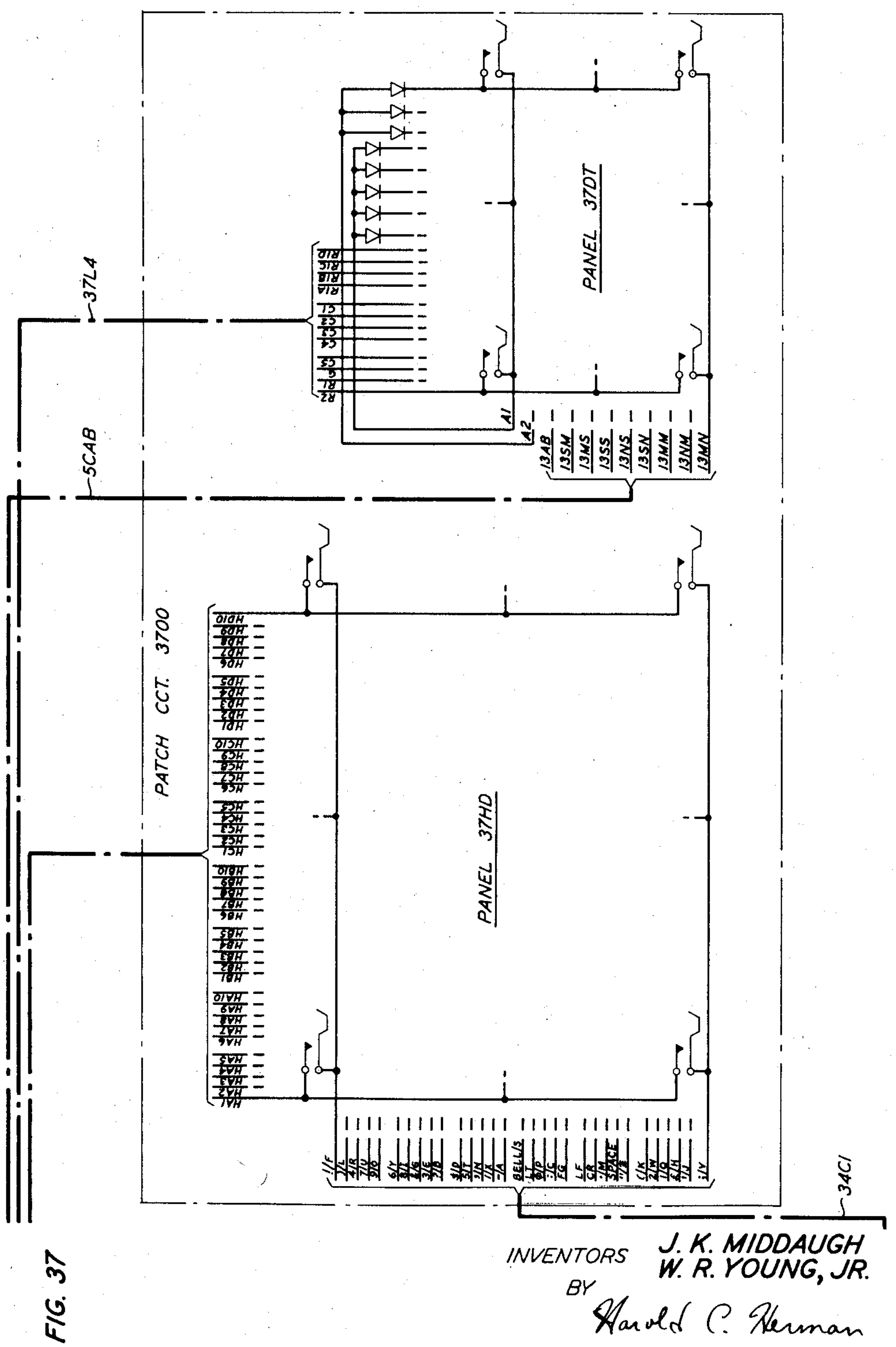
Fig. 37 illustrates the patch circuit of the automatic data reader.

When the reset key or switch 11RS in circuit 1000 is operated, it resets an hour counter 11HC which times the recording session during which the traffic information was recorded on tape 201. More specifically, when the reset switch 11RS is operated, it connects battery 11B1 through the resistor 11R5 and the varistor 11D2 to the reset terminal R of the stepper 11HRT, and from resistor 11R5 also through the varistor 11D3 to the reset terminal R of the stepper 11HRU. The reset terminals R of the steppers 11HRU and 11HRT are also connected respectively through the serially connected varistor 11D1 and resistor 11R1 to ground, and through the serially connected varistor 11D2 and resistor 11R2 to ground. The steppers 11HRT and 11HRU are counting circuits which step, or advance, a potential successively through ten output terminals 0–9. Such circuits may comprise, for example, a cold cathode tube as described in the above-identified disclosure by W. R. Young, Jr., and also as shown in Figs. 8 and 24 herein. Each time a pulse is provided to the set terminal S of one of the steppers 11HRU and 11HRT, its output potential is stepped. When the output potential is stepped from terminal 9 to terminal 0 of the stepper 11HRU, a positive pulse is applied through the upper section of the amplifier 11AR to the input terminal S of the stepper 11HRT.

The amplifier 11AR consists of two independent amplifier sections, each having a separate input and a separate output. The dash line through the box representing the amplifier 11AR indicates the existence of two sections, and similar amplifiers are utilized throughout the automatic data reader. The two sections of an amplifier may, for example, each include one-half of a double triode. The steppers 11HRU and 11HRT, serially connected by the upper section of the amplifier 11AR, can count up to 100 because on set pulse is provided to the stepper 11HRT for each ten set pulses provided to the stepper 11HRU.

With the steppers 11HRT and 11HRU reset by the switch 11RS, an advance hour switch 11AD is operated, as indicated above, to advance the steppers 11HRU and 11HRT to indicate the time the recording session began. For example, if the first recording session commenced at 9 a.m. the advance hour switch 11AD would be operated and released nine times. When the switch 11AD is operated, battery 11B2 is connected to the lower section of the amplifier 11AR, which, in turn, is connected to the set terminal of the stepper 11HRU. After switch 11AD is operated nine times, the output potential of the stepper 11HRU is at its terminal 9 and the output potential of the stepper 11HRT remains at its terminal 0.

With the steppers 11HRU and 11HRT set to indicate the time that the first recording session commenced, the automatic data reader is ready to commence the individual line and trunk analyses. To start the actual accumulation of data, the start-stop switch 19ST, described above, is operated to its start position. When the switch 19ST is operated, it connects a control potential from an amplifier 19PR, which is controlled by a scan counter 10SC, to the motor control 2MC in the reading circuit 2RC. The control 2MC, which functions to advance the magnetic tape 201 as long as the control potential is supplied thereto, is described in detail in the above-identified disclosure by W. R. Young, Jr. The scan counter 10SC which is hereinafter described in detail, counts the number of scanning cycles during which the traffic information was sampled and recorded on tape 201. Since the traffic information is sampled at 15-second intervals, each scanning cycle represents a duration of 15 seconds. When the scan counter 10SC counts to 240, which represents 3600 seconds, or one hour of recorded information, causes the amplifier 19PR to remove the control potential from the reading circuit 2RC causing the tape 201 to stop.

The control potential is applied to the motor control 2MC in the reading circuit 2RC from the amplifier 19PR through the varistor 19D3, the start-stop switch 19ST and the amplifier 19TA. With the switch 19ST closed, the amplifier 19PR normally provides the control potential to the control 2MC. When the counter 10SC, however, counts to 240, the amplifier 19PR is operated to remove the control potential. The amplifier 19PR is connected to the counter 10SC through the resistor 18R1, shunted by capacitor 18C1, the AND circuit 18A1, the amplifier 18CFS and section 2 of the switch 18SW1. The function of the AND circuit 18A1 is hereinafter described when the scan counter 10SC is described in detail.

When the motor control 2MC is operated, it advances the magnetic tape 201 adjacent the three reading heads 2HD1–3 at a speed of 7½ inches per second. The reading heads 2HD1–3 are utilized, respectively, to read the recorded signals in the three tracks, not shown, on the magnetic tape 201. The signals on track 1 are read by the head 2HD1, the signals on track 2 are read by the head 2HD2 and the signals on track 3 are read by the head 2HD3. As described above, the signals recorded on the three tracks of the magnetic tape 201 represent the traffic conditions of a number of lines and trunks. In the illustrative example described herein each group of recorded signals represents the traffic conditions existing on 60 subscriber lines and ten trunks so that a total of 70 sets of coded signals are included in each group or sampling cycle. As indicated from an analysis of the coding shown in Fig. 44, a positive signal or a mark appears in track 1 for each of the 70 sampled lines and trunks independent of its traffic condition. The 70 positive marks on track 1 are utilized to identify the sampled lines and trunks.

The coded signals, which are read by the reading heads 2HD1–3, are provided respectively to the three double-section amplifiers 2AMP1–3 in the preamplifier 2PR. As shown in Fig. 45, the waveforms provided from the two sections of one of the amplifiers 2AMP1–3 are mirror images with each waveform including both a negative and a positive pulse for each recorded signal. When the input is positive at the output of one of the amplifier sections, it is negative at the output of the other amplifier section. The polarity of the recorded information on the tape 201 is determined by ascertaining at which amplifier section the first negative pulse is received. Such a determination is necessary because, as described above, every signal recorded on the tape 201 provides for waveforms having both positive and negative pulses. If the recorded signal is positive then the negative pulse is applied first to the upper amplifier section and if the recorded signal is negative a negative pulse is applied first to the lower amplifier section. Referring to Fig. 45, the solid curve represents the potential conditions existing at the output of the two sections of one of the amplifiers 2AMP1–3 when a positive or a mark signal is read. The dash curve represents the potential conditions existing when a negative or a space signal is read.

The three amplifiers 2AMP1–3 are connected, respectively, to the three input sections 3IN1–3 of the signal translator 300 which functions to determine the polarity of the recorded signal and to convert the recorded information into direct-current signals which are suitable for analysis. The three input sections 3IN1–3, which are identical with only the details of the input section 3IN1 being shown, determine the polarity of the recorded signals. Since each recorded signal provides for both a positive and a negative pulse, it is necessary to determine where a particular signal begins in order to determine the polarity of the signal. With the tape moving at a speed of 7½ inches per second, the time between the two pulses, due to a recorded signal, is approximately 400 microseconds whereas the time between successive signals is approximately 2.3 milliseconds. The input sections 3IN1–3 discriminate between these two durations to determine the polarity of the recorded signal.

Each group of coded signals corresponding to one sampling cycle is preceded by a number of signals which signify the beginning of a recording session. As indicated in Fig. 44, a negative signal is recorded on track 1 to indicate the beginning of a recording session.

Each of the input sections 3IN1–3 includes a normally reset flip-flop circuit 3M and a normally set flip-flop circuit 3S. As is hereinafter described, the flip-flop circuit 3M is set when a positive signal on the associated track is read, and the flip-flop circuit 3S is reset when a negative signal on the associated track is read. The change of condition of either of circuits 3M and 3S in one or more of the sections 3IN1–3 initiates the sequential operation of the multivibrators 4DEL, 4G and 4RSM which function to return the sections 3IN1–3 to normal so that the polarity of the next signals can be determined.

The flip-flop circuits 3M and 3S are similar to a number of flip-flop circuits in the automatic data reader. Each of the flip-flop circuits is a bistable trigger circuit having four terminals S1, S2, 0 and 1. If the flip-flop circuit is in its reset condition, a negative pulse at its terminal S1 or a positive pulse at its terminal S2 causes it to trigger to its set condition. If the flip-flop circuit is in its set condition, a negative pulse at its terminal S2 or a positive pulse at its terminal S1 causes it to trigger to its reset condition. When a flip-flop circuit is triggered, the potential conditions at its output terminals 0 and 1 reverse. The reset or normal potential conditions of a flip-flop circuit is minus 80 volts at its terminal 0 and 0 volt at its terminal 1.

The sequence of operations for changing the condition of the circuits 3M and 3S is the same for each of the sections 3IN1–3. Assuming that a negative signal is read by the head 2HD1, two double pulse signals illustrated in Fig. 45 by the dash curves are provided, respectively, through the two sections of the amplifier 2AMP1 to the amplifier sections of the amplifier 3AM4 in the input section 3IN1. Since the recorded signal is negative, the first negative pulse of the two waveforms induced by the head 2HD1 appears at the input of the lower section of the amplifier 3AM4.

The upper and lower sections of the amplifier 3AM4 normally have an output potential of minus 80 volts which changes to 0 volt when a negative pulse is applied thereto. The sections of the amplifier 3AM4 are connected respectively to the sections of a cathode follower 3K1 which are in turn connected respectively to the input terminals 1 of the AND circuits 3A1 and 3A2. When the potential at the input of the lower section of the cathode follower 3KF1 increases, its output potential changes from minus 80 volts to plus 2 volts.

The AND circuits 3A1 and 3A2 have three input terminals 1–3 and one output terminal. A positive pulse is provided through an output terminal when all three corresponding input terminals 1–3 are returned to a small positive potential. The potential at the input terminal 2 of the AND circuit 3A2 is at plus 2-volt potential due to its connection to the upper section of the cathode follower 3KF2 which is in turn connected to the output terminal 1 of the flip-flop circuit 3M. As described above, the flip-flop circuit 3M is normally in its reset condition with minus 80 volts at its terminal 0 and 0 volt at its terminal 1. With the flip-flop circuit 3M in its reset condition, the potential at the input of the upper section of the cathode follower 3KF2 is 0 volt so that a plus 2-volt potential is provided therefrom to the input terminal 2 of the AND circuit 3A2. In a similar manner, terminal 2 of the AND circuit 3A1 is at a plus 2-volt potential because of the connection of the terminal 0 of the set circuit 3S to the lower section of the cathode follower 3KF2 which is in turn connected to terminal 2 of the circuit 3A1.

The input terminals 3 of the AND circuits 3A1 and 3A2 are connected to the lower section of a cathode follower 4KF3 and the lower section of the cathode follower 4KF3 is connected to the output terminal 1 of the multivibrator 4G. The multivibrator 4G is one of the three monostable trigger circuits or multivibrators 4DEL, 4G and 4RSM which, as described above, are sequentially operated when the condition of either of the circuits 3M or 3S in one or more of the sections 3IN1–3 is changed. Each of the multivibrators 4DEL, 4G and 4RSM is a monostable trigger circuit which triggers when a negative pulse is provided to its single input terminal to temporarily reverse the potential conditions at its terminals 0 and 1. Normally the potential at the multivibrator output terminal 0 is minus 80 volts and the potential at the multivibrator output terminal 1 is 0 volt. With the multivibrator 4G normal, a potential of 0 volt appears at the input of the lower section of the cathode follower 4KF3, and the output potential therefrom is plus 2 volts. Each of the three input terminals 1, 2 and 3 of the AND circuit 3A2 is therefore at a potential of plus 2 volts so that the AND circuit 3A2 is enabled to provide a positive pulse to the upper section of the amplifier 3AS5. The AND circuit 3A1 remains disabled as the AND circuit 3A2 becomes enabled because, as shown in Fig. 45, the first pulse of the signal provided to the upper section of the amplifier 3AM4 is positive when the recorded signal is negative. A positive or enabling pulse is therefore not provided at the terminal 1 of the AND circuit 3A1 which remains disabled.

The positive pulse to the upper section of the amplifier 3AS5 causes it to supply a negative pulse to terminals S2 and 0 of the flip-flop circuit 3S causing it to reset. The negative pulse is supplied from the upper section of the amplifier 3AS5 directly to terminal 0, and through the capacitor 3C2, which is also connected to ground through the resistor 3R2 to the terminal S2. The capacitor 3C2 functions to return the circuit 3S to its set condition after a substantial duration if it is not set in the normal operating sequence. The capacitor 3C2 in this manner insures the return of the circuit 3S to its normal condition. When the flip-flop circuit 3S is reset or turned off, the potential at terminal 0 changes to minus 80 volts and the potential at terminal 1 changes to 0 volt. When the output potential conditions change in this manner the following functions are performed:

(1) The AND circuit 3A1 is further disabled because the potential at the input of the lower section of the cathode follower 3KF2 changes from plus 0 volt to minus 80 volts. The output potential of the lower section of the cathode follower 3KF2 correspondingly changes to minus 80 volts which functions as a disabling potential at terminal 2 of circuit 3A1. When the second pulse due to the negative signal on track 1 of the tape is received through the upper sections of the amplifier 3AM4 and cathode follower 3KF1, it is blocked at the AND circuit 3A1 due to the disabling potential provided by the flip-flop circuit 3S through the cathode follower 3KF2;

(2) The steppers 12ST and 13ST are reset. The 80-volt positive pulse from terminal 1 of the flip-flop circuit 3S is coupled through the lower section of the cathode follower 4CF2 to the lower section of the amplifier 12MS. When the positive pulse is received at the lower section of the amplifier 12M it supplies a reset pulse to the reset terminals R of the steppers 12ST and 13ST. The reset pulse to the stepper 12ST is through the capacitor 12C3 which is shunted to ground through the varistor 12D1 and the resistor 12R1. The reset pulse to the stepper 13ST is through the capacitor 12C2 and varistor 13D1. The varistor 13D1 is also connected to ground through the serially connected varistor 13D2 and resistor 13R1. The stepper 13ST, which is similar to the steppers 11HRU and 11HRT described above, supplies a positive output potential at its terminal 0 when it is reset. The stepper 12ST has the designation of its terminals shifted over one position so that a positive output potential is provided at its terminal 9 instead of its terminal 0 when it is reset. The first pulse to its step terminal S steps the output potential to its terminal 0. The stepper 12ST is otherwise similar to the steppers 13ST, 11HRU and 11HRT. The stepper 12ST is modified in this manner because the first line for which traffic information is recorded is designated 00 not 01; and (3) The multivibrator 4DEL is operated for a duration of 200 microseconds. The potential at the input terminal of the lower section of a cathode follower 4CF1 changes from 0 volt to minus 80 volts due to its connection to terminal 0 of circuit 3S. The potential at the output of the lower section of the cathode follower 4CF1 changes correspondingly to minus 80 volts.

The minus 80-volt negative output potential is provided from the lower section of the cathode follower 4CF1 to the time and scan program circuit 1000, and also through an OR circuit 40R, a capacitor 4C1 and varistor 4D1 to trigger the multivibrator 4DEL. The junction between the varistor 4D1 and capacitor 4C1 is connected to the negative biasing source 4B1 through the varistor 4D2. The operating duration of the multivibrator 4DEL is adjustable by the rheostat 4RH1 which is connected between the multivibrator input and ground.

The negative potential does not perform a function in circuit 1000 because switch 11SW5 is set at its position C0. Terminal C0 is connected through varistor 11D5 to the output of the upper section of the cathode follower 4CF1 whereas terminal G is connected respectively through varistors 10D6 and 10D7 to the output of both sections of the cathode follower 4CF1. With the switch 11SW5 set at position C0, only negative potentials at the upper section of the cathode follower 4CF1 are provided through switch 11SW5. As hereinafter described, a minus 80-volt potential is provided from the upper section of the cathode follower 4CF1 when a positive signal is read in track 1 of the tape 201.

The output terminal 1 of the multivibrator 4DEL is connected through a capacitor 4C2 and a varistor 4D3 to the multivibrator 4G. The junction of capacitor 4C2 and varistor 4D3 is connected to battery 4B2 through the varistor 4D4 which is shunted by the capacitor 4C3. When the multivibrator 4G is triggered, it generates a minus 80-volt pulse at its terminal 1 and a positive 80-volt pulse at its terminal 0 for a duration of approximately 1 millisecond. The operating duration of the multivibrator 4G is adjustable by the rheostat 4RH2 which is connected between the multivibrator input and ground. As described above, the output terminal 1 of the multivibrator 4G is connected to the input of the lower section of the cathode follower 4KF3. The negative pulse to the lower section of the cathode follower 4KF3 causes its output potential to decrease to minus 80 volts.

The negative pulse provided from the lower section of the cathode follower 4KF3 disables both AND circuits 3A1 and 3A2 because of its connection to their input terminals 3. The AND circuits 3A1 and 3A2 remain disabled for the 1 millisecond trigger duration of the multivibrator 4G. The disablement of the AND circuits 3A1 and 3A2 due to the operation of the multivibrator 4G minimizes spurious operation of the circuit 300 due to noise interference and prevents a change of condition of the circuit 3M due to the second pulse of the waveform shown in Fig. 45.

When the multivibrator 4G is triggered, it also supplies a plus 80-volt pulse from its terminal 0 through lead 5GP to the circuit 1200 and it triggers the multivibrator 5RSM. In the circuit 1200 the positive pulse is provided through the resistor 15R1, which is connected to battery 15B1 through resistor 15R2, terminals 2 and 3 of section 5 of switch 15G1 to the multipled terminals 2 of the AND circuits 14A1–5. The AND circuits 14A1–5 are disabled at this time so that the positive pulse from the multivibrator 4G does not perform a function. As is hereinafter described, the AND circuits 14A1–5 are selectively enabled when the coded signals representing traffic conditions on the selected lines 11, 27, 32, 40–9 and 60–9 are read.

The positive output of the multivibrator 4G is differentiated by the capacitor 4C4 and coupled through the varistor 4D6 to the multivibrator 4RSM. The junction between the capacitor 4C4 and the varistor 4D6 is connected to the biasing source 4B2 through the parallel circuit consisting of the varistor 4D9 and the capacitor 4C3. Terminal 0 of the multivibrator 4G is, in this manner, A.C. coupled to the multivibrator 4RSM and D.C. coupled to the data analysis and control circuit 1200. The negative half of the pulse is supplied from the differentiating capacitor 4C4 through the varistor 4D6 to trigger the multivibrator 4RSM. In this manner, the multivibrator 4RSM is triggered one millisecond after the multivibrator 4G is triggered, and the multivibrator 4G is triggered 200 microseconds after the multivibrator 4DEL is triggered.

The multivibrator 4RSM operates for 200 microseconds during which time it provides a positive potential from its terminal 0 to the upper section of the cathode follower 4KF3. The positive pulse through the upper section of the cathode follower 4KF3 is supplied to the lower sections of the amplifiers 3AM5 and 3AS5 in each of the input sections 3IN1–3. The change in potential at the output of the lower sections of the amplifiers 3AM5 and 3AS5 returns the flip-flop circuits 3M and 3S to their original conditions with the flip-flop circuits 3M reset and the flip-flop circuits 3S set.

The negative signal on track 1 of tape 201 functions in this manner to ready the data analysis and control circuit 1200 for the accumulation sequence of the automatic data reader.

In the above discussion it was assumed that the pulse recorded is a negative signal on track 1. A similar sequence of operation occurs for any recording on the tape 201 irrespective of the track on which the signal is recorded or its polarity. Assume, for example, that a positive signal is recorded on tracks 1 and 2 and a neutral signal is recorded on track 3 for the first set of coded signals after the negative signal on track 1.

The positive signal recorded on track 1 of the tape 201 signifies that any information recorded on track 2 or 3 is a measure of line usage. As is hereinafter described, and shown in Fig. 44, if a positive signal is not present on track 1, the data recorded on tracks 2 and 3 is a measurement of the dial-tone speed. The signals recorded on track 1 also identify the subscriber line or trunk on which traffic data is being taken and are utilized to identify the time of day the measurements were made. There are nine possible combinations of no-signal, mark, or space signals on track 2 or 3 and examples of the nine combinations are tabulated in Fig. 44. The signal translator 300 first determines whether a recorded signal is positive or negative, as described above, and then decodes the information recorded on tracks 2 and 3 in a diode matrix 5DM.

When the recorded signals are positive in tracks 1 and 2 and neutral in track 3, the flip-flop circuits 3M in the input sections 3IN1 and 3IN2 are set and the circuits 3M and 3S in the section 3IN3 do not change condition. In the sections 3IN1 and 3IN2, the AND circuit 3A1 is enabled and the AND circuit 3A2 is disabled because the first negative pulse of the waveforms supplied through the amplifier 3AM4 appears at the upper section of the amplifiers 3AM4. When the AND circuit 3A1 in section 3IN1 is enabled, it provides a control potential through the upper section of the amplifier 5AM5 to terminal 1 of circuit 3M and also through the capacitor 3C1 to the terminal S1 of the flip-flop circuit 3M. Terminal S1 is also connected to ground through the resistor 3R1. The flip-flop circuit 3M is set by the control potential and provides a negative pulse through the upper section of the cathode follower 4CF1 and the OR circuit 4OR to initiate the sequential operation of the multivibrators 4DEL, 4G and 4RSM. The sequential operation of the multivibrators 4DEL, 4G and 4RSM is exactly the same independent of whether the recorded signal on track 1 is positive or negative. The 1 millisecond pulse generated by the multivibrator 4G, however, is now also utilized to operate the diode matrix 5DM which translates or decodes the information recorded on tracks 2 and 3.

The minus 80-volt negative pulse from the upper section of the cathode follower 4CF1 is also provided to the time and scan program circuit 1000 and to the data analysis and control circuit 1200. Whenever a positive signal appears on track 1 of the tape 201 the minus 80-volt signal is applied from the upper section of the cathode follower 4CF1 to the time and scan program circuit 1000. The negative signal from the translator 300 passes through the varistor 10D5 and the switch 11SW5 to a multivibrator 10MV. The negative signals are supplied from the signal translator 300 every 3½ milliseconds during the sampling cycle with the duration of 50 to 100 milliseconds occurring between cycles. When the multivibrator 10MV is triggered by the first negative pulse through switch 11SW5 from the signal translator 300, it provides a control potential to the amplifier 10SA1 and to the data analysis and control circuit 1200 for a duration of 6 milliseconds. Since the operating period of the multivibrator 10MV is greater than the duration between pulses of the same sampling cycle, it remains operated throughout the sampling cycle.

The amplifier 10SA1 is part of the scan counter 10SC, briefly described above, which includes the three steppers 10SCU, 10SCT and 10SCH. The steppers 10SCU, 10SCT and 10SCH are similar to the steppers 11HRU and 11HRT described above. When the negative pulse is received at the amplifier 10S1, it provides a positive pulse to the step terminal S of the stepper 10SCU. When the positive pulse is provided from the amplifier 10SA1 to the set terminal of the stepper 10SCU, it steps the output potential from its terminal 0 its terminal 1. Each operate and release cycle of the multivibrator 10MV causes the stepper 10SCU to advance its output potential one step. The stepper 10SCU in this manner counts the number of scanning cycles read by the automatic data reader.

The output terminal 9 of the stepper 10SCU is coupled through the upper section of an amplifier 10SA2 to the set terminal S of the stepper 10SCT, and the output terminal 9 of the stepper 10SCT is coupled through the lower section of the amplifier 10SA2 to the set terminal S of the stepper 10SCH. The three steppers 10SCU, 10SCT and 10SCH are in this manner serially connected by the sections of the amplifier 10SA2 to form a three-stage decade counter. As is hereinafter described, when the counter 10SC reaches a count of 240, it stops the motor control 2MC and initiates the operation of the print program circuit 2600. A count of 240 represents a duration of one hour because the sampling cycles are taken at 15-second intervals so that the multivibrator 10MV operates and releases once for each 15 seconds of traffic information.

As described above, every positive signal on track 1 of the tape 201 causes the signal translator 300 to provide a negative control pulse to the time and scan program circuit 1000 and also to the data analysis and control circuit 1200. The output of the upper section of the cathode follower 4CF1, in addition to being connected to the circuit 1000, as described above, is also connected to the upper section of the amplifier 12MS in the circuit 1200. The output of the upper section of the amplifier 12MS is connected to the step terminal S of the stepper 12ST so that the stepper 12ST advances one step for each positive or mark signal on track 1 of the tape 201. As described above, the first pulse to the stepper 12ST causes it to step its output potential from terminal 9 to terminal 0. Such a circuit arrangement is utilized because the first line is identified 00. When the stepper 12ST steps its output potential from its terminal 9 to its terminal 0, it provides a step potential through the capacitor 12C1 and the amplifier 12STA to the stepper 13ST. The two steppers 12ST and 13ST are serially connected in this manner by the amplifier 12STA to form a two-stage decade counter which counts the positive signals on track 1 of the tape 201.

In the illustrative example being described a positive signal is recorded on tracks 1 and 2 and no signal is recorded on track 3 of the tape 201 for the line 00. When the positive signal on track 2 is read, the flip-flop circuit 3M in the input section 3IN2 is set and the flip-flop circuits 3M and 3S in the section 3IN3 do not change condition.

When the circuit 3M in the section 3IN2 is set, a negative potential is coupled through the upper section of the cathode follower 4CF3 and lead 4M2 to the diode matrix 5DM. The cathode followers 4CF3–5 connect the sections 3IN2–3 to the diode matrix 5DM.

There are six leads 4M2, 4S2, 4N2, 4M3, 4S3 and 4N3 which connect, respectively, the sections of the cathode followers 4CF3–5 to the diode matrix 5DM. A negative pulse is applied to only two of the leads 4M2, 4S2, 4N2, 4M3, 4S3 and 4N3. Each of the sections 3IN2–3 provides for one of the two pulses to the matrix 4DM, which pulse indicates whether a mark, space or neutral signal was read. For the example being described, the section 3IN2 provides for a negative pulse on lead 4M2 to indicate a positive signal or mark is being read, and the section 3IN3 provides for a negative pulse on lead 4N3 to indicate that a neutral or no signal is being read. The section 3IN3 provides for a negative pulse on lead 4N3 because its terminals 2 and 4 are connected to the enabled AND circuit 4A1, and the circuit 4A1 is coupled through the upper section of the cathode follower 4CF4 to lead 4N3. In each of the sections 3IN1–3 the terminals 2 and 4 are connected, respectively, to the terminal 0 of the circuit 3M and to the terminal 1 of the circuit 3S. The AND circuits 4A1 and 4A2 are normally enabled providing for negative potentials on leads 4N2 and 4N3. When the circuit 3S in the section 3IN2 is reset, it disables the AND circuit 4A1. The AND circuit 3A2 continues to supply a negative potential through the upper section of the cathode follower 4CF4 because the condition of circuits 3M and 3S in section 3IN3 is not changed.

The diode matrix 5DM includes thirty diodes 5D1–30 which are utilized to translate the pulses from the sections 3IN2–3 through the cathode followers 4CF3–5 to a one-out-of-nine output signal.

The diodes or varistors 5D1–24 are arranged so that groups of three diodes form an AND circuit. The varistors in each AND circuit are arranged vertically and there are eight such arrangements. For example, the varistors 5D1–3 form an AND circuit, the varistors 5D4–6 form an AND circuit, etc. Only one of the AND circuits in the matrix 5DM is enabled when the coded signals corresponding to any line are read. The sections 3IN2–3 function to enable two of the three varistors in the AND circuit and the multivibrator 4G, as is hereinafter described, functions to enable the third varistor. There are only eight AND circuits for the nine possible combinations of signals on tracks 2 and 3 of tape 201 because a signal is not provided from the matrix 5DM if a neutral signal is read on both tracks 2 and 3.

In the specific example being described, the positive signal on track 2 and the neutral signal on track 3 provide for a negative enabling potential to leads 4M2 and 4N3. The leads 4M2, 4S2, 4N2, 4M3, 4S3 and 4N3 are selectively connected to the diodes 5D1–24 of the eight AND circuits in the matrix 4DM. The lead 4M2 is connected to the diodes 5D1, 5D7 and 5D19 and the lead 4N3 is connected to the diodes 5D2 and 5D11. An enabling potential is in this manner provided to the diodes 5D1 and 5D2 in the AND circuit consisting of the diodes 5D1–3.

An enabling potential is provided to the diode 5D3 by the multivibrator 4G. As described above, when the multivibrator 4G is operated, a 1 millisecond negative pulse is provided from its output terminal 1 to the lower section of the cathode follower 4KF3. The output terminal 1 of the multivibrator 4G is also connected to the input terminal 1 of the AND circuit 5A1. The AND circuit 5A1 which has three input terminals 1–3, is enabled because an enabling potential is provided to its terminal 2 from the upper section of the cathode follower 4CF1 through the switch 12SW1 as long as the circuit 3S in section 3IN1 remains reset and an enabling potential normally exists at its terminal 3. If a positive signal does not appear on track 1 of the tape 201, or if the switch 12SW1 is set to its position NM, the circuit 5A1 remains disabled. The negative pulse from the multivibrator 4G passes therefore through the enabled AND circuit 5A1 to the diode matrix 4DM.

The output of the AND circuit 5A1 is connected to the switch 15GI in circuit 1200 and also through the cathode follower 5GM to each of the eight AND circuits in the diode matrix 5DM. With the switch 15GI set at its individual position, as shown, the negative pulse does not perform a function.

The switch 12SW1 controls the operation of the diode matrix 5DM because if it is set to its position NM, the AND circuit 5A1 remains disabled so that all eight AND circuits in the matrix 5DM also remain disabled. In the matrix 5DM the negative pulse from the cathode follower 5GM is provided to the varistors 5D3, 5D6, 5D9, 5D12, 5D15, 5D18, 5D21 and 5D24 of the eight AND circuits and so to the varistor 5D30. The only AND circuit having all three varistors enabled is the AND circuit consisting of the varistors 5D1–3. A negative pulse is therefore provided from the AND circuit consisting of varistors 5D1–3 through the cathode follower 5MN and lead 13MN through cable 5CAB to the patch circuit 3700 as a 1 millisecond negative pulse having an amplitude of minus 20 volts. The particular combination of input signals to the diode matrix 5DM results in the output on lead 13MN so that the identification of the input signal combination is discrete. In each of the other eight AND circuits at least one diode remains disabled with its plate being connected to approximately ground potential. For example, the AND circuit consisting of the varistors 5D7–9 is disabled because the plate of varistor 5D8 is held at approximately 0 potential. The eight AND circuits in the matrix 5DM are connected respectively through the eight cathode follows 5MN, 5NM, 5MM, 5SN, 5NS, 5SS, 5MS and 5SM and eight leads 13MN, 13NM, 13MM, 13SN, 13NS, 13SS, 13MS and 13SM through cable 5CAB to the panel 37DT in the patch circuit 3700. With only one of the AND circuits enabled the signal translator 300 generates a minus 20-volt, 1 millisecond pulse through only one of eight output leads 13MN, 13NM, 13MM, 13SN, 13NS, 13SS, 13MS and 13SM to the patch circuit 3700 where it is selected for analysis.

As described above, the negative pulse which is supplied to the eight AND circuits in the matrix 5DM from the cathode follower 5GM, is also supplied to a varistor 5D30. The varistor 5D30 together with a varistor 5D29 form an AND circuit which is connected through a cathode follower 5AB and lead 13AB to the patch circuit 3700. The potential at the varistor 5D29 is controlled by an OR circuit consisting of the varistors 5D25–28. If a positive or a negative signal is read in either track 2 or track 3 an enabling pulse is provided through the OR circuit to varistor 5D29. An enabling pulse is provided in this manner because the sections of the cathode followers 4CF3 and 4CF5 are connected respectively to the varistors 5D25–28 as well as to the eight AND circuits in the matrix 5DM.

In this manner whenever a positive or a negative signal is read on track 2 or 3 of the tape 201 a negative pulse appears on lead 13AB and on one of the eight leads 13MN, 13NM, 13MM, 13SN, 13NS, 13SS, 13MS and 13SM.

The OR circuit consisting of the varistors 5D25–28 also provides a pulse to terminal 1 of the OR circuit 4OR. The pulse through the OR circuit 4OR only slightly lengthens the operating duration of the multivibrators 5DEL, 5G and 5RSM. When, however, dial-tone speed coded signals are analyzed, as is hereinafter described, the pulse through the circuit 4OR functions to initiate the successive operation of the multivibrators 4DEL, 4G and 4RSM.

In the patch circuit 3700, the pulse on lead 13AB passes through the panel 37DT but the pulse on lead 13MN does not pass through the panel 37DT. The panel 37DT is an eleven by twenty manual crossbar switch in which a connection can manually be established from any of the eleven horizontals to any one of the twenty verticals. As described above in the listing of switch settings, the crosspoints connecting lead 13AB to leads C1–5 are closed. The pulse through lead 13AB to the panel 37DT is provided therefor to the five verticals or leads C1–5 which are connected respectively through cable 14CA1 to the circuits 14G1–5 in the data analysis and control circuit 1200. The pulse on lead 13MN does not pass through the panel 37DT because none of the crosspoints connected to lead 13MN is closed. The panel 37DT also includes eight varistors 37V1–8 which are arranged as two AND circuits: the varistors 37V1–3 form one AND circuit and the varistors 37V4–8 form a second AND circuit. The two AND circuits, which are connected respectively to the horizontal leads A1 and A2, are utilized when a number of different coded signals are to be accumulated for one line. In the example being described only the signals through lead 13AB are considered so that the AND circuits are not utilized.

The circuits 14G1–5 each includes an AND circuit 14AG which has its input terminal 2 connected to its associated one of the leads C1–5. The potentials at the terminals 1 of the circuits 14A6 are controlled by the steppers 12ST and 13ST and the switches 12UA–E and 13TA–E described above.

The output terminals 0–9 of the stepper 12ST are multipled to the terminals 0–9 of the sections 1 of the units switches 12UA–E, and the output terminals 0–9 of the stepper 13ST are multipled to the terminals 0–9 of sections 1 of the tens switches 13TA–E. Each of the sections 1 of the switches 12UA–E and 13TA–E provides for one conductive path from the steppers 12ST and 13ST to the five double section cathode followers 14S1–5. Sections 1 of the switches 12UA and 13TA for example, are connected respectively to the upper and lower sections of the cathode follower 14S1. Each pair of units and tens switches provides for connections from the steppers 12ST and 13ST to one of the cathode followers 14S1–5. The settings of the switches 12UA–E and 13TA–E determine when the positive potentials at the output terminals 0–9 of the steppers 12ST and 13ST are to be connected to the cathode followers 14S1–5. As described above, the switches 12UA–E and 13TA–E are utilized to identify the lines for which the traffic data is to be accumulated and analyzed. With the switch 12UA set at position 1 and switch 13TA set at position 1, a positive potential is provided to both sections of the cathode follower 14S1 when the output potentials of the steppers 12ST and 13ST are at their output terminals 1.

The sections of the cathode followers 14S1–5 are connected respectively to the input terminals 1 and 3 of the AND circuits 14A1–5. Each of the AND circuits 14A1–5 has three input terminals 1–3, with their input terminals 2 being multipled and connected through contacts 3 and 2 of section 5 of switch 15G1, resistor 5R1 and lead 5GP to the signal translator 300. Contact or terminal 2 of section 5 of the switch 15GI is connected to the positive battery 5B1 through the resistor 5R2. The switch 15GI, which is utilized to determine whether the traffic information is to be analyzed on a group or an individual line basis, is set, as described above, at its individual positions 2, 5, 8, etc.

As described above, a positive pulse is supplied through the lead 5GP from the signal translator 300 to the switch 5GI when the multivibrator 4G in circuit 300 is triggered. If one of the AND circuits 14A1–5 is enabled by the steppers 12ST and 13ST, the positive pulse through lead 5GP from the translator 300 passes through the enabled one of the AND circuits 14A1–5 to the associated one of the circuits 14G1–5.

All five AND circuits 14A1–5, however, are disabled when the pulse through leads C1–5 are provided to the circuit 1200 due to reading the coded signals on tape 201 for line 00. The AND circuits 14A1–5 remain disabled as the coded signals corresponding to lines 00–10 are read and translated because the switches 12UA–E and 13TA–E are set for lines 11, 27, 32, 40–9 and 60–9 as described above. The AND circuit 14A1 becomes enabled for the twelfth time slot when the coded signals corresponding to line 11 are read. Assume for example that the coded signals for line 11 are the same as for line 00, with a positive signal being recorded on tracks 1 and 2 and a neutral signal being recorded on track 3. The sequence of operations in the circuits 1000, 300, 1200 and 3700 is the same as for line 00 except that now the AND circuit 14A1 is enabled.

With the AND circuit 14A1 enabled by the steppers 12ST and 13ST, the positive pulse through lead 5GP from the translator 300 passes through the circuit 14A1 to the control grid of the left section of tube 14GA in circuit 14G1. The left section of tube 14GA is part of a cathode follower and the right section of tube 14GA is part of an amplifier. The potential at the left cathode of the tube 14GA increases when the positive pulse at the left anode is connected to positive battery 14B4 and the left cathode is connected to the negative battery 14B5 through resistors 14R7 and 14R5. The positive pulse at the left cathode of tube 14GA is utilized to control the operation of the flip-flop circuit 14CA as is hereinafter described. The positive pulse also passes through the resistor 14R1, the rheostat 14RH1 and the resistor 14R2 to the right control grid which is biased by its connection through resistor 14R8 to the negative battery 14B6. The right anode is connected to the positive battery 14B2 through the resistor 14R3 so that potential at the right anode decreases as conduction through the right section increases. The right anode is also connected through the resistor 14R9 to the rheostat 14RH1. The negative pulse at the right anode is supplied to terminal 1 of the AND circuit 14A6. If a negative pulse is simultaneously present at the terminal 2 of the AND circuit 14A6 a negative pulse is provided from the AND circuit 14A6 through the section 2 of the switch 15GI to the converter circuit 600.

Terminal 1 of the AND circuit 14A6 in circuit 14G1 is enabled in this manner once during the reading of the group of recorded signals corresponding to one sampling cycle. More specifically terminal 1 of the circuit 14A6 in the circuit 14G1 is enabled only when the recorded signals corresponding to line 11 are read. In a similar manner terminal 1 of the AND circuit 14A6 in circuit 14G2 is enabled when the coded signals corresponding to line 27 are read. The setting of the switches 12UA–E and 13TA–E determines when the terminals 1 of the circuits 14A6 are enabled.

The AND circuits 14A6 in circuits 14G1–5 remain disabled as the coded signals corresponding to lines 1–10 are read and translated because the switches 12UA–E and 13TA–E are not set therefor. When, however, the coded signals corresponding to line 11 are read, terminal 1 of the AND circuit 14A6 in circuit 14G1 is enabled. If a positive or negative signal is recorded in track 2 or 3 for line 11 a negative pulse is provided from circuit 300 through the patch circuit to terminal 2 of the AND circuits 14A6 of circuits 14G1–5 at the same time a negative pulse is provided to terminal 1 of circuit 14A6 in circuit 14G1.

In this manner a negative pulse is provided through the AND circuit 14A6 for each sampling cycle if a positive or a negative signal is recorded in track 2 or 3 for line 11. If line 11 is not busy when the sampling is made, neutral signals are recorded in tracks 2 and 3 and a pulse does not appear at terminal 2 of the AND circuit 14A6 in circuit 14G1 coincident to the negative pulse at its terminal 1.

The recorded signals on tape 201 are, in this manner, simultaneously sorted and analyzed in two different ways:

(1) The signals are sorted on a time basis under control of switches 12UA–E and 13TA–E; and (2) The signals are sorted on a coding basis under control of the panel 37DT.

It is only when both the time slot, which identifies the line, and the coding, which identifies the traffic condition, match the manually preselected conditions that an AND circuit 14A6 is enabled.

The negative pulse from the AND circuit 14A6 in circuit 14G1 is supplied through the resistor 14R10 and varistor 14D4 to the S1 terminal of the flip-flop circuit 14CA which was mentioned above. The negative pulse is also supplied through terminals 17 and 18 of section 2 of the switch 15GI and lead 6A1 to initiate the operation of the CCS converter 6CCS1 in the circuit 600 which is hereinafter described.

The negative pulse from the AND circuit 14A6 sets the flip-flop circuit 14CA. The flip-flop circuit 14CA remains set as long as busy indications are read for line 11. Each time the recorded signals for line 11 are read, a negative pulse is applied to lead C1 through the circuit 3700. In the circuit 14G1, the pulse on lead C1 passed through a varistor 14D2 to reverse bias a varistor 14D3. If varistor 14D3 is not reversed biased the positive pulse, described above, which is supplied from the left cathode of tube 14GA, is effective to reset the flip-flop circuit 14CA. The positive pulse is provided from the left cathode of tube 14GA through the resistors 14R7 and 14R6 and the varistor 14D3 to the terminal S1 of the flip-flop circuit 14CA. The junction between resistor 14R6 and varistor 14D3 is connected to ground through the capacitor 14C2. The negative pulse on lead 14C1 from the circuit 3700 blocks the positive pulse by reverse biasing varistor 14D3. The flip-flop circuit 14CA remains operated, therefore, until a positive pulse appears at the left cathode of tube 14GA and a coincident negative pulse does not appear on lead C1. In this manner, the flip-flop circuit 14CA operates only once during each busy period of line 11 because the positive pulse is provided every time recorded signals for line 11 are read independent of the idle or busy condition of line 11 whereas a negative pulse appears on lead C1 only when the recorded signals indicate that line 11 is busy.

When the flip-flop circuit 14CA operates, it provides a positive pulse from its output terminal 0 through the resistor 14R12, which is connected to ground through the capacitor 14C4, lead 14BC through the terminals 17 and 18 of section 3 of the switch 15GI and lead 14B1 to the count register circuit 24B which counts the number of calls made by or to line 11.

The circuit 1200 functions in this manner to provide one pulse to the circuit 600 every time the recorded signals for line 11 indicate a busy condition, and one pulse to circuit 24B every time a call is initiated by or to line 11.

As described above, a negative pulse is supplied from the circuit 1200 through lead 6A1 to the CCS converter 6CCS1 in the circuit 600. The circuit 600 measures the volume of traffic by calculating the busy duration indicated by each pulse supplied thereto. The circuit 600 has five converters 6CCS1–5 which are individually associated with the five sets of switches 12UA–13TA, 12UB–13TB, etc. and the five circuits 14G1–5 in the circuit 1200. Each negative pulse to circuit 600, or each busy sample, is multiplied by 15 because each busy sample represents 15 busy recording seconds. This is due to the fact that the traffic sampling is taken at 15-second intervals during the recording sessions. The converters 6CCS1–5 compute the busy duration for the five lines or groups of lines for which data is being accumulated as indicated by the setting of the switches 12UA–E and 13TA–E. The product arrived at by multiplying by 15 is divided by 100 to provide a unit of measurement referred to as a CCS which is 100 centum call seconds. In effect, the number of pulses is first multiplied by 1.5 by supplying three pulses for every two pulses received at any one of the converters 6CCS1–5 and then by dividing by 10 instead of 100 to shift the decimal place. The division is achieved merely by changing the nomenclature in the counter register circuit 8A which is hereinafter described.

The negative pulse through lead 6A1 indicates that a busy indication was read for line 11. In the converter 6CCS1, the lead 6A1 is connected through the resistor 6R7 to the left control grid of the double triode 6XTRA. The negative pulse at the left control grid inhibits conduction through the normally conductive left section of tube 6XTRA to provide for an increase of plate potential. The left section is normally conductive because its cathode is connected to ground and its anode is connected through resistor 6R2 to the plus 130-volt battery 6B2. The positive pulse at the left anode of tube 6XTRA is coupled through the capacitor 6C1, which is shunted to ground through the resistor 6R1, to the varistors 6D1 and 6D2. The capacitor 6C1 differentiates the pulse and the negative portion of the differentiated pulse passes through the varistor 6D1 to set the flip-flop circuit 6C0. The varistors 6D1 and 6D2 form a diode gating arrangement which together with the flip-flop circuit 6C0 form a binary counter. The first negative pulse supplied through the diodes 6D1 and 6D2 passes only through the diode 6D1 to set the flip-flop circuit 6C0. The next negative pulse, as is hereinafter described, passes only through the diode 6D2 to reset the flip-flop circuit 6C0.

The positive pulse provided from the left anode of tube 6XTRA is also coupled through the resistor 6R13, capacitor 6C3 and resistor 6R4 to the right control grid of tube 6XTRA. The right section of tube 6XTRA is normally nonconductive due to the connection of its cathode to the negative battery 6B9 and the connection of its anode through resistor 6R3 to battery 6B2. The right anode of tube 6XTRA is also connected to ground through the resistor 6R16. The positive pulse at the right control grid causes the right section of tube 6XTRA to conduct. When the right section of tube 6XTRA conducts, the potential at its anode decreases so that a negative pulse is provided therefrom through varistor 6V3 and lead 6F1 to the circuit 1200, and also through lead 6ST1 to the count register 8A1 of the A count register circuit 8A. The pulse provided to leads 6ST1 and 6F1 from the converter 6CCS1 is a negative pulse in phase with the negative pulse supplied through lead 6A1 to the converter 6CCS1.

The converter 6CCS1 has one additional lead connected thereto and that is the lead 6BB from the count register circuit 8A. In the count register circuit 8A, a minus 140-volt battery 17B1 is connected through resistor 17R1 to the lead 6BB which is multiplied to the five converters 6CCS1–5. In the converter 6CCS1 the lead 6BB is connected through resistor 6R5 to the junction between the capacitor 6C3 and resistor 6R4. The battery 17B1 functions as a biasing source which normally maintains the right section of tube 6XTRA nonconducting and which also reverse biases two varistors 7V1 and 7V2 which are connected respectively through the resistors 7R8 and 7R9 to the lead 6BB. The reversed biased varistors 7V1 and 7V2 prevent the application of the positive pulse on lead 6BB from the left anode of tube 6XTRA from passing to a stepping amplifier 7AMP. The stepping amplifier 7AMP, as hereinafter described, is utilized when switch 15GI is set at its group position so that a group instead of an individual analysis of a traffic data is performed.

To briefly recapitulate, the first negative pulse through lead 6A1 causes the converter 6CCS1 to provide a negative pulse on leads 6F1 and 6ST1 which is in phase with the pulse on lead 6A1. The lead 6ST1 from the converter 6CCS1 is connected to the T2 terminal of a stepper 8ST in the count register 8A1. The count register 8A1, which is shown in some detail, is one of six similar count registers 8A1–2 and 16A3–6 in the register circuit 8A. Each of the count registers 8A1–2 and 16A3–6 has three steppers 8ST, 9STT and 9STH and each of the steppers 8ST, 9STT and 9STH includes a cold cathode stepping tube 8CST which has ten output terminals 0–9, a reset or normalizing terminal NO, a stepping terminal T2 and an anode terminal *a*. The output terminals 0–9 of the stepping tube 8CST are connected to a resistor network consisting of the resistors 8R8–8R27 which provide for a step analog potential at a terminal T3 which corresponds to the position of the glow or discharge in the stepping tube 8CST. For example, when the discharge is at terminal 1, a potential of 2 volts exists at terminal T3; when the discharge is at terminal 2, a potential of 4 volts appears at terminal T3, etc. The conduction through the stepping tube 8CST is adjusted by a rheostat 8RH which is connected from the battery 8B1 and through the terminal *a* to the common anode. The voltage at terminal T3 of the stepper 8ST is always positive because the tube 8CST is connected between the positive battery 8B1 and ground at resistor 8R27. The rheostat 8RH is adjusted so that 1.9–2.0 milliamperes pass through the common anode of tube 8CST.

The negative input pulse through the terminal T2 of the stepper 8ST functions to step the discharge in tube 8CST from one of the ten terminals 0–9 to the next. The first negative input pulse steps the discharge from terminal 0 to terminal 1 so that a potential of plus 2 volts exists at terminal 3. When the potential is stepped from terminal 9 to terminal 0 of tube 8CST of the stepper 8ST, a pulse is provided through the differentiating capacitor 8C1 and the upper section of the step amplifier 9AMP to the step terminal T2 of the stepper 9STT. In a similar manner the terminal T4 of the stepper 9STT is connected through the differentiating capacitor 9C2 through the lower section of the amplifier 9AMP to terminal T2 of the stepper 9STH. The inputs of the sections of the amplifier 9AMP are connected respectively through the resistors 9R4 and 9R3 to the lead 6B0 which is at a negative potential due to its connection to battery 17B1. The upper and lower sections of the amplifier 9AMP serially connect the steppers 8ST, 9STT and 9STH in this manner so that a total of 999 pulses thereto can be counted. Since, as is hereinafter described, three pulses are provided to the count register 8A1 for each two busy indications on the tape 201 for the line 11, the register 8A1 accumulates an indication of the busy duration of line 11.

As described above, a negative pulse is provided through lead 6F1 at the same time the negative pulse is supplied through lead 6ST1 from the circuit 600. Lead 6F1 from the converter circuit 600 is connected through terminals 2 and 3 of section 2 of the switch 15GI, through lead 6F, which is connected to ground through the resistor 6R3 and to battery 7B1 through the resistor 6R2, to the count register 16A6 in the register circuit 8A. Since the lead 6F1 is multiplied from all five converters 6CCS1–5, a pulse is provided to the count register 16A6 everytime one is provided from any one of the count registers 8A1, 8A2, 16A3, 16A4 and 16A5. The count register 16A6 therefore is a totalizing counter which registers a busy indication corresponding to the total busy indications registered by the count registers 8A1–2 and 16A3–5.

If the coded signals for line 11 in the next group of coded signals indicate a busy condition another negative pulse is provided through lead 6A1 to the converter 6CCS1. The next negative pulse through lead 6A1 to the converter 6CCS1 causes it to supply two pulses to the register 8A1. The converter 6CCS1 in this manner supplies a total of three pulses to the register 8A1 for each two pulses provided thereto. By supplying three pulses for every two received the converter 6CCS1 effectively multiplies the number of pulses received thereby by 1½. When the second negative pulse is received at the left section of the tube 6XTRA, it inhibits conduction to provide for a positive pulse at its anode. The positive pulse at the left anode of tube 6XTRA is coupled through the capacitor 6C3 to the control grid of the right section of tube 6XTRA. When the right section of tube 6XTRA becomes conductive, it provides for the negative pulses, described above, to the registers 8A1 and 16A6.

The positive pulse at the left anode of tube 6XTRA is also differentiated through the capacitor 6C1 to reset the flip-flop circuit 6C0. When the flip-flop circuit 6C0 is reset, it provides a pulse from its terminal 0 to the delay capacitor 6C2 which delays the pulse for approximately 10 microseconds and then supplies it through the capacitor 6C3 to the right section of tube 6XTRA. The capacitor 6C2 becomes sufficiently charged to provide for a second pulse to the right section of tube 6XTRA after the right section of tube 6XTRA has returned to normal. When the right section of tube 6XTRA becomes conductive it provides for another pulse to the registers 8A1 and 16A6. A total of three pulses is provided in this manner to the registers 8A1 and 16A6 when two pulses are received at the converter 6CCS1. Only three pulses instead of four pulses are provided from the converter 6CCS1 because when the flip-flop circuit 6C0 is set a negative pulse is provided to the right section of tube 6XTRA instead of a positive pulse and the negative pulse does not change the condition of tube 6XTRA.

As described above, a pulse is provided to the CCS converter circuit 600 from the circuit 14G1 in the data analysis and control circuit 1200 at the same time that a negative pulse is provided from the flip-flop circuit 14CA through resistor 14R8, lead 14BC, terminals 17 and 18 of section 3 of switch 15GI and lead 15B1 to the count register 24B1 in the register circuit 24B. The lead 14BC is coupled to ground through the capacitor 14C4. The count register 24B1 is similar to the count register 8A1 except that only two steppers 24ST and 25ST are serially connected instead of three steppers 8ST, 9STT and 9STH. The two steppers 24ST and 25ST are serially connected by the differentiating capacitor 24C1 and the upper section of the step amplifier 25B. In the register 24B1, lead 15B1 is connected to the capacitor 25C1 and therefrom through the lower section of the amplifier 25B to the step terminal T2 of the stepper 24ST.

The register 24B1 accumulates the pulses representing a call to or from line 11 and the register 8A1 accumulates an indication of the total busy duration of line 11. The sequence of operations continues in this manner until the end of one hour recorded information is analyzed.

During the time that the coded signals on the tape 201 are being analyzed and accumulated in the count register circuits 8A and 24B, the print program circuit 2600 controls the teletypewriter 26TT to print a heading for the accumulated data. The sequence of operations for printing the heading is initiated when the switch 28SW1 is operated. The switch 28SW1, as described above in the list of switch settings, may be operated at the same time that the start switch 19ST is operated to initiate the sequence of operations for accumulating the traffic data. The heading can be printed in this manner during the time that the recorded signals are being analyzed. The switch 28SW1 can be operated, therefore, even after the switch 19ST is operated as the two sequences of operations are independent.

When the switch 28SW1 is operated, ground is connected to the capacitor 28C9 to generate a negative pulse through the capacitor 28C9 and varistor 28V2 to terminal S1 of the flip-flop circuit 28H which is set thereby. The plates of the capacitor 28C9 are connected respectively through the resistors 28R25 and 28R24 to the positive battery 28B1. When the flip-flop circuit 28H is set, it initiates a counting operation by three flip-flop circuits 27D1, 27D2 and 27D4, and it provides a control potential from its terminal 0 through the upper section of the amplifier 28TRA to the winding of the relay 36TRA in the print selector 2900. The winding of relay 36TRA is also connected to battery 35B1 so that relay 36TRA operates when the control potential is provided thereto. When relay 36TRA operates, it connects the grounded capacitor 36C1 through resistor 36R1 to the normal armature of relay 34TRB which is in turn connected through the normal armature of the relay 34TRC1 and the winding of the step magnet 34A to battery 34B1. The step magnet 34A does not operate when the grounded capacitor 36C1 is connected thereto. As is hereinafter described the magnet 34A operates when the interrupter relay 36INT operates.

The step magnet 34A is part of a selector switch 29SA which is one of six selector switches 29SA, 29SB, 30SC, 30SD, 31SE and 31SF in the print selector 2900. The switches 29SA, 29SB, 30SC and 30SD are utilized for printing the heading for the accumulated data and the switches 31SE and 31SF are utilized for printing the accumulated data. Each of the switches 29A, 29B, 30C, 30D, 31E and 31F has three banks of 44 terminals 1–44 arranged in sections (A–F) 1–6. Section 5 of the switches 29A, 29B, 30C, 30D, 31E and 31F is not shown. The sections 1, 3 and 5, and the sections 2, 4 and 6 of each of the switches 29A, 29B, 30C, 30D, 31E and 31F are synchronous so that the wipers successively contact terminals 1–44. In this manner, when the step magnet 34A releases to step the selector switch 29SA, the wipers of sections A1, A3 and A5 are stepped to contact their associated terminals 1.

The switches 29A, 29B, 30C, 30D, 31E and 31F include respectively the step magnets 34A, 34B, 35A, 35B, 36A and 36B which are controlled by the relays 34TRC1, 34TRB, 34TRA, 35TRC2, 35INT and 36TRC3. The relays 34TRC1, 34TRB, 34TRA, 35TRC2, 35INT and 36TRC3 are in turn controlled by the print program circuit 2600. When relay 36TRA is operated, it readies a stepping path for the switches 29SA, 29SB, 30SC and 30SD but not for the switches 31SE and 31SF.

If the end of an accumulation period occurs after circuit 28H is set, the heading is printed and the data printing sequence is delayed until after the heading is printed. The data printing sequence is delayed because as long as relay 36TRA is operated the stepping path is closed for one of the switches 29SA, 29SB, 30SC and 30SD and opened for the switches 31SD and 31SE.

In the circuit 2600, as described above, the circuit 28H initiates a counting operation of the flip-flop circuits 27D1, 27D2 and 27D4 at the same time that relay 35TRA in the selector 2900 is operated. The circuits 27D1, 27D2 and 27D4 are serially connected to form a three-stage binary counter which can count up to eight or from 0 through 7. The three stages respectively include the negative batteries 27B4–6 which reverse bias the varistors 27V13–14, 27V15–16 and 27V17–18 connected respectively thereto. Each of the three circuits 27D1, 27D2 and 27D4 is normally in its set condition with minus 80 volts at its terminal 1 and 0 volt at its terminal 0.

Figure 42:
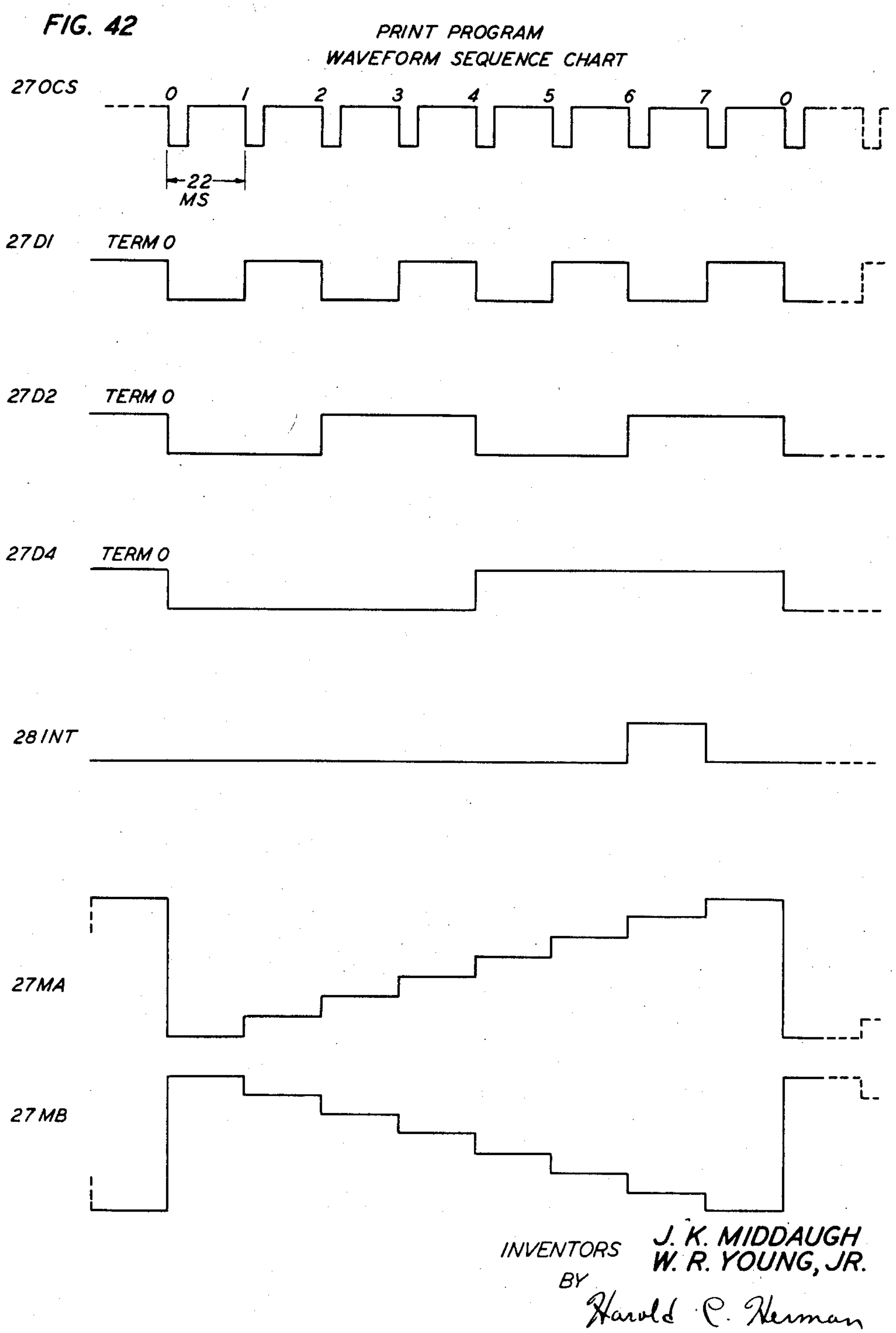
Fig. 42 illustrates the waveforms at the outputs of a number of components in the print program circuit of the automatic data reader.

The counter consisting of the circuits 27D1, 27D2 and 27D4 is driven by a free-running oscillator 27OSC which is connected to the circuit 27D1 through a diode gate circuit 27DG. The waveform provided by the oscillator 27OSC is shown in Fig. 42. The circuit 27DG includes a varistor 27V10, which is connected to ground through a resistor 27R35 and to a negative battery 27B3 through a resistor 27R34. The varistor 27V10 is normally reversed biased due to its connection through the resistors 27R36–38 to ground. The opposite ends of the resistor 27R37 are shunted to ground through the capacitors 27C17–18.

When the flip-flop circuit 28H is set due to the operation of the switch 28SW1, it provides a negative pulse from its terminal 1 through the resistor 28R14 and varistor 28V7 to the lower section of the cathode follower 27D. The input to the lower section of the cathode follower 27D is coupled to ground through the capacitor 28C10. The negative potential from circuit 8H is coupled through the lower section of the cathode follower 27D and the varistor 27V9 to the junction between the resistors 27R37 and 27R38. The varistor 27V9 and a varistor 27V8, which is connected from the upper section of the cathode follower 27D, are respectively connected to the battery 27B2 through the resistors 27R19 and 27R18. The varistors 27V9 and 27V8 form, together with three varistors 27V12, 27V11 and 27V19, an OR circuit which controls the biasing condition of the varistor 27V10. When all five varistors in the OR circuit are reversed biased, the potential provided to the junction between resistors 27R37 and 27R38 and thus to the varistor 27V10 is relatively positive to reverse bias the varistor 27V10. When a negative potential is provided through any one of the five varistors 27V9, 27V8, 27V12, 27V11 and 27V19, it functions to forward bias the varistor 27V10 and open the path from the oscillator 27OSC to the circuit 27D1. The negative pulse provided from terminal 1 of the circuit 28H functions to forward bias the varistor 27V10 because it is coupled through the lower section of the cathode follower 27D and the varistor 27B9 thereto.

When the transmission path to the circuit 27D1 is open, the pulses from the oscillator are supplied through the capacitor 27C15, the varistor 27B10 and the capacitor 27C16 to the diodes 27V13 and 27V14. As illustrated in Fig. 42, the oscillator 27OSC generates a 3 to 5-millisecond negative pulse every 22 milliseconds. The pulse width is not critical but the pulse repetitious rate is fairly critical because it is utilized, as is hereinafter described, in the generation of the 22-millisecond teletypewriter signals. As illustrated in Fig. 42, which also shows the waveforms generated by the circuits 27D1, 27D2 and 27D4, the first negative pulse from the oscillator 27OSC through the varistor 27V10 functions to reset all three circuits 27D1, 27D2 and 27D4. The circuits 27D2 and 27D4 are reset because the output terminals 0 of the circuits 27D1 and 27D2 are connected respectively through the resistor 27R86 and the capacitor 27C21 and through the resistor 27R46 and capacitor 27C19 to the circuits 27D2 and 27D4. As the terminals 0 of circuits 27D1 and 27D2 are reset, they respectively provide a negative pulse to the circuits 27D2 and 27D4 causing them to reset. The varistors 27V13–14, 27V15–16 and 27V17–18 connected respectively to the terminals S1 and S2 of the circuits 27D1, 27D2 and 27D4 function to steer the negative pulses to the associated terminals S1 and S2.

The terminals 0 of the circuits 27D1, 27D2 and 27D4 are connected respectively to the varistors 27V12, 27V11 and 27V19 described above. As long as any one of the three circuits 27D1, 27D2 and 27D4 is in its reset condition, a negative potential is provided through its associated varistors 27V12, 27V11 and 27V19 to forward bias the varistor 27V10 and allow the pulses from the oscillator 27OSC to pass to the circuit 27D1. When the control potential from circuit 28H is removed, the circuits 27D1, 27D2 and 27D4 continue to count until all three circuits are set.

When the binary counter consisting of the circuits 27D1, 27D2 and 27D4 reaches the count of 6 in its counting sequence from 0–7, the circuit 27D1 is reset and the circuits 27D2 and 27D4 are set. With the circuit 27D1 reset and the circuits 27D2 and 27D4 set, an AND circuit 27A3 is enabled to provide a positive potential through the amplifier 28INT and the resistor 28R66 to the winding of the relay 36INT in the print selector 2900. The winding of relay 36INT is also connected to battery 36B4 so that relay 36INT operates. The relay 36INT is an interrupter relay which is pulsed under control of the counter in the print program circuit 2600 once every 176 milliseconds, or once during every cyclic operation of the circuits 27D1, 27D2 and 27D4 as shown in Fig. 42.

When the relay 36INT operates, it shunts the capacitor 36C1 and connects ground through the operated armature of relay 36TRA and the normal armatures of the relays 34TRB and 34TRC1 to the step magnet 34A of the selector switch 29SA.

In this manner everytime relay 35INT operates, it causes the magnet 34A to operate, and everytime relay 35INT releases, it causes the magnet 34A to release. The first time magnet 34A releases, it steps switch 29SA to position 1 so that the wipers of its sections A1 and A3 contact the associated terminals 1.

Not all the sections of the switches 29SA, 29SB, 30SC, 30SD, 31SE, 31SF are utilized for the analysis. The two-position switch 15GI in circuit 1200 determines which pair of horizontal rows of sections 1–6 are utilized for the particular analysis. Only two of the horizontal rows of sections 1–6 are utilized for any analysis to supply information to the print program circuit 2600. In the illustrative example being described, switch 15GI is set at its individual positions 2, 5, 8, etc. as described above. With switch 15GI at positions 2, 5, 8, etc. the sections 3 and 4 of switches 29SA, 29SB, 30SC, 30SD, 31SE and 31SF are functional.

When the wiper of section A3 of switch 29SA is stepped to position 1, it connects the junction CR between resistors 34R22 and 34R23 through terminal 1 of section A3 of switch 29SA, lead 15IND through cable 15C1, terminals 8 and 9 of section 1 of switch 15GI and lead 26CRV to the print program circuit 2600.

The resistors 34R22 and 34R23 are part of a large voltage divider 34VD which provides fixed increments of voltage in 2-volt steps. The voltage divider includes the resistors 29R1–9 and 34R10–33 which are serially connected between the positive battery 29B1 and the negative battery 34B1. The voltage divider provides voltages ranging from plus 30 volts at the junction of resistors 29R1 and 29R2 to minus 32 volts at the junction of resistors 34R32 and 34R33. The junction of resistors 34R22 and 34R23 is at a potential of minus 12 volts. The junction designations in the voltage divider 34VD are the teletypewriter indications corresponding to the voltage thereat.

In the print program circuit, the minus 12-volt potential functions to vertically position the beam of a cathode-ray tube 26ENC at a discrete level corresponding to the minus 12-volt potential.

The minus 12-volt potential is supplied through lead 26CRV to the potentiometers 26P1 and 26P2 which may be utilized to adjust the deflection provided by the vertical deflection plates 5 and 6 of the cathode-ray tube 26ENC. The potentiometer 26P1 is connected between ground and lead 26CRV and the potentiometer 26P2 is connected between ground and battery 26B2. Lead 26CRV is connected to the center tap of the potentiometer 26P2, and the center tap of the potentiometer 26P1 is connected to the vertical deflection plate 6 and through the inverter amplifier 26IN to the vertical deflection plate 5. Potentiometers 26P1 and 26P2 are adjusted so that with 0 volt on lead 26CRV a space signal is generated, as is hereinafter described, to the teletypewriter 26TT. Power is supplied to the tube 26ENC from a power bay 26PD through the rheostat 26RHI and the potentiometer 26P4.

The cathode-ray tube 26ENC is utilized to convert the analog step potential provided through the print selector 2900 to a signal suitable for use by the teletypewriter 26TT. The input step analog signal through lead 26CRV controls the vertical deflection of the beam in tube 26ENC so that for a particular input the beam is moved to a particular vertical position. Thereafter, as is hereinafter described, the beam is horizontally stepped across the face of the tube 26ENC. The beam is stepped horizontally across the face of the tube 26ENC by the binary counter consisting of the circuits 27D1, 27D2 and 27D4 described above. The output terminals 0 of the circuits 27D1, 27D2 and 27D4 are connected to the converter circuit 27MA and the output terminals 1 of the circuits 27D1, 27D2 and 27D4 are connected to the converter circuit 27MB which is similar to the circuit 27MA.

The circuit 27MA includes a 1 megohm resistor 27M1 which is connected to the output terminal 0 of the circuit 27D4; a 2-megohm resistor 27M2 which is connected to the output terminal 0 of the circuit 27D2 and a 4-megohm resistor 27M4 which is connected to the output terminal 0 of the circuit 27D1. When all three circuits 27D1, 27D2 and 27D4 are reset, a maximum current passes from the battery 26B3 through the center tap of the potentiometer 26P3 and the circuit 27MA to the terminals 0 of the circuits 27D1, 27D2 and 27D4. The current through the resistors 27M1, 27M2 and 27M4 is inversely proportional to the impedance presented thereby and is controlled by the condition of the associated flip-flop circuits 27D1, 27D2 and 27D4. As the circuits 27D1, 27D2 and 27D4 count from 0 through 7 under control of the oscillator 27OSC, the output potential provided from the circuit 27MA is a step function illustrated in Fig. 42. The circuit 27MB, which is connected to the output terminals 1 of the circuits 27D1, 27D2 and 27D4, functions to provide an output potential curve, illustrated in Fig. 42, which is the mirror image of the output potential curve provided by circuit 27MA.

The output of the circuit 27MA is connected through the potentiometer 21P6 to the horizontal deflection plate 8 of the tube 26ENC and the output of the circuit 27MB is connected through the potentiometer 26P5 to the horizontal deflection plate 9 of the tube 26ENC. In this manner the beam is first positioned at a discrete vertical position by the step analog potential from the selector 2900 and thereafter the beam is stepped horizontally in eight steps across the face of the tube. The vertical positioning occurs before the beginning of the horizontal movement because the vertical positioning potential is provided through lead 26CRV at the count of 6 in the counting sequences 0–7 of the circuits 27D1, 27D2 and 27D4 as described above. At the count of 7 the circuits 27D1, 27D2 and 27D4 are reset to begin the horizontal step positioning. The beam of light provided by the tube 26ENC impinges upon a photographic mask 26PM shown in Fig. 43. The photographic mask 26PM controls the light from the tube 26ENC to the photomultiplier 26PC. The signals provided from the photomultiplier 26PC depend upon the particular vertical position of the beam as it is horizontally stepped across the face of tube 26ENC and mask 26PM.

The mask 26PM has 32 levels with each level being associated with a particular potential and a particular teletypewriter symbol as shown in Fig. 43. The beam is blanked in accordance with the black areas of the vertical level as it is horizontally stepped across the mask 26PM to control the output of the photomultiplier 26PC. The output of the photomultiplier 26PC is provided through an amplifier 26TTA to the grounded winding of the teletypewriter relay 26TB. The relay 26TB operates and releases in accordance with the signals provided thereto from the photomultiplier 26PC. The output of the photomultiplier 26PC for each teletypewriter character is shown in Fig. 41 together with the teletypewriter symbol and voltage on lead 26CRU corresponding thereto. When relay 26TB operates, it connects ground through the rheostat 26RH2 and switch 26SW1 to the teletypewriter 26TT. The switch 26SW1 may be utilized as a test switch by connecting the rheostat 26RH to the parallel circuit consisting of the capacitor 26C1 and resistor 26R1.

The electric beam is horizontally stepped across the face of tube 26ENC in 22-millisecond steps which is the repetition rate as described above of the free-running oscillator 27OSC. As the print selector 2900 steps through its operating cycle under control of the print program circuit 2600, the step analog potentials are successively provided through lead 26CRV to the vertical deflection plates of tube 26ENC which translates the step analog potential to the teletypewriter signals for the teletypewriter 26TT.

As described above when the switch 29SA is stepped to its position 1, a minus 12-volt potential is provided to the print program circuit 2600. The minus 12-volt signal, as indicated in Fig. 41, signals a carriage return (CR) operation to the teletypewriter 26TT.

When the switch 29SA is stepped to its position 2, a minus 8-volt potential at junction LT of the divider 34VD is connected to the circuit 2600 to signal that the next potential will indicate a letter instead of a figure number. When the switch 29SA is stepped to its position 3, the junction 5/T, at plus 12 volts, is connected to circuit 2600 to print the letter T beginning the heading shown in Fig. 39.

The switches 29SA, 29SB, 30SC and 30SD are successively stepped to connect potentials to the circuit 2600 which provide for the heading indicated in Fig. 39.

The digits in the first line of the heading are determined by the setting of the switches 12UA–E and 13TA–E in the circuit 1200. For example when the switch 29SB steps to its position 1, a plus 4-volt potential, indicating the tens digit 1, is connected from the junctions 1/Q of the voltage divider 34VD through lead 1 of the cable 29CA3, through terminals 1 and off of section 2 of the switch 13TA, lead SA1 of cable 29CA4, terminal 23 and the wiper of section A4 of switch 29SA, lead 15IND, terminals 8 and 9 of section 1 of switch 15GI, and lead 26CRV to the print program circuit 2600. When switch 29SA steps to position 24, a potential corresponding to the units digit which is determined by the setting of switch 12UA is supplied to the print program circuit 2600. In this manner the heading is automatically printed as the switches 29SA, 29SB, 30SC and 30SD are stepped through their 44 positions.

The switch 29SB is automatically operated after the switch 29SA steps to its position 43 because ground is connected through the wiper and terminal 43 of section A6 of the switch 29SA, and lead 28LWT to the varistor 21V1. The varistor 21V1 is shunted by the resistor 28R4 and connected to the negative battery 28B5 through the resistor 28R3. An inhibiting bias is normally applied from the battery 28B5 through resistor 28R4 to the amplifier 28TRC. When, however, the ground potential is connected to the varistor 28V1, the inhibiting bias is removed so that the next positive pulse from the amplifier 28INT is coupled through the capacitor 28C3, the amplifier 28TRC and capacitor 28C2 to the varistors 28V21 and 28V22. The capacitor 28C3 is connected to the battery 28B4 through the resistor 28R9 and the varistors 28V21 and 28V22 are connected to the terminals S1 and S2 of the flip-flop circuit 28TC to form a binary counter therewith.

The flip-flop circuit 28TC is normally reset so that the pulse triggers it to its set condition. When the circuit 28TC is set, it provides a negative pulse through the amplifier 28TRD and lead 28L1 to the serially connected windings of relays 36TRC3, 35TRC2 and 34TRC1 which are also connected to the positive battery 34B2. When relay 34TRC1 operates, it changes the stepping path through the armature of the interrupter relay 36INT from the magnet 34A to the magnet 34B.

In this manner when the switch 29SA reaches position 43, it switches the stepping path to switch 29SB. The stepping path for switch 29SB is from the armature of relay 36INT through the operated armature of relay 36TRA, the normal armature of relay 34TRB, the operated armature of relay 34TRC1 and the winding of the magnet 34B to battery 34B4. When relay 34TRC1 operates, it also releases the magnet 34A causing it to step the switch 29SA to its position 44 where it remains until the next heading is printed.

In a similar manner when the switch 29SB reaches its position 43 it initiates the operation of the selector switch 30SC. When the switch 29SB steps to position 43 it grounds the varistor 28V1 to allow the next positive pulse from the amplifier 28INT through the amplifier 28TRC. The pulse through the amplifier 28TRC is provided to the circuit 28TC causing it to reset. When the circuit 28TC is reset, it removes the operating potential from the serially connected windings of relays 36TRC3, 35TRC2 and 34TRC1 causing them to release.

When the circuit 28TC is reset, it also sets a flip-flop circuit 28TB and it provides a control potential to the time and scan program circuit 1000. The set pulse is provided from the output terminal 0 of circuit 28TC through a portion of lead 28RT2, resistor 28R10, capacitor 28C6 to the varistors 28V3 and 28V4 which are connected to circuit 28TB. The varistors 28V3 and 28V4 are also connected to battery 28B3 through the resistor 28R11. When the circuit 28TB is set, it provides an operating potential from its terminal 0 through the lower section of the amplifier 28TRA to the winding of relay 34TRB which is connected to battery 34B3. When relay 34TRB operates, the pulsing path through the armature of the interrupter relay is switched to the magnet 35C of switch 30SC. The magnet 35C is connected to battery 35B2. In this manner the operation of switch 30SC is initiated when the switch 29SB reaches position 43. The switch 29SB is stepped to position 44 when the stepping path is switched to the step magnet 35C.

The control potential from circuit 28TC to the circuit 1000 is provided through lead 28RT2, capacitor 19C2, connected to battery 19B2 through resistor 19R4, and varistor 19D2 to terminal S2 of the flip-flop circuit 19SP. If the circuit 19SP was set, it is reset by the control potential from the print program circuit 2600. When the circuit 19SP is reset, is disables the AND circuit 19A1. As is hereinafter described, the AND circuit 19A1 is enabled after the scan counter 10SC counts 240 scans to indicate one hour of recorded traffic information has been read.

When the flip-flop circuit 28TB is set, it operates relay 34TRB, as described above, and it also provides a positive pulse through the capacitor 28C8 and varistor 28V6 to the terminal S2 of the flip-flop circuit 28H. The circuit 28H is set at this time so that the positive pulse does not have an effect.

When the switch 30SC steps to position 43 ground is again connected to lead 28LWT and a positive pulse is coupled through the amplifier 28TRC and capacitor 28C2 to set the circuit 28TC. When the circuit 28TC is set, it reoperates the relays 34TRC1, 35TRC2 and 36TRC3 to transfer the stepping path to the magnet 35D. The stepping path is now from the armature of relay 36INT through the operated armatures of relays 36TRA, 34TRB and 34TRC2 and the winding of the magnet 35D to the battery 35B1. The winding of the magnet 35D is also connected to the grounded capacitor 35C1 through the resistor 35R1. Relay 34TRB remains operated when the circuit 28TC is set because the positive pulse from the circuit 28TC does not reset the circuit 28TB.

When the switch 30SD reaches position 22 ground is connected through the wiper and terminal 22 of section D6 to the circuit 2600. Terminal 22 is actually part of section D5, which is not shown, instead of being part of section D6. The positive pulse through the amplifier 28TRC is now effective to sequentially reset the circuits 28TC and 28TB. When the circuit 28TC resets, it releases the relays 34TRC1, 35TRC2 and 36TRC3 and when the circuit 28TB resets, it in turn resets the circuit 28H as its terminal S2 is connected to terminal 0 of circuit 28TB. The terminal S2 of circuit 28H is also connected to battery 28B7 through resistor 28R15 and to ground through resistor 28R16.

When the circuit 28H is reset, it disables the varistor 27V9 by removing the negative potential through the lower section of the cathode follower 27D. When the varistor 27V9 is disabled, the OR circuit including varistors 27V9, 27V8, 27V12, 27V11 and 27V19 remains enabled until all three circuits 27D1, 27D2 and 27D4 are set. When all three circuits 27D1, 27D2 and 27D4 are set, the OR circuit is disabled to in turn disable the diode gate 27DG and block the pulses from the oscillator 27OSC to the circuit 27D1. The printing of the heading is complete at this time with the circuit 2600 returned to normal.

The switch 30SD is automatically stepped to position 44 due to the self-stepping circuit including the capacitor 35C1. All four switches 29SA, 29SB, 30SC and 30SD are in this manner successively stepped to connect analog potentials to the circuit 2600 for printing the heading.

During the time the automatic data reader is printing the heading for the accumulated data, the recorded signals on the tape 201 are being read, analyzed and accumulated in the register circuits 8A and 24B. The accumulation sequence of operations continues until the scan counter 10SC counts to 240.

As described above, whenever a positive signal appears on track 1 of the tape 201, a minus 80-volt signal is applied through the switch 11SW5 to the multivibrator 10MV. In normal operation the negative signals through switch 11SW5 occur ever 3 to 3½ milliseconds during a particular sampling cycle whereas a duration of 50 to 100 milliseconds occurs between pulses of different scans. The natural oscillating period of the multivibrator 10MV is 6 milliseconds so that it remains operated during a particular scan and resets between scans. When the multivibrator 10MV operates, it provides a positive potential to the data analysis control circuit 1200 and to the amplifier 10SA1 in the scan counter 10SC. Each oscillation of the multivibrator 10MV advances the stepper 10SCU one step due to the connection of the amplifier 10SA1 thereto. When 240 pulses are counted by the scan counter 10SC, one hour of recorded information has been read, because each pulse represents 15 seconds. When 240 pulses are counted, the counter 10SC provides a control potential through the switch 18SW1 which is set at its one hour position, to initiate a data printing sequence in circuit 2600 and to remove the control potential from the motor control 2MC which stops the movement of the magnetic tape 201.

When a count of 240 is reached, the scan counter enables the AND circuit 18A1. The AND circuit 18A1 is enabled as its terminal 1 is coupled through the upper section of the cathode follower 18CFS. Terminals 5 and 8 of section 2 of the switch 18SW1 to the output terminal 4 of the stepper 10SCT, and its terminal 2 is coupled through the lower section of the cathode follower 18CFS and terminals 9 and 12 of section 2 of switch 18SW1 to the output terminal 2 of the stepper 10SCH. When the steppers 10SCT and 10SCH step their output potentials respectively to their terminals 4 and 2 to indicate a count of 240, the AND circuit 18A1 is therefore enabled. When the AND circuit 18A1 is enabled it provides a control potential through the resistor 18R1 shunted by the capacitor 18C1 to the amplifier 19PR which was described above. When the control potential is received at the amplifier 19PR it stops the motor control 2MC by removing a control potential thereto through a path from the amplifier 19PR through the varistor 19D3, the switch 19ST, the amplifier 19TA, the normal armature 1 of relay 19TW and the normal armature 3 of the relay 19U2 to the motor control 2MC. When the motor control 2MC stops it halts the movement of the tape 201 adjacent the reading heads 2HD1–3. The tape 201 is halted at a place between groups of coded signals which is between a sampling cycle of traffic conditions at the subscriber lines and trunks. The tape 201 is stopped between groups of coded signals because, as described above, the multivibrator 10MV initiates a counting operation by the scan counter 10SC between readings of groups of coded signals.

When the amplifier 19PR responds to the control potential from the scan counter 10SC, it also operates the flip-flop circuit 19SP and it provides an enabling potential to terminal 1 of the AND circuit 19A1. The amplifier 19PR is connected through the capacitor 19C1 and varistor 19D1 to the terminal S1 of the flip-flop circuit 19SP. The junction between the capacitor 19C1 and the varistor 19D1 is connected to ground through the serially connected resistors 19R1 and 19R2 and the junction of resistors 19R1 and 19R2 is connected to the negative battery 19B1 through the resistor 19R3. When the flip-flop circuit 19SP is set, it enables the AND circuit 19A1 which provides a minus 80-volt control potential through lead 19PD to the print program circuit 2600.

The control potential which is automatically provided through lead 19PD to the print program circuit 2600 at the end of the accumulation period may also be manually provided at any point during the accumulation period. A partial print switch 18PP is operated to close ground through the resistor 18R2 to the amplifier 19PR. As described above, the control potential to the amplifier 19PR causes it to supply control potential through the lead 19PD to the circuit 2600. In this manner the switch 18PP provides a means for initiating a printing sequence for the accumulated data even though the full hour accumulation period has not been completed. In addition, the operation of the amplifier 19PR disables the motor control 2MC also as described above. The normal use of the partial print switch 18PP is at the end of the tape 201 which would normally have less than a full accumulation period of traffic data. In other words, when the entire tape has been read, accumulated data is stored in the circuits 8A and 24B which has not been printed. The switch 18PP is operated to print the residual accumulated data in the circuits 8A and 24B.

In the print program circuit 2600 the lead 19PD is connected to the battery 27B1 through the resistor 27R1 and to the upper section of the cathode follower 27D.

As described above, the upper section of the cathode follower 27D is connected to the varistor 27V8 which is part of the OR circuit consisting of the varistors 27V9, 27V8, 27V12, 27V11 and 27V19. When a negative potential is provided to the OR circuit it forward biases the varistor 27V10 in the diode gate 27DG to allow pulses from the free-running oscillator 27OSC to pass to the flip-flop circuit 27D1. As described above, the circuit 27D1 is part of a three-stage binary counter consisting of the circuits 27D1, 27D2 and 27D4 which count from 0–7. When the binary counter reaches the count of 6, it enables the AND circuit 27A3 which provides a control potential through the amplifier 28INT, resistor 28R66 and lead 34INT to operate the relay 36INT in the print selector 2900. The control potential through lead 34INT initiates the operation of the print selector 2900 to successively connect the accumulated data corresponding to the analysis of one hour recording on tape 201 to the print program circuit 2600.

When the relay 36INT operates, it connects ground through its operated armature and the normal back contacts of relays 36TRA and 36TRC3 to the winding of the step magnet 36E which is connected to the negative battery 36B1. When the binary counter consisting of circuits 27D1, 27D2 and 27D4 counts to 7, the control potential is removed from the winding of the relay 36INT causing it to release. When relay 36INT releases, it removes the ground connection from the step magnet 36E causing it to step the wipers of sections E1 and E3 of the switch 31SE to their associated positions 1. As described above, the setting of the switch 15GI in the data analysis and control circuit 1200 determines which section of the switch 31SE is effective to establish conductive paths to the print program circuit 2600. With the switch 15GI set at its individual positions 2, 5, 8, etc., section E3 of switch 31SE establishes a connection through lead 26CRV to the circuit 2600. When the wiper of section E3 steps to position 1 a connection is provided from ground at the junction SP of the voltage divider 34VD through terminal 1 and the wiper of section E3, lead 15IND, terminals 8 and 9 of section 1 of switch 15GI and lead 26CRV to the print program circuit 2600. As described above, the potentials on lead 26CRV control the vertical positioning or deflection of the beam in the cathode-ray tube 26ENC. A ground potential or a 0 volt potential as indicated in Fig. 43, which illustrates the photographic mask 26PM, provides for coded signals representing a space indication to the teletypewriter 26TT.

Each time the three-stage binary counter in the print program circuit 2600 cycles, the switch 31SE is stepped and during each cycle of the counter the beam in tube 26ENC is stepped horizontally across the face of the tube and returned to its starting position. As the switch 31SE steps through its 44 terminals it successively connects the junctions of the divider 34VD and the steppers in the count register circuits 8A and 24B to the print program circuit 2600. For example, when the wiper of section E3 of the switch 31SE is stepped to its position 2 a connection is provided from the junction FG of the voltage divider 34VD, which is at a potential of minus 6 volts, through terminal 2 of section 3E and section 1 of switch 15GI to lead 26CRV. As indicated in Fig. 43, a potential of minus 6 volts provides for coded signals representing an indication that figure number and not a letter will next be provided to the teletypewriter 26TT. When the wiper of section E3 is stepped to position 3, a connection is provided from junction 2/W of the voltage divider 34VD, which is at a potential of plus 6 volts, through lead 2 of cable 29C1, terminals 20 and 1 of the day tens switch 11SW3, lead D1, through cable 11C4, terminal 3 and the wiper of section E3 of switch 31SE, lead 15IND, terminals 8 and 9 of sections 1 of switch 15GI and lead 26CRV to the print program circuit 2600. In the print program circuit 2600 the tube 26ENC translates the plus 6-volt potential provided thereto to coded signals illustrated in Fig. 41 which indicate "2."

As illustrated in Fig. 39, the selector switch 31SE first causes the teletypewriter 26TT to print the number 22 to indicate the test day, then the time that the recording period began as indicaed by the setting of the hour counter 11HC and thereafter prints the data accumulated in the registers 8A and 24B. For example, the terminal T3 of the stepper 8ST in the first count register 8A1 of the circuit 8A is connected through lead 1A3 to terminal 20 of section E3 of switch 31SE. The terminals T3 of the various steppers in the register circuits 8A and 24B are successively connected by the switches 31SE and 31SF to the lead 26CRV. Terminals T3 of the steppers in the circuits 8A and 24B, as described above, are at an analog potential which is proportional to the digit registered thereby.

When the switch 31SE steps to position 43 it connects ground through the wiper and terminal 43 of section E6, and lead 28LWT to the varistor 21V1. Each time the relay 36INT releases, a positive pulse is provided through the amplifier 28TRC. As described above, the pulse from the amplifier 28TRC is coupled through the differentiating capacitor 28C2 connected to the battery 28B4 through the resistor 28R9. From the capacitor 28C2 the differentiated pulse is provided to the varistors 28V21 and 28V2 which are respectively connected to the terminals S1 and S2 of the flip-flop circuit 28TC. The flip-flop circuit 28TC is normally in its reset condition with minus 80 volts at its terminal 0 and 0 volt at its terminal 1. The pulse from the amplifier 28TRC sets the circuit 28TC so that the potential conditions at their terminals 0 and 1 are reversed. When the potential at terminal 0 of the circuit 28TC changes from minus 80 volts to 0 volt, the amplifier 28TRD connected thereto provides an operating potential through lead 28L1 to the serially connected windings of the relays 36TRC3, 35TRC2 and 34TRC1. The winding of relay 34TRC1 is connected to positive battery 34B2 so that all three relays 34TRC1, 35TRC2 and 36TRC3 operate. When the relay 36TRC3 operates, it switches the pulsing path from the armature of relay 36INT to pass to the step magnet 36F instead of to the step magnet 36E. The magnet 36F, which is also connected to the negative battery 36B3, thereafter steps the switch 31SF to position 25. The operation of the three-stage binary counter in the print program circuit 2600 is continuous so that switch 31SF is operated immediately after switch 31SE completes its operation.

When the switch 31SF steps to position 25, ground is connected from the wiper of its section E6 to the varistor 28V1. The next pulse from the amplifier 28INT is coupled through the amplifier 28TRC to reset the circuit 28TC. When the circuit 28TC is reset, it sets the circuit 28TB, releases the relays 34TRC1, 35TRC2 and 36TRC3 and it resets the circuit 19SP. The circuit 28TB is reset the next time the circuit 28H is set to initiate a heading printing sequence due to the connection of terminal 1 of circuit 28H through capacitor 28C7 and varistor 28V5 to terminal S2 of circuit 28TB. The capacitor 28C7 is also connected to ground through resistor 28R13 and to the battery 28B3 through the resistor 28R12.

The reset potential for circuit 19SP is provided from terminal 0 of circuit 28TC through lead 28RT2, capacitor 19C2 and varistor 19V2 to terminal S2 of circuit 19SP. When the circuit 19SP is reset, it disables the AND circuit 19A1 to remove the negative control on lead 19PD from circuit 1000 to circuit 2600.

When the negative potential is removed from lead 19PD, the varistor 27V8 becomes reverse biased and the binary counter consisting of circuits 27D1, 27D2 and 27D4 stops operating. The print program circuit 2600 is in this manner returned to normal.

The selector 2900 is also returned to normal because the switch 30SF is returned to position 44 due to the self-interrupting path including the capacitor 36C2 and resistor 36R2. When the switch 30SF steps to position 43, it connects ground at the wiper of section F6 through lead 41, contacts 5 and 8 of section 2 of the switch 18SW2, the normal armature 2 of relay 19Y and resistor 19R6 to the winding of a relay 19U2 which is also connected to battery 19B4. When relay 19U2 operates, it connects ground through its operated armature 1, contacts 12 and 9 of section 2 of switch 18SW2, lead 31 to the winding of the step magnet 36F. When relay 19U2 operates, it also opens the control path at its armature 3 from the amplifier 19TA to the motor control 2MC. The motor control is not operating at this time so that opening the control path has no immediate effect.

When relay 19U2 operates, it also in turn operates the relay 19U1 by connecting battery 19B4 through its operated armature 2 and resistor 19R5 to the grounded winding of the relay 19U1. When the relay 19U1 operates, it performs the following functions:

(1) It connects battery 19B3 through lead 19RS and the register reset amplifier 32RS to reset the count register circuits 8A and 24B. The register reset amplifier 32RS is connected to the terminal T1 of each of the steppers 8ST, 9STT and 9STH in the count registers 8A1, 8A2, 16A3–6 and 24ST and the steppers 24ST and 25ST in the registers 24B1–2 and 32B3–6. Terminal T1 in each of these steppers is connected through the varistor 8V3 or 24V3 to the normalizing cathode of the tube 8CST or 24CST. The output potential is returned to the terminal 0 in this manner when a reset pulse is provided through the amplifier 32RS. The normalizing cathode of the tube 8CST is also connected through the varistor 8V1 and resistor 8R25 to terminal T5, and the normalizing cathode of tube 24SCT is connected through the varistor 24V1 and the resistor 24R27 to terminal T5.

(2) It connects the battery 19B3 through its operated armature 2, contacts 4 and 1 of section 2 of the switch 18SW2 and contacts 4 and 1 of section 1 of the switch 18SW1 to the scan counter 10SC. The negative potential is coupled in the scan counter 10SC through the amplifier 10SCR and capacitor 10C1 to the reset terminals of the steppers 10SCU, 10SCT and 10SCH returning them to their 0 position. The reset terminals of the steppers 10SCU, 10SCT and 10SCH are also multipled to the grounded resistor 10R1. When the scan counter 10SC is reset, it removes the control potential applied through section 2 of switch 18SW1, the amplifier 18CFS and the AND circuit 18A1 to the amplifier 19PR. The removal of the control potential from the amplifier 19PR causes it to reapply a positive operated potential to the amplifier 19TA. The output of the amplifier 19TA, however, is not provided to the motor control 2MC because armature 3 of relay 19U2 is operated at this time.

(3) It connects battery 19B3 through its operated armature 3, contacts 4 and 1 of section 1 of switch 18SW2 and contacts 8 and 5 of section 1 of switch 18SW1 to the hour counter 11HC. In the hour counter 11HC the negative potential is coupled through the lower section of the amplifier 11AR to the units stepper 11HRU to advance it from position 9 to position 0. As described above, the stepper 11HRU registered a count of 9 and the stepper 11HRT registered a count of 0 to indicate that the recording session for which data was to be analyzed commenced at 9 a.m. When the output potential of the stepper 11HRU steps from its terminal 9 to its terminal 0 a stepping potential is provided from its terminal 0 through the upper section of the amplifier 11AR to the stepper 11HRT to advance its output potential from terminal 0 to terminal 1. The hour counter 11HC is in this manner advanced one count when the relay 19U1 is operated.

(4) It, in turn, operates the relay 19Y by connecting ground through its operated armature 4 and resistor 19R7 to the winding of relay 19Y which is also connected to the battery 19B5.

When relay 19Y operates, it opens the already opened control path from the amplifier 19TA to the motor control 2MC at its armature 1 and it opens the operating path for the relay 19U2 at its armature 2. When the operating path for relay 19U2 is opened, it releases and in turn releases relay 19U1. When the relay 19U1 releases it in turn releases the relay 19Y which restores the control path in the amplifier 19TA to the motor control 2MC to advance the magnetic tape 201 again. When relay 19U2 releases, it also removes the ground potential from lead 31 causing the magnet 36F to step the switch 31SF to its position 44.

In this manner after one hour of recorded information is analyzed and recorded, the time and scan program circuit 1000 is automatically operated from the print selector 2900 to start another accumulation period. The data accumulation sequence of operations continues with the results of each accumulation period being printed as one line until the entire tape 201 is read.

*Group analysis—dial-tone speed*

As described above, the information that is recorded on the tape 201 can be analyzed in four different ways. The information can be analyzed on an individual line basis as described in the preceding section and the information can be analyzed on a group basis. By group basis is meant that the traffic information on all the lines and trunks in the group is considered as a unit.

Referring to Fig. 40 the middle four columns are utilized for the accumulated group information. For example, in Table B, the total busy duration of all revertive calls or NM signals on all of the lines in the group are accumulated. Four such accumulations may be accomplished during the group analysis. The coded signals which are considered is determined by the setting of the patch circuit 3700, as described above, in reference to the individual analysis.

In addition to these four accumulations, one of the following three types of distribution information may be determined:

(1) Dial-tone speed;

(2) Number of simultaneous busy lines or trunks; and (3) Consecutive number of scans that a given number of lines or trunks are simultaneously busy.

These three types of group analyses are illustrated in Fig. 40 and were listed above at the beginning of the detailed circuit description.

Figure 12:
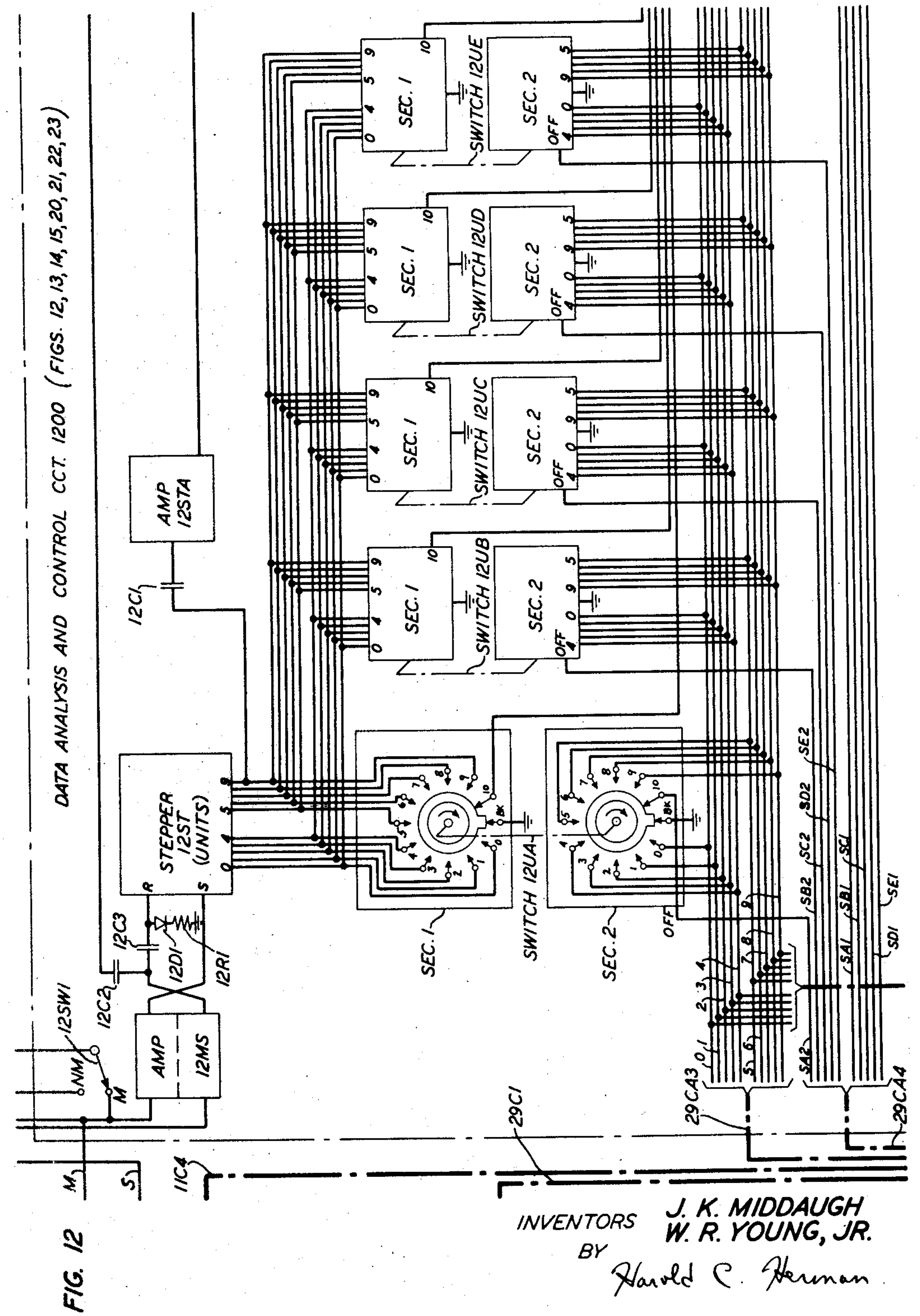
Figs. 12–15 and 20–23 illustrate the data analysis and control circuit of the automatic data reader.
Figure 13:
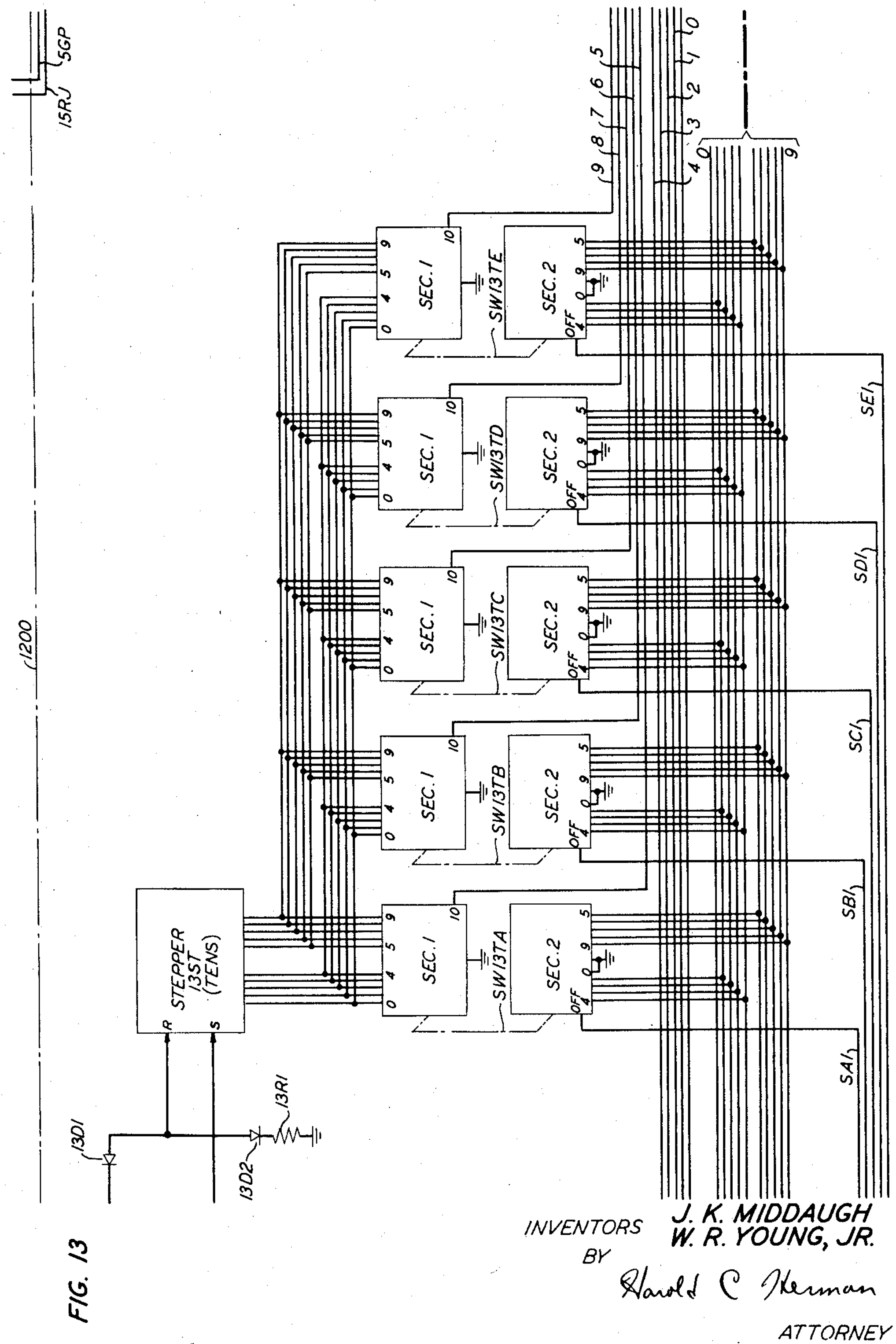
Figure 14:
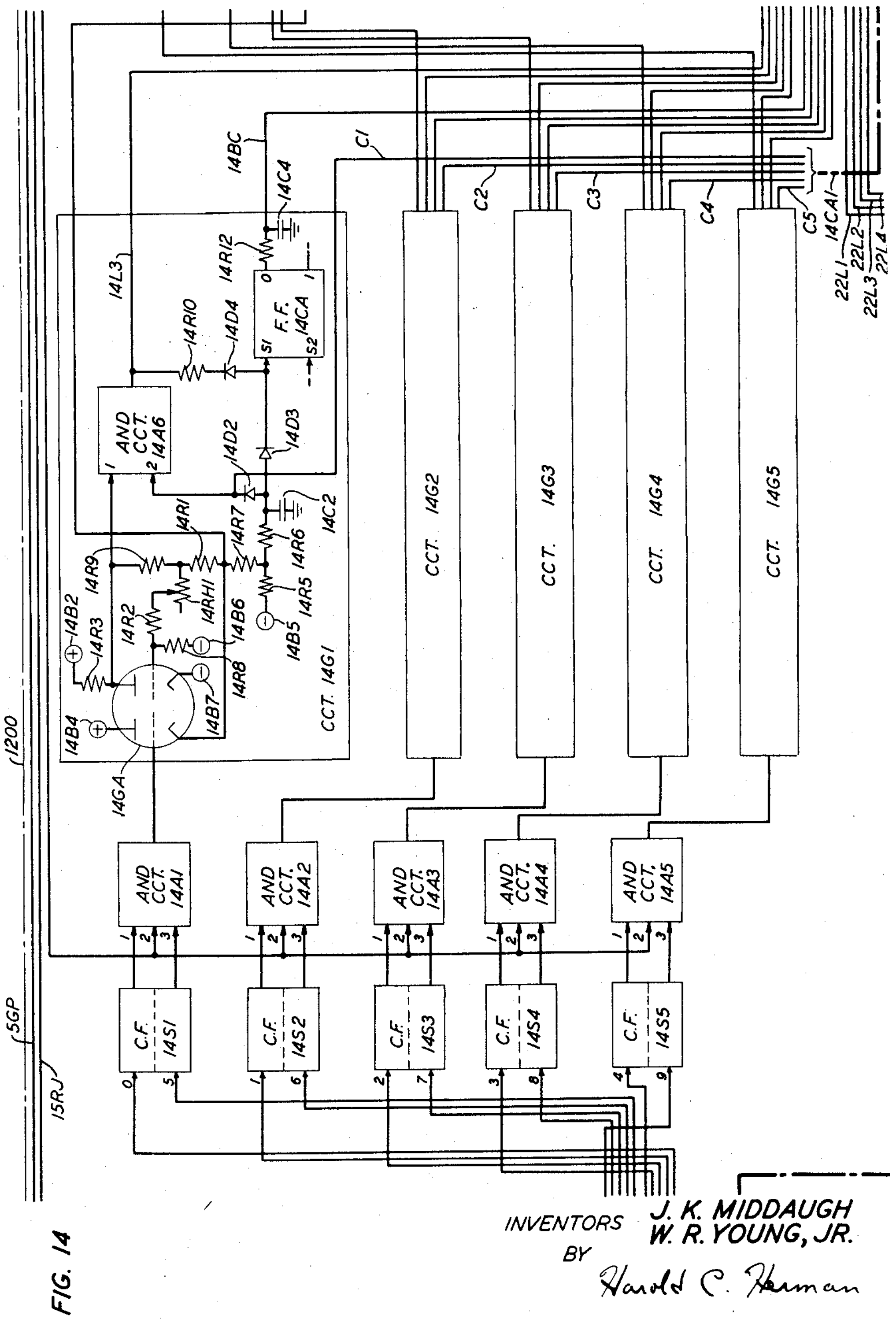
Figure 15:
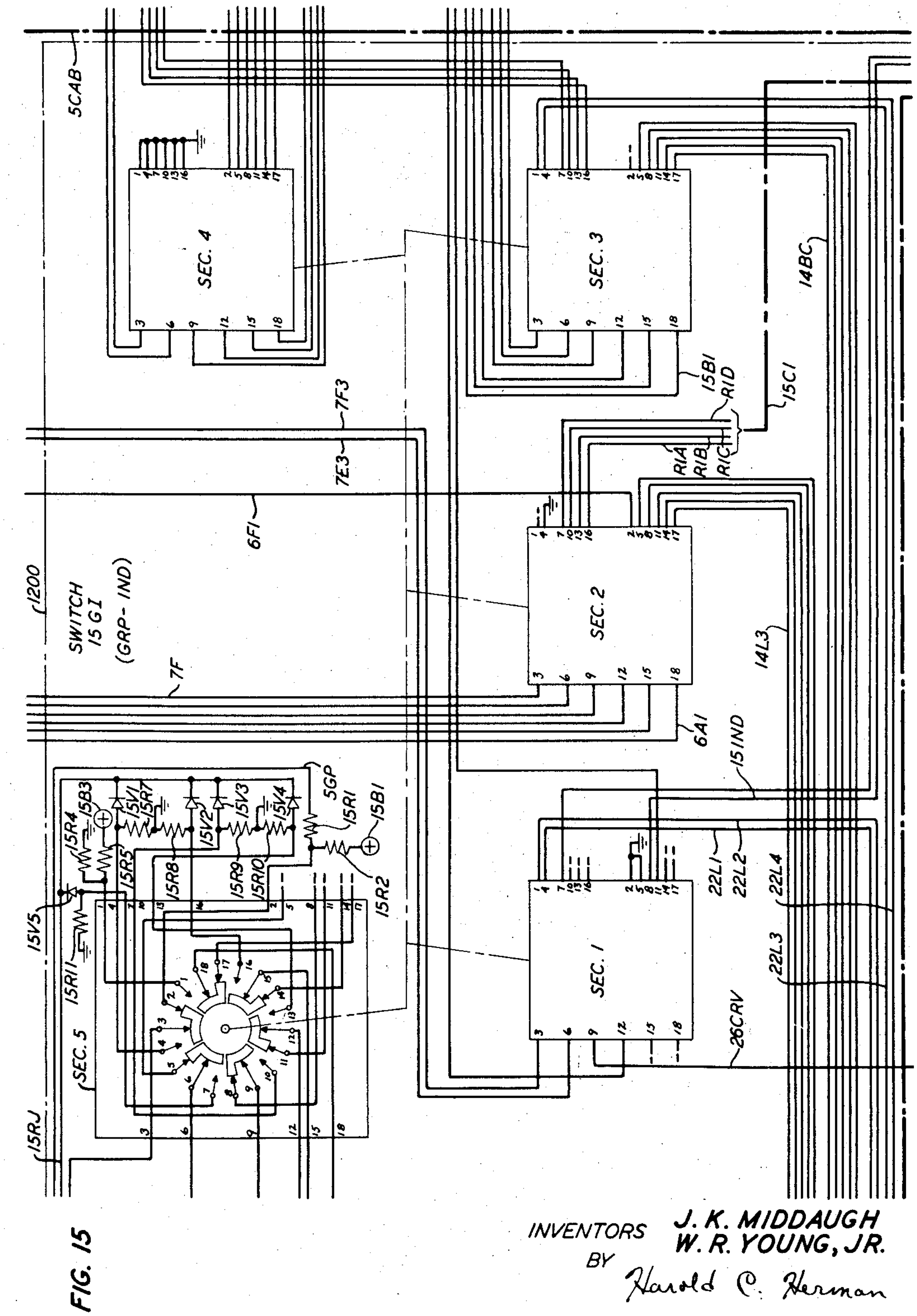
Figure 16:
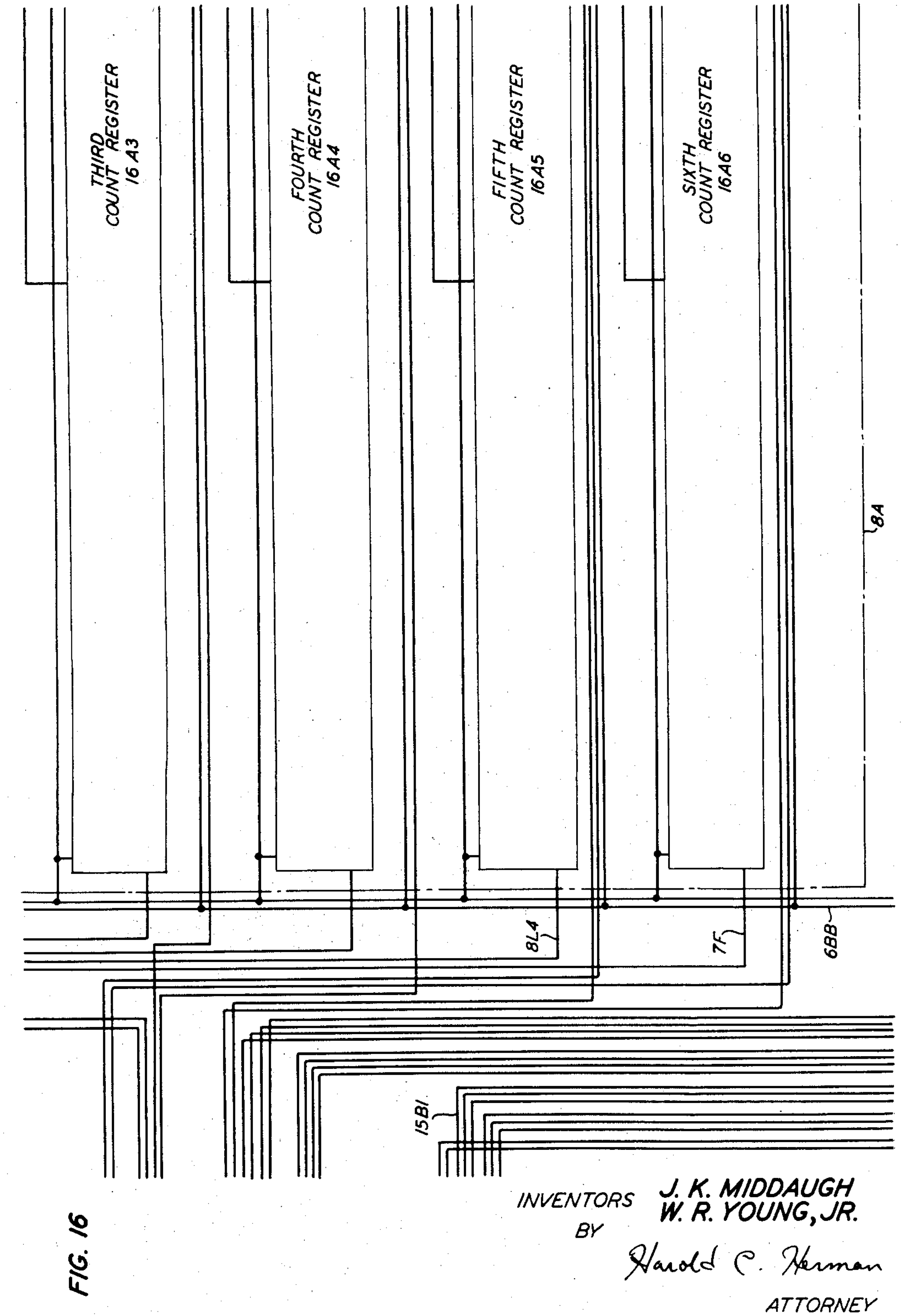
Figure 17:
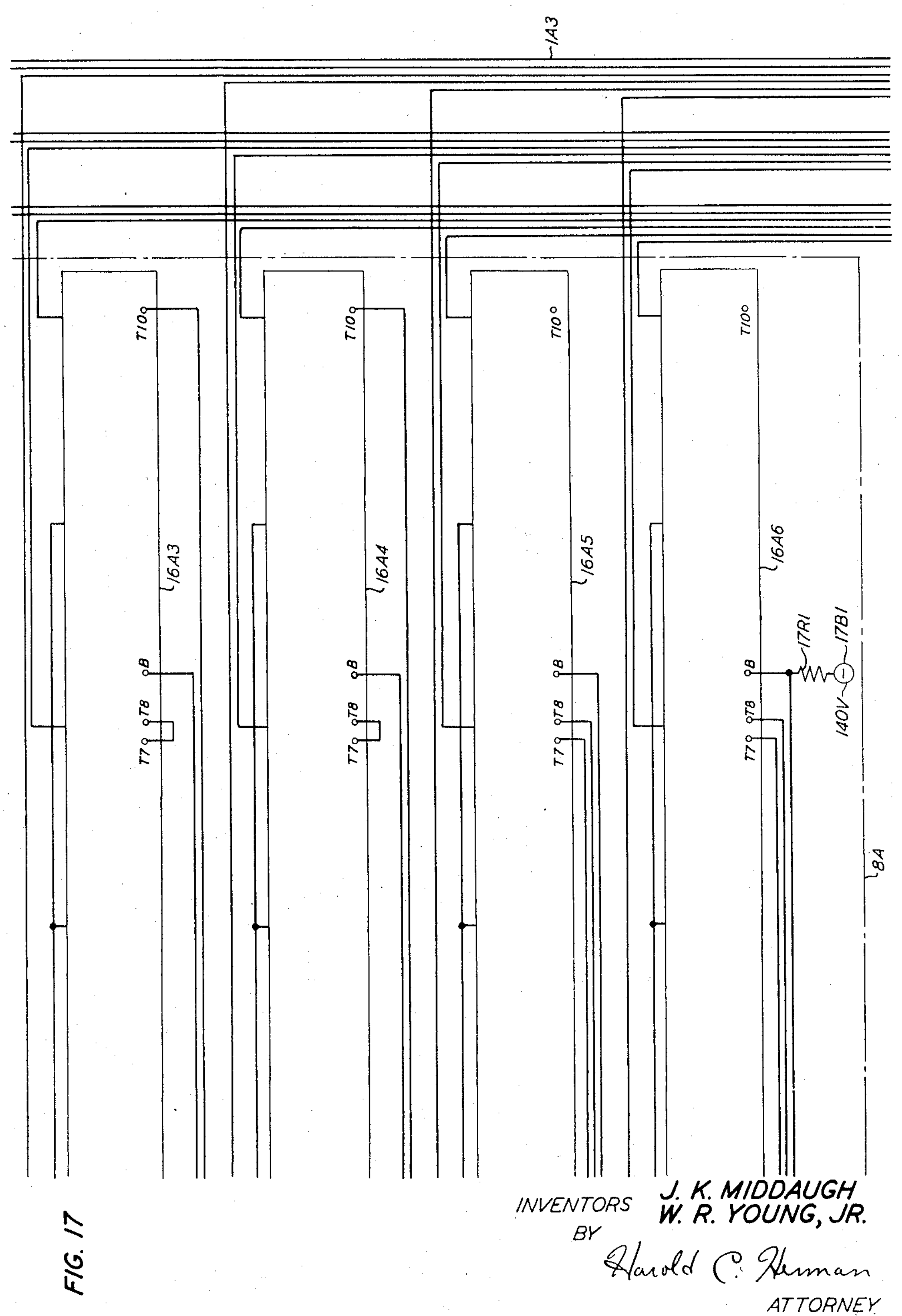
Figure 18:
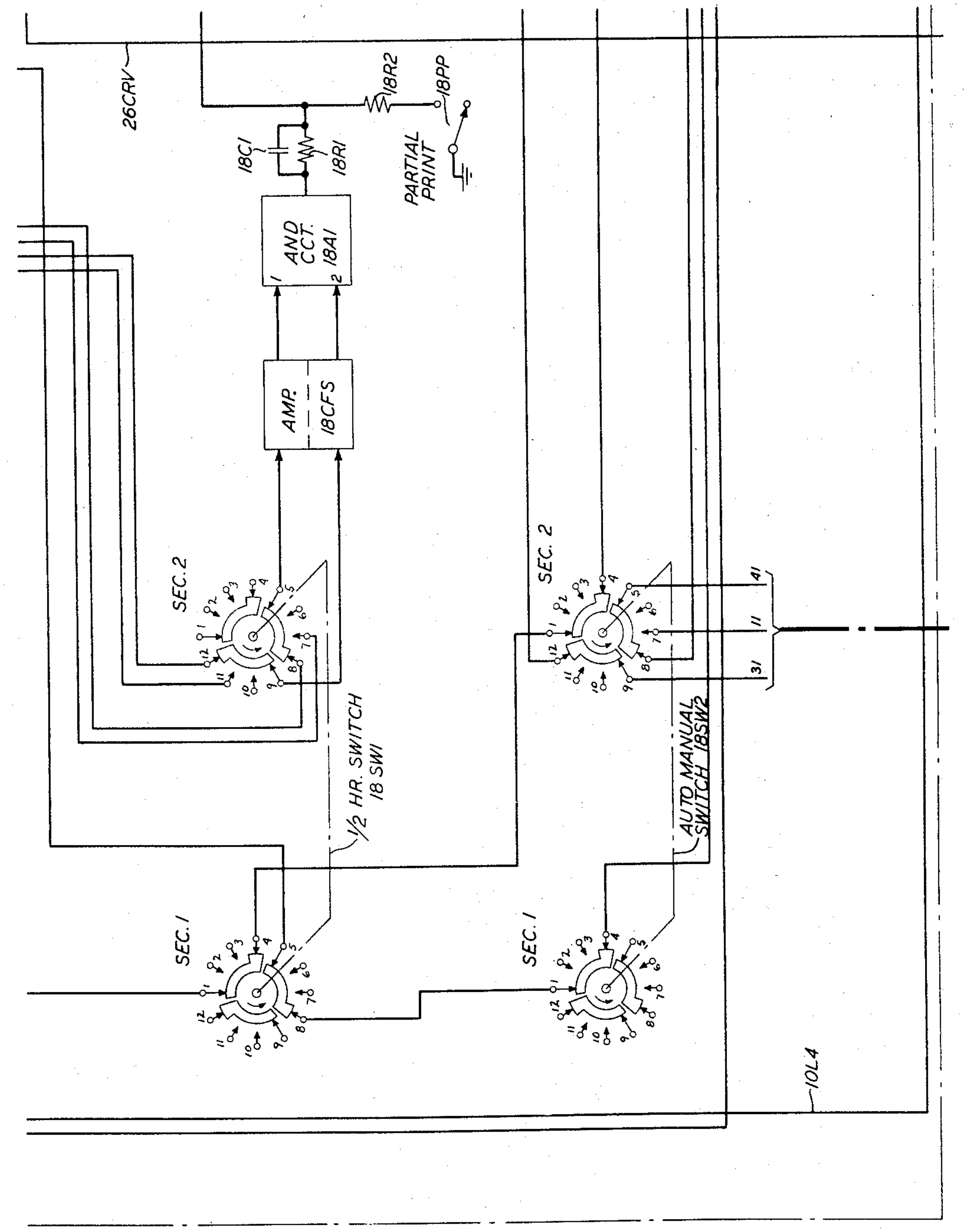
Figure 19:
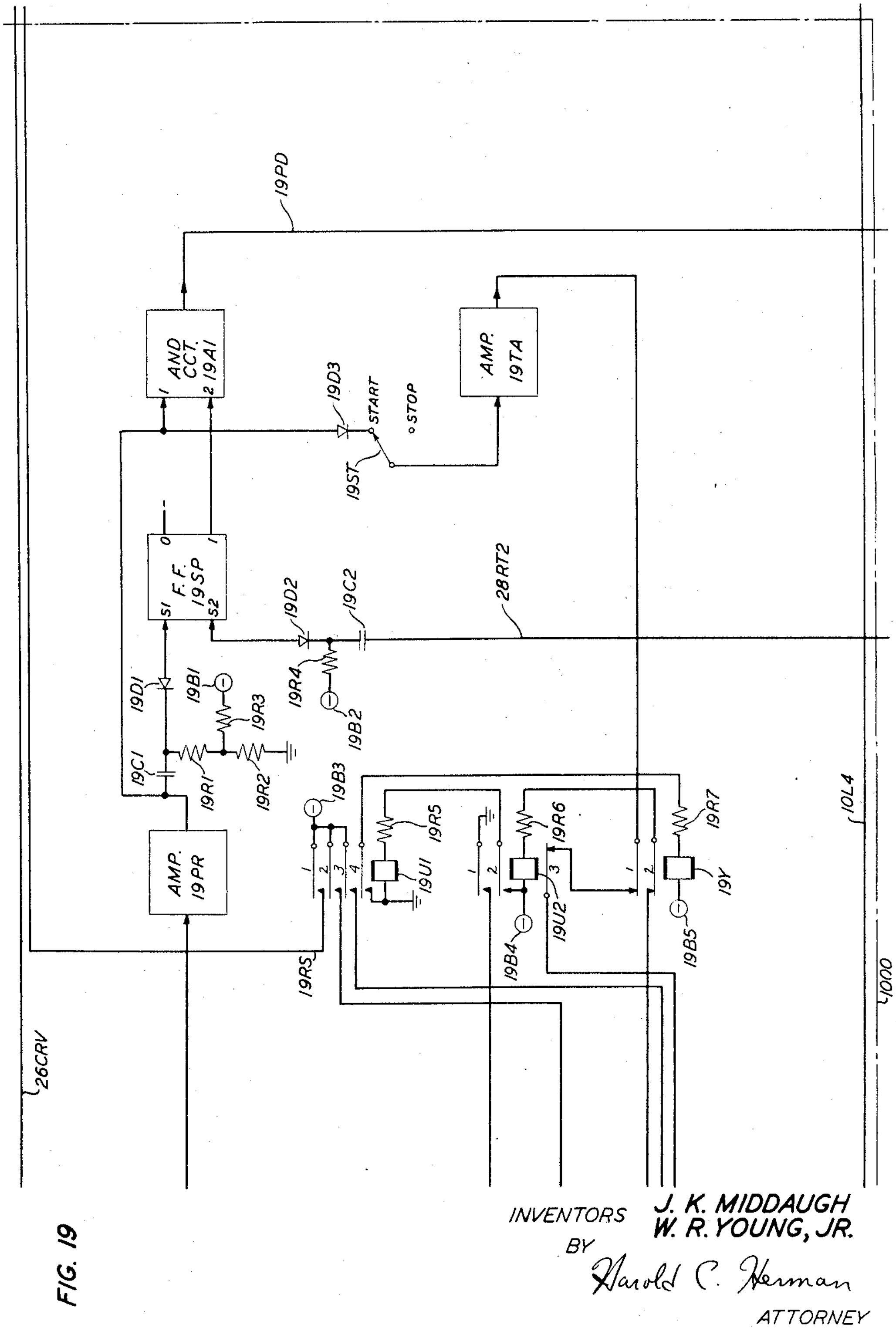
Figure 20:
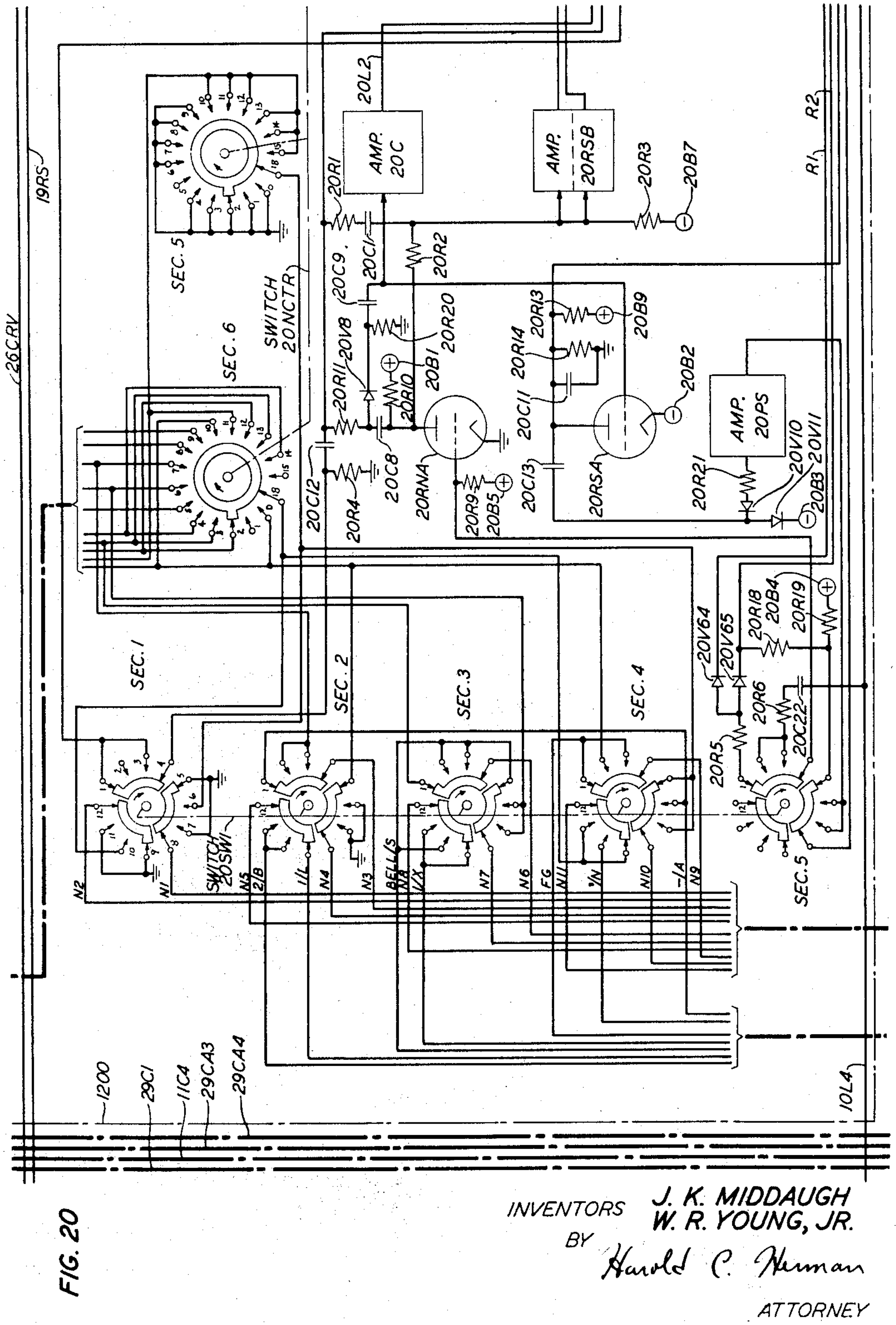
Figure 21:
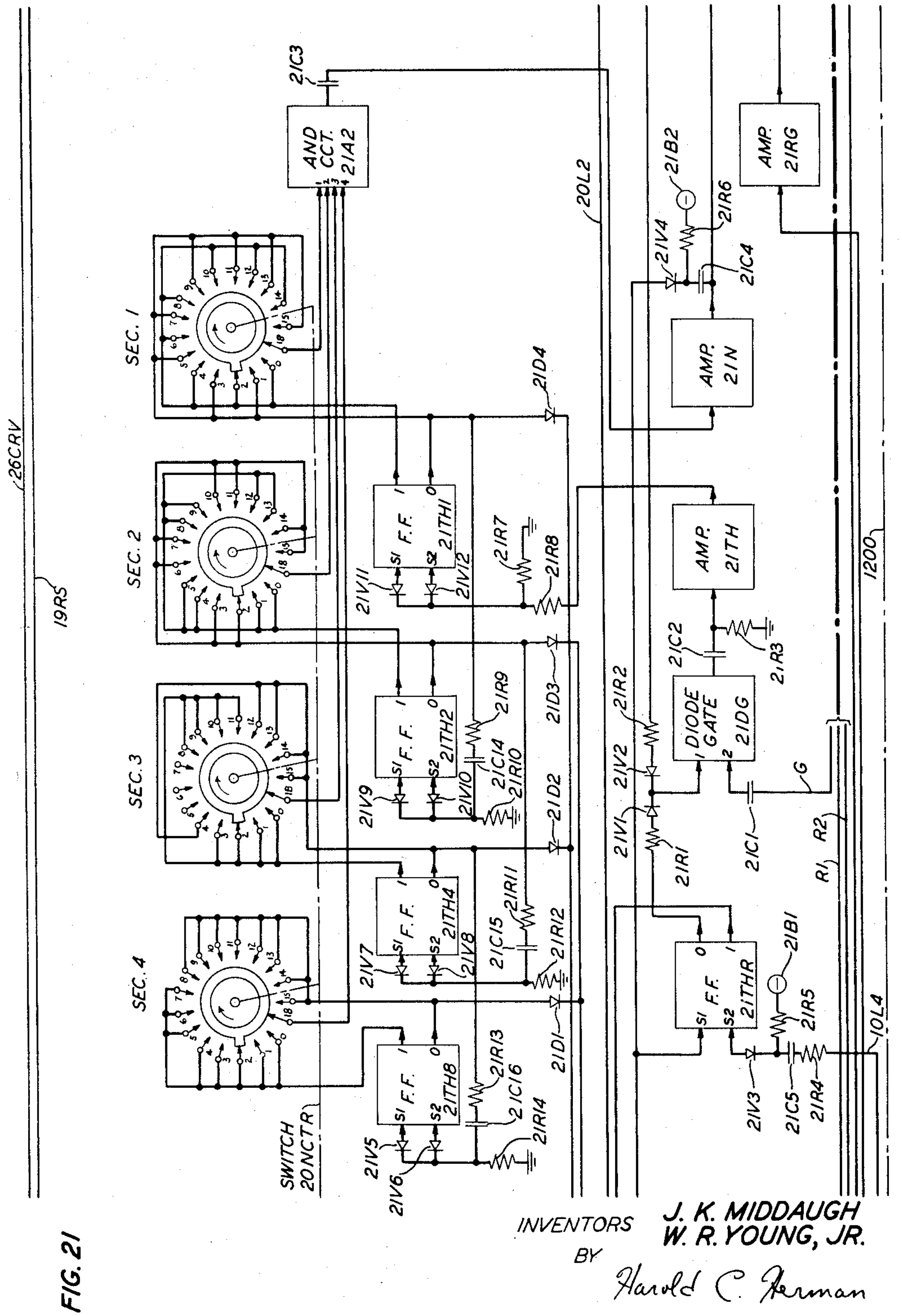
Figure 22:
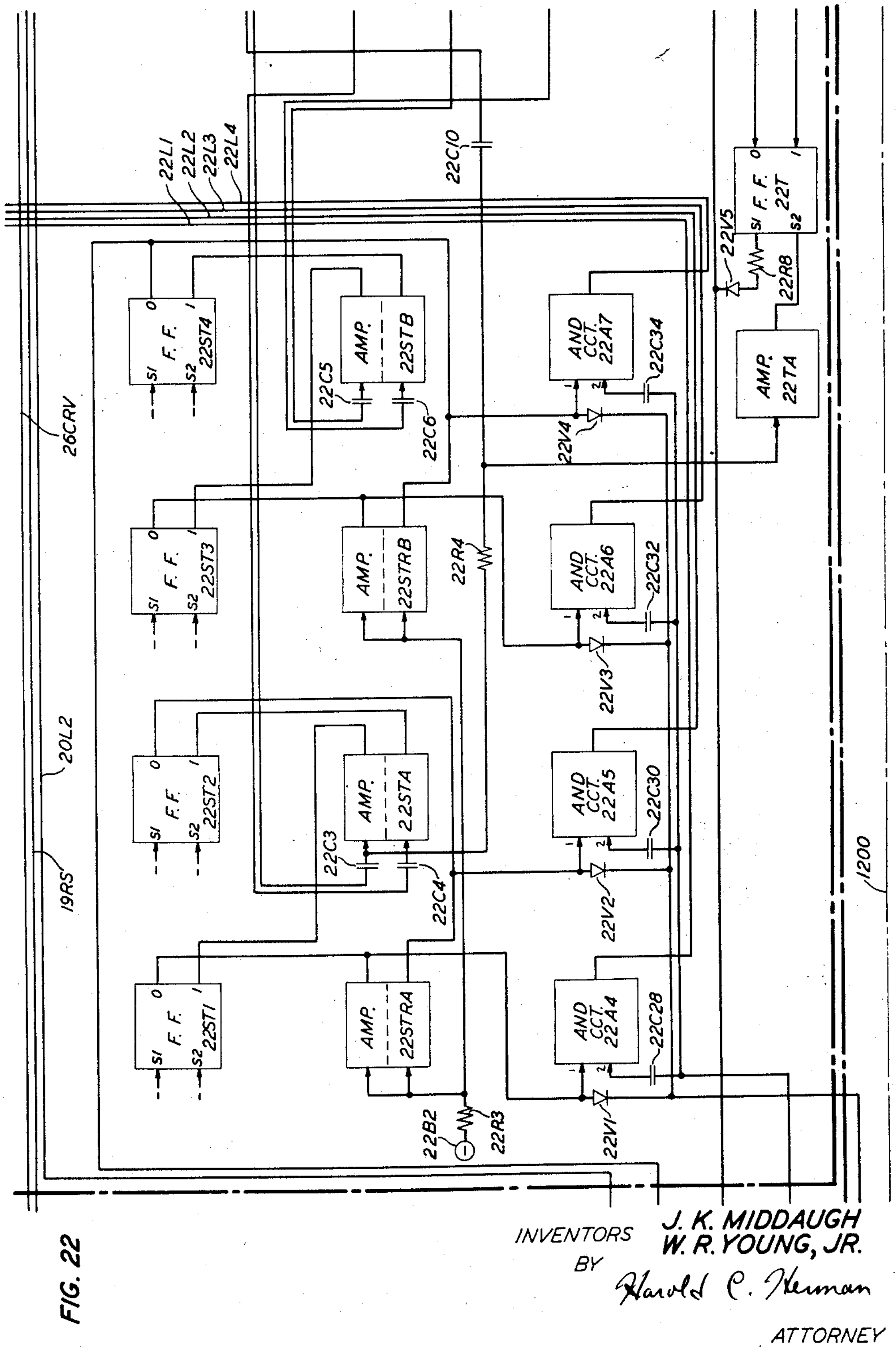
Figure 23:
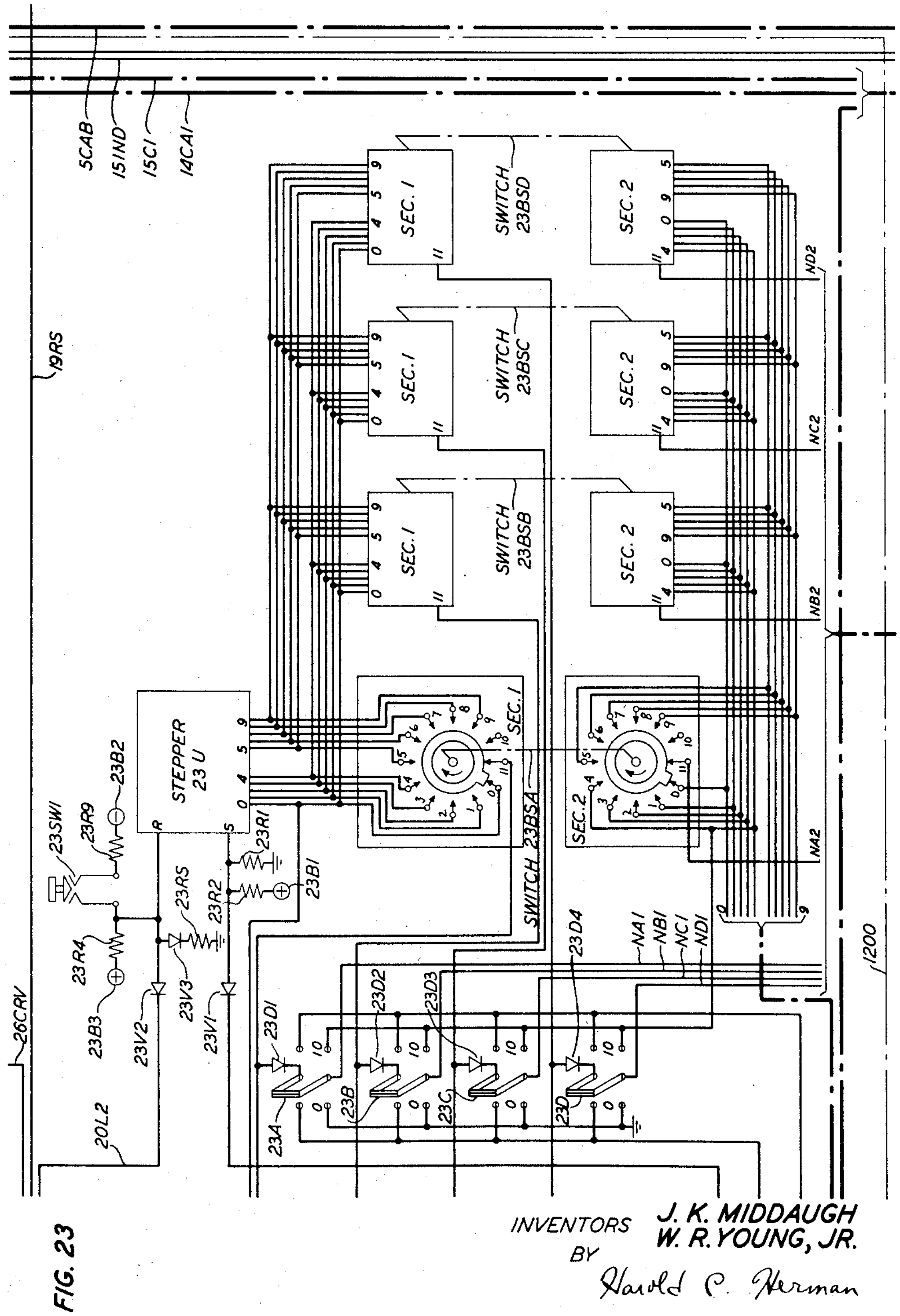

The dial-tone speed analysis provides information in tabulated form relating to dial-tone delay. To analyze the information on the tape 201 for group analysis and dial-tone speed distribution, the automatic data reader is set in the following manner:

(1) The switch 15GI is set to its group positions 1, 4, 7, etc.;

(2) The switch 12SW1 is set to the position NM;

(3) The units switches 12UA–E and the tens switches 13TA–E in the circuit 1200 are set to their BK positions which, as indicated in Figs. 12 and 13, are connected to ground;

(4) The switch 20SW1 in the circuit 1200 is set to its count positions 1, 5 and 9. The switch 20SW1 determines, as is hereinafter described, which one of the three types of group analyses is to be undertaken;

(5) The panel 37DT in the patch circuit 3700 is set to connect the lead 13MN to the lead G, the lead 13MM to the vertical lead R2, the leads 13SM, 13MS and 13SS to the vertical lead R1;

(6) The switch 20NCTR in the circuit 1200 is set at position 10;

(7) Switches 11SW1–4 in circuit 1000 are set to identify the particular recording session;

(8) Switch 18SW1 in circuit 1000 is set at the one hour accumulation position;

(9) Switch 18SW2 in circuit 1000 is set at the automatic position;

(10) The reset switch 32SW is operated to insure that circuits 8A and 24B are reset;

(11) The switch 10SW1 in circuit 1000 is operated to reset the counter 10SC;

(12) The switches 27SW1–2 in circuit 2600 are set to their off-inhibit positions;

(13) The switch 11SW5 in circuit 1000 is set at position C0;

(14) The switch 11RS is operated to reset the counter 11HC and the switch 11AD is operated to set the counter 11HC to the hour at which the recording session began; and

(15) The switches 23A–D and 23BSA–D are set to determine the distribution measurement levels. For example, assume it is desired to measure the number of calls for which there was more than 3 seconds dial-tone waiting time. To set the circuit 1200 for this measurement level the switch 20NCTR is set at its position 10, the switch 23A is set at its position 0 and the switch 23BSA is set at its position 3. The switches 23A and 23BSA respectively identify the tens and units digits of one measurement level. With the switches 23A and 23BSA set respectively at positions 0 and 3 everytime a call has a waiting time for dial tone that is greater than 3 seconds, a pulse will be provided to the count register circuit 8A. If the switches 23B and 23BSB are set respectively at positions 0 and 4 an indication will also be registered of the number of calls having a waiting time for dial tone which is greater than 4 seconds. As indicated in Fig. 40–*a* dial-tone delays of 3, 4, 5 and 6 seconds are separately registered.

As indicated in Fig. 44 when the recorder is measuring the wait time or dial-tone speed a positive signal is recorded in track 2 and a neutral signal is recorded in tracks 1 and 3 of the tape 201. The wait time coded signal is recorded on the tape 201 every 1/10 of a second. The automatic data reader utilizes the wait time coded signals to measure the duration of the dial-tone waiting time. With the automatic data reader set as indicated above, the analysis is initiated in the same manner as for the individual line analysis. Switch 28SW1 in the print program circuit 2600 is operated to initiate a sequence of operations for printing the heading shown in Fig. 40–*a* and switch 19ST in the time and scan program circuit 1000 is operated to initiate the actual accumulation of traffic data.

As described above for the individual line analysis, the two sequences of operations may occur simultaneously as long as the sequence for printing the heading terminates before the end of the accumulation period. In the sequence for printing the heading for the group analysis, the switch 15GI controls the printing of the words "CCS of group traffic" which appear in all three headings shown in Fig. 40. The switch 20SW1 controls the printing of the words "SIM BSY X 1 DXTBN" and the panel 37HD controls the printing of the words "INTRA REV," etc. on the second line of the heading. The digits at the end of the second line of the heading are controlled by the threshold switches 23A–D and 23BSA–D and the words "test, period, day and begin" at the left of the heading are provided directly from the voltage divider 34VD through the switches 29SA, 29SB, 30SC and 30SD to the print program circuit 2600.

When the switch 28SW1 is operated, it operates the selector 2900 to successively connect potentials to the tube 26ENC under control of the switches 15GI, 23A–D, 23BSA–D, and 20SW1 and the panel 37HD. For example, when the switch 29SB steps to its position 2, a connection is provided from ground through the contacts 5 and 8 of section 1 of switch 20SW1, through lead N1, terminal 2 of section B1 of switch 29SB, lead 15IND, terminals 7 and 9 of section 1 of switch 15GI, lead 26CRV to the vertical deflection plates of tube 26ENC in the print program circuit 2600. As shown in Fig. 41, the ground potential provides for a "space" indication to the teletypewriter 26TT. When the switch 29SB steps to position 3, it connects ground at contact 9 of section 1 of switch 20SW11 to provide for another space indication. When the switch 29SB steps to position 4, it connects the ground junction SP of the voltage divider 34VD to provide for still another space indication. When the switch 29SB steps to position 5, it connects the minus 10-volt junction LT to indicate to the teletypewriter 26TT that the next indication is a letter and not a figure. When the switch 29SB steps to position 6, the letter S is printed, and when the switch 29SB steps to position 7, the letter A is printed. The letters S and A are part of the word "samples" which is printed towards the end of the first line of the group heading shown in Figure 40, Table A.

In this manner, under control of the switches 20SW1 and 15GI and the panel 37HD the group heading is printed.

The sequence for printing the heading is completed during the time that the data information is being accumulated in the register circuit 8A. The coded signals on the tape 201 are supplied to the translator 300 which decodes and supplies them through the leads 13MN, 13NM, 13MM, 13SN, 13NS, 13SS, 13MS, 13SM and 13AB to the panel 37DT in the circuit 3700. The only coded signals that are decoded are those for which a mark or positive signal does not appear in track 1 of tape 201. The setting of switch 12SW1 provides for recognizing only signals for which a mark signal does not appear in track 1 of the tape 201. With the switch 12SW1 set at its position NM, an enabling potential is provided to terminal 2 of the AND circuit 5A1 as long the flip-flop circuit 3M in the input section 3IN1 remains reset. The enabling potential is provided from the terminal 0 of circuit 3M in section 3IN1 through the upper section of the cathode follower 4KF2 and switch 12SW1 to terminal 2 of the AND circuit 5A1. If the circuit 3M is set, the AND circuit 5A1 is disabled to in turn disable the diode matrix 5DM. The decoding is inhibited therefore when a positive signal appears on track 1.

As shown in Fig. 44, the only coded signals which do not have a positive signal on track 1 are the dial-tone timing signals and the four "end-of-request" coded signals. As described above, the dial-tone and end-of-request signals are not recognized when the switch 12SW1 is set to its position M. The dial-tone signals are translated by the diode matrix 5DM and provided as negative signals on lead 13MN and on lead 13AB to the panel 37DT in the circuit 3700. The four different end-of-request signals are translated or decoded by the diode matrix 5DM and provided as a negative pulse on lead 13AB and on an associated one of the four leads 13SM, 13MM, 13MS and 13SS to the panel 37DT in the circuit 3700.

One negative signal is provided through lead 13MN for every 1/10 of a second of dial-tone waiting time. The negative pulse is provided from the matrix 5DM through lead 13MN, the panel 37DT, lead G, through cable 37L4 and the capacitor 21C1 to the diode gate 21DG. As described above, the panel 37DT is preset to establish a connection from lead 13MN to lead G.

The diode gate 21DG is controlled by a flip-flop circuit 21RTHR which is connected thereto through the resistor 21R1 and the varistor 21V1. When the circuit 21RTHR is normal or reset the negative pulses through lead G are transmitted through the gate 21DG and the capacitor 21C2 to the amplifier 21TH. The capacitor 21C2 is connected to ground through the resistor 21R3. For every negative pulse on lead G from the circuit 3700 there is a minus 80-volt pulse at the output of the amplifier 21TH as long as the flip-flop circuit 21RTHR remains reset. The output of the amplifier 21TH drives a four-stage binary counter consisting of the flip-flop circuits 21TH1, 21TH2, 21TH4 and 21TH8. The minus 80-volt pulse from the amplifier 21TH is connected through the resistor 21R8, which is connected to ground through the resistor 21R7, to the varistors 21V1–12. Terminals S1 and S2 of the circuits 21TH1, 21TH2, 21TH4 and 21TH8 are connected respectively to the varistor 21-V11–12, 21V9–10, 21V7–8 and 21V5–6 and the terminals 1 and 0 of the circuits 21TH1, 21TH2, etc. are connected respectively to selected terminals of sections 1–4 of the switch 20NCTR. Terminal 18, which is the common output terminal of sections 1–4 of the switch 20NCTR, is connected to an AND circuit 21A2. The switch 20NCTR determines when the AND circuit 21A2 is enabled under control of the four-stage binary counter. With the switch 20NCTR set at position 10, when ten negative pulses are provided through the amplifier 21TH, the binary counter will register a count of 10 and the AND circuit 21A2 will be enabled. The setting of the switch 20NCTR in this manner divides the number of pulses provided to the circuit 1200 by a factor which is equal to its setting. With the switch 20NCTR set at its position 10, the AND circuit 21A2 is enabled one for each one second of dial-tone delay because each of the ten pulses provided to the circuit 1200 represents 0.1 second dial-tone delay.

When the first negative pulse is provided from the amplifier 21TH it sets the flip-flop circuit 21TH1. The output terminal 1 of the circuit 21TH1 is connected through terminals 10 and 18 of section 1 of the switch 20NCTR to the terminal 4 of the AND circuit 21A2. Terminal 0 of the circuit 21TH1 is connected through the resistor 21R9 and the capacitor 21C14, to the varistors 21V9–10 and also to the grounded resistor 21R10. When the second pulse is provided to the flip-flop circuit 21TH1 it provides a negative pulse from its terminal 0 to the varistors 21V9 and 21V2 causing the circuit 21TH2 to set. In a similar manner everytime the circuit 21TH2 is reset, it sets the circuit 21TH4, and everytime the circuit 21TH4 is reset it sets the circuit 21TH8. The output terminal 0 of the circuit 21TH2 is connected through the resistor 21R11 and capacitor 21C15 to varistors 21V7–8 and to the grounded resistor 21R12, and the output terminal 0 of the circuit 21TH4 is connected through the resistor 21R13 and capacitor 21C16 to the varistors 21V5–6 and to the grounded resistor 21RI4.

When the binary counter reaches a count of 10, a positive pulse is provided from the AND circuit 21A2, through the capacitor 21C3, to the amplifier 21N. The amplifier 21N is an inverter amplifier so that a negative pulse is provided from the amplifier 21N for each positive pulse thereto. The negative pulse from the amplifier 21N is provided through the varistor 23V1 to the set terminal S of the stepper 23U. The stepper 23U is similar to the steppers 8ST, etc., described above, so that its output potential is advanced from its terminal 0 to its terminal 1. The terminal S of the stepper 23U is also connected to ground through the resistor 23R1 and to battery 23B1 through the resistor 23R2.

The negative pulse from the amplifier 21N is also coupled through a capacitor 21C4 which is connected to battery 21B2 through resistor 21R6. The pulse through the capacitor 21C4 is provided through a varistor 21V4 to terminal S1 of the flip-flop circuit 21RTHR. With the switch 20SW1 in its count positions 1, 5 and 9, a capacitor 20C12 is connected between the terminal S1 and the terminal 1 of the circuit 21RTHR to convert the circuit 21RTHR to a monostable circuit which has an operating duration of approximately 1 millisecond. Terminal 1 of the circuit 21RTHR is connected through the capacitor 21C12, which is connected to ground through the resistor 21R4, through contacts 4 and 1 of section 1 of switch 20SW1 back to the terminal S1 of the circuit 21RTHR. With the switch 20SW1 set for dial-tone analysis, the circuit 21RTHR operates therefor as a monostable circuit instead of a bistable circuit.

When the circuit 21RTHR operates, it disables the diode gate 21DG for 1 millisecond and it resets the binary counter consisting of circuits 21TH1, etc. The binary counter is reset by the pulse from terminal 1 of circuit 21RTHR which is differentiated through the resistor 20R1 and capacitor 20C1 and amplified through both sections of the amplifier 20RSB. The capacitor 20C1 is also connected to the battery 20B7 through the resistor 20R3 and to the plate of a tube 20RNA through the resistor 20R2. The amplified pulses through the sections of the amplifier 20RSB are connected respectively through the varistors 21D1–4 to th terminals 0 of the circuits 21TH1, 21TH2, 21TH4 and 21TH8. A negative reset pulse is provided to the terminals 0, in this manner, to insure that all four of the flip-flop circuits are reset since some may be set and some may be reset when the reset pulse is provided thereto. A negative pulse to terminal 0 functions to reset each of the flip-flop circuits just as if a negative pulse was provided through its terminal S2. In this manner the binary counter has counted ten of the 1/10 second wait time coded signals and provided an indication of the count to the stepper 23U. The binary counter is thereafter reset to be ready to count additional wait time recorded signals. When the next negative pulse appears through the lead G from the circuit 3700 the binary counter again advances and repeats the sequence of operations, described above, to store a count of 2 in the stepper 23U. The sequence of operations continues until the thirtieth pulse appears through the lead G to cause the stepper 23U to advance to its position 3.

When the stepper 23U provides an output potential at its terminal 3 it operates a flip-flop circuit 22ST1. The output terminal 3 of the stepper 23U is connected through the terminal 3 of section 1 of the switch 23BSA, capacitor 22C3 and the upper section of the amplifier 22STA to terminal 1 of the flip-flop circuit 22ST1.

Everytime the stepper 23U advances it generates a positive pulse which is connected to sections 1 of the switches 23BSA–D. Section 2 of switches 23BSA–D are utilized for printing the heading. Due to the above-listed assumed setting of the switches 23BSA–D and 23A–D a positive pulse is inhibited until the stepper 23U steps to its terminal 3. Either the path through the switches 23BSA–D is discontinuous or one of four diodes 23D1–4 inhibits the transmission path from the switches 23BSA–D. The bias on the diodes 23D1–4 is controlled by a flip-flop circuit 22T. When the tens switch 23A is in its 0 position, the flip-flop circuit 22T must be non-operated or in its reset condition to enable the path from section 1 of switch 23BSA to the amplifier 23STA. As is hereinafter described, the flip-flop circuit 23T is operated when the stepper 23U steps from the ninth to its 0 position due to the connection through the capacitor 22C10. When the flip-flop circuit 22T is operated it forward biases the varistor 23D1 to inhibit the transmission of the pulse to the amplifier 23STA.

The amplifier 23STA is an inverter amplifier so that a negative pulse is provided to the terminal 1 of the flip-flop circuit 22ST1. When a negative potential is provided to the flip-flop circuit 21ST1 the circuit 22ST1 is set to provide a positive pulse at its terminal 0. A positive potential at terminal 0 of the circuit 22ST1 is provided to the terminal 1 of the AND circuit 22A4. If a positive pulse appears through the capacitor 22C28 to terminal 2 of the circuit 22A4 it is coupled to the switch 15GI. A pulse is provided to the capacitor 22C28 from an amplifier 21RG only when the service request for dial tone is terminated as indicated by reading one of four terminating request coded signals shown in Fig. 44. The sequence of operations for operating the amplifier 21RG is hereinafter described.

During the time that circuit 22ST1 is being set, the sequence of operations for resetting the binary counter consisting of circuits 22TH1, etc., takes place so that another ten pulses can be counted. When the next set of ten pulses are counted a pulse is provided from terminal 4 of the stepper 23U through contact 4 of section 1 of switch 23BSB, capacitor 22C4 and the lower section of amplifier 23STA to set the flip-flop circuit 22ST2. With the switches 23BSC–D set at positions 5 and 6 a similar action takes place at the end of the fiftieth and sixtieth pulses which are provided through lead G to set the circuits 22ST3 and 22ST4. When the fiftieth pulse is counted, a pulse is provided from terminal 5 of the stepper 23U through section 1 of the switch 23BSC, capacitor 22C5 and the upper section of the amplifier 22STB to set the flip-flop circuit 22ST3, and when the sixtieth pulse is counted a pulse is provided from terminal 6 of stepper 23U through section 1 of the switch 23BSD, capacitor 22C6 and the lower section of the amplifier 22STB to set the flip-flop circuit 22ST4.

When the flip-flop circuit 22ST4 is operated, it applies ground potential from its terminal 0 through the resistor 21R2 and the varistor 21V2 to disable the diode gate 21DG. When the gate 21DG is disabled, it inhibits subsequent pulses through lead G from the circuit 3700. Subsequent timing pulses which are received every $\frac{1}{10}$ of a second through lead G are ignored. When the service request terminates, a negative pulse is provided through the panel 37DT to either the lead R1 or the lead R2. A negative pulse on the lead R2 indicates that dial tone was provided to terminate the service request, and a negative pulse on the lead R1 indicates that dial tone was not provided.

When dial tone is provided, the recorded coded signal terminating the dial-tone delay signals is a positive signal on tracks 2 and 3 as shown in Fig. 44. When the "served" terminating signal is read, a negative pulse is provided from the translator 300 through lead 13MM and the panel 37DT to lead R2. When a "match," "abandon" or "all trunks busy" terminating signal is read, a negative signal is provided through the associated one of the leads 13SM, 13MS and 13SS and the panel 37DT to the lead R1.

When a negative pulse appears on lead R1, it is coupled through the varistor 20V64, the resistor 20R5, contacts 1 and 4 of section 5 of the switch 20SW1 to the control grid of the triode tube 20RNA which was mentioned above. The control grid of the tube 20RNA is also connected to the battery 20B5 through the resistor 20R9. The cathode of tube 20RNA is connected to ground and its anode is connected to the battery 20B1 through the resistor 20R10. The negative pulse at the control grid of tube 20RNA provides for a plus 80-volt pulse at its anode which is coupled through the resistor 20R2 and the upper and lower sections of the amplifier 20RSB to the binary counter shown in Fig. 21. As described above, the amplifier 20RSB is an inverter amplifier so that negative pulses are provided through the resistors 21D1–4 to reset the binary counter.

A positive pulse at the anode of tube 20RNA is also coupled through the capacitor 20C8, varistor 20V8 and capacitor 20C9 to the control grid of the triode tube 20RSA. The cathode of the tube 20RSA is connected to the negative battery 20B2 and its anode is connected to the positive battery 20B9 through the resistor 20R13 and to ground through the capacitor 20C11 and also through the resistor 20R14. The tube 20RSA functions to invert the positive pulse provided thereto and to supply the inverted pulse to the varistors 22V1–4 which are connected respectively to the terminals 0 of the circuits 22ST1–4 causing them to reset. When the circuits 22ST1–4 are reset they disable their associated AND circuits 22A4–7. The information stored in the circuits 22ST1–4 is in this manner erased and not registered in the count register circuit 8A when the terminating pulse is provided through lead R1 from the circuit 3700.

The positive pulse at the anode of tube 20RNA is also provided through capacitor 20C8, varsitor 20V8 and capacitor 20C9 to the amplifier 20C. The junction of capacitor 20C9 and varistor 20V8 is connected to ground through the resistor 20R20. The amplifier 20C provides a negative pulse through the lead 20L2 and varistor 23V2 to the reset terminal R of the stepper 23U. The reset terminal R of the stepper 23U is also connected through the varistor 23V3 and the resistor 23R5 to ground and through the resistor 23R4 to the battery 23B3. The switch 23SW1, which is also connected thereto, is utilized to manually reset the stepper 23U by connecting the battery 23B2 through the resistor 23R9 to terminal R of the stepper 23U. The data analysis and control circuit 1200 is in this manner returned to normal by the pulse through lead R1 and ready to measure the next wait time indication on the tape 201. No information has been provided to the circuit 8A because dial tone was not provided to the calling subscriber as indicated by the negative pulse through leads 13MM and R1.

If the call, for which the dial-tone delay is being determined, was served, with dial tone being provided, the negative pulse appears on lead R2, as described above, instead of on lead R1 from the panel 37DT. The negative pulse on lead R2 is provided through the varistor 20V65, resistor 20R5, contacts 1 and 4 of section 5 of switch 20SW1 to the control grid of the tube 20RNA. Thereafter the sequence of operations is exactly the same as that for a pulse through lead R1 in resetting the binary counter in Fig. 21, the circuits 22ST1–4 and the stepper 23U. The pulse through lead R2, however, is also applied through resistor 20R18, which is connected to the battery 20B4 through the resistor 20R19, through contacts 5 and 8 of section 5 of the switch 20SW1 to the amplifier 21RG. As described above, the amplifier 21RG is connected respectively through the capacitors 22C28, 22C30, 22C32 and 22C34 to the AND circuits 22A4–7. The pulse from the amplifier 21RG is provided to the circuits 22A4–7 before they are disabled by the resetting of the circuits 22ST1–4 due to the pulse through lead R2. If all four of the circuits 22ST1–4 have been set to indicate that the total waiting time for dial tone was greater than 6 seconds the pulse from the amplifier 21RG is coupled respectively through the circuits 22A4–7 and leads 22L1–4 to sections 1 and 3 of the switch 15GI. A pulse through lead 22L1 indicates that the delay for dial tone was greater than 3 seconds, the pulse through lead 22L2 indicates that the delay for dial tone was greater than 4 seconds, etc.

The leads 22L1–4 are connected respectively through the switch 15GI to the count registers 16A5, 16A6, 32B5 and 32B6. When the switch 15GI is set to its group positions 1, 4, 7, etc. it serially connects the register 8A1 to the register 24B1, the register 8A2 to the register 24B2, the register 16A3 to the register 32B3, and the register 16A4 to the register 32B4. For example, the output terminal T3 of the hundreds stepper 9STH of the register 8A1 is connected through terminals 16 and 18 of section 3 of the switch 15GI, and lead 15B1 to the input of the count register 24B1. Each of the four resultant serially connected registers are five-stage decade registers which can count up to 100,000. The other four registers 16A5, 16A6, 32B5 and 32B6 are not serially connected when the switch 15GI is set to its group positions. The count register 16A5 receives the indications corresponding to dial-tone delays over 3 seconds, the count register 16A6 receives the indications corresponding to dial-tone delays over 4 seconds, the register 32B5 receives indications corresponding to dial-tone delays over 5 seconds and the register 32B6 receives the indications corresponding to dial-tone delays over 6 seconds. Lead 22L1, for example, is connected through the terminals 4 and 6 of section 1 of the switch 15GI, lead 7E3, capacitor 7C4, the upper section of the stepping amplifier 7AMP and lead 8L4 to the count register 16A5. The count registers 16A5, 16A6, 32B5 and 32B6 in this manner accumulate the distribution of dial-tone delays.

If the dial-tone delay for a call is, for example, between 4 and 5 seconds a count pulse is provided to the registers 16A5 and 16A6 but not to the registers 32B5 and 32B6.

As indicated in Table A of Fig. 40, in addition to determining the distribution of dial-tone delays, the terminating call indications are also separately accumulated. The dial-tone termination indications are accumulated in the five-stage decade registers, described above, in circuits 8A and 24B. As described above, the panel 37DT is set so that the termination indications are provided to lead R1 and also to an associated one of the leads RIA–D. Each of the leads RIA–D is connected to one of the five-stage decade registers described above. For example, the lead RIA from the panel 37DT is connected through terminals 16 and 18 of section 2 of the switch 15GI and lead 6A1 to the converter 6CCS1 in the converter circuit 600. As described above, the converter 6CCS1 functions to multiply the pulses provided thereto by a factor of 1.5. For every two pulses provided to the converter 6CCS1, three pulses are provided from the lead 6ST1 to the terminal T2 of the register 8A1. The count register circuits 8A and 24B function in this manner to accumulate the dial-tone terminations and the distribution of dial-tone delays.

At the end of the accumulation period the time and scan program circuit 1000 functions, as described above, to initiate the operation of the print program circuit 2600 and to stop the operation of the reading circuit 2RC. The sequence of operations in the print program circuit 2600 and the print selector 2900 controlled thereby for printing the accumulated data is similar to that described above for the individual data analysis. With the switch 15GI set at its group position the sections E1 and E2 of switch 31SE and sections F1 and F2 of switch 31SF are utilized to successively connect the output potentials from the eight registers in the circuits 8A and 24B. There are eight registers because of the serial connections established by the switch 15GI.

*Number of simultaneously busy lines*

As described above, the information that is recorded on the tape 201 can be analyzed on an individual line basis or on a group basis. When the information is analyzed on a group basis, as determined by the setting of the switch 15GI, three different types of analyses may be performed. As described above, the three different types of group analyses are dial-tone speed, number of simultaneously busy lines and consecutive number of scans that a given number of lines are simultaneously busy.

To provide for determining the number of simultaneously busy lines during each scan, the switch 20SW1 is set at its "SIM" positions 3, 7, etc. instead of its count positions 1, 5, etc., and the switch 12SW1 is set at its position M instead of its position MN. All the rest of the switch settings listed above in the description of the dial-tone speed distribution analysis are the same.

With the switch 12SW1 set at its position M, the dial-tone delay indications and the termination indications are ignored and the busy indications are considered. The panel 37DT may be set to accumulate any of the busy indications. As indicated in Fig. 40, Tables B and C, the intragroup busy indications are accumulated, the revertive call indications are accumulated, the non-classified busy indications are accumulated and the total of the intragroup, revertive and non-classified indications are also accumulated. To provide for these accumulations the panel 37DT is set to connect lead 13MM to the lead RIA, the lead 13NM to the lead RIB, the lead 13MN to the lead RIC, the leads 13MM, 13NM, and 13MN, respectively, to the varistors 37V1–3, and lead A2 to the lead RID. The panel 37DT is set in the same way for determining the distribution of simultaneous busy line and for determining the number of consecutive scans that given numbers of lines are busy.

The leads RIA–D are connected through section 2 of the switch 15GI to the converters 6CCS1–2 and 7CCS3–4 in the converter circuit 600 so that the respective busy indication durations are accumulated in the four associated five-stage registers.

For the simultaneous indications for each scanning cycle, any type of busy indication may be considered. For example, the distribution of simultaneous busy indications for each scanning cycle may be for intragroup busy indications or for revertive call busy indications or for all busy indications. Assume that it is desired to determine the distribution of all simultaneous busy indications independent of what kind of busy indication is read. To provide for the distribution of any simultaneous busy indication for each scanning cycle the lead 13AB is connected in the panel 13DT to the lead G. With the lead 13AB connected to the lead G, everytime a busy indication is read on the tape 201 a negative pulse is provided through the lead 13AB, the panel 37DT, lead G and capacitor 20C1 to the diode gate 21DG. As described above, the diode gate 21DG is normally enabled to allow the passage of the negative pulses through lead G to the four-stage binary counter consisting of the circuits 21TH1, etc. In this manner each of the coded busy indications provides for a count pulse to the binary counter. If the switch 20NCTR is set at its position 1 so that the number of pulses are multiplied by 1, the AND circuit 21A2 is enabled for each pulse through the lead G. In this manner the stepper 23U counts the number of pulses through the lead G from the panel 37DT. The switches 23A–D and 23BSA–D determine the distribution levels in a manner similar to that described for the dial-tone delay group analysis. For example, if the switches 23A–D are all set to the 0 position and the switches 23BSA–D are set respectively to positions 3, 4, 5 and 6, the circuit 22ST1 is set when the stepper 23U counts three of the pulses through the lead G. The circuit 22ST2 is set when the stepper 23U counts four pulses through the lead G, etc.

The information is read from the circuits 22ST1–4 under control of the time and scan program circuit 1000. For the dial-tone analysis the circuits 22ST1–4 were read under control of a pulse through lead R2 from the circuit 3700. The pulse through lead R2 was provided when the coded signal indicated that dial tone was provided to terminate the service request. When the distribution of the number of simultaneously busy lines for each scan is to be determined the information is read from the circuits 22ST1–4 by a pulse provided from the circuit 1000 at the end of each scan.

As described above, a multivibrator 10MV in the circuit 1000 is operated once for each scan or sampling cycle and remains operated throughout the scan. When the multivibrator 10MV operates, it operates a scan counter 10SC, as described above, and it also provides a pulse through the lead 10L4 to the data analysis and control circuit 1200. In the circuit 1200 the pulse is coupled through the lead 10L4, resistor 21R4, capacitor 21C5 and varistor 21V3 to the terminal S2 of the flip-flop circuit 21RTHR. The junction of capacitor 21C5 and varistor 21V3 is connected to battery 21B1 through the resistor 21R5. The control pulse from the multivibrator 10MV resets the circuit 21RTHR. The pulse through lead 10L4 is also coupled through the capacitor 20C22, the resistor 20R6, terminals 3 and 4 of section 5 of switch 20SW1 to the control grid of tube 20RNA. The tube 20RNA is cut off by the negative pulse to its control grid to provide, as described above, a positive pulse through the amplifier 20RSB to reset the binary counter consisting of the circuits 21TH1, etc., a reset pulse through the amplifier 20C and lead 20L2 to reset the stepper 23U and a reading pulse through the varistor 20V10, capacitor 20R21, amplifier 20PS, terminals 7 and 8 of section 5 of switch 20SW1, the amplifier 21RG and the capacitors 22C28, 22C30, 22C32 and 22C34 to the AND circuits 22A4–7. The AND circuits 22A4–7 are enabled under control of the circuits 22ST1–4 so that a count pulse is provided through the leads 22L1–4 in accordance therewith. If, for example, five of the lines in the group were busy during the sampling cycle, a pulse is provided through leads 22L1–3 but not through lead 22L4. The circuits 22ST1–4 are reset by the reset pulse which is provided from the tube 20RNA through the tube 20RSA and the varistors 22V1–4.

The sequence of operations therefor for determining the number of simultaneous busy indications for each scan is similar to that described above for determining the distribution of dial-tone delays except that the input information through the lead G are the busy indications instead of the dial-tone delay indications and the information is read under control of the circuit 1000 instead of under control of the circuit 3700. The sequence of operations for determining the distribution of simultaneous busy indications during each scan is continued automatically as one group of coded signals after another is read until the entire tape 201 has been read and analyzed. Thereafter the time and scan program circuit 1000 initiates the operation of the circuit 2600 to print the accumulated data. The sequence of operations for printing the accumulated data is the same as that for printing the dial-tone delay group analysis data.

When the analysis is on a group basis with the switch 12SW1 set at its position 1, as described above, the coded signals for specific lines or groups of lines may be rejected. In other words, the coded signals for the entire group of 70 lines and trunks may be considered except for five lines or groups of lines. To provide for the rejection of specific coded signals on a time division basis, the switches 12UA–E and 13TA–E are set to identify the rejected lines and trunks instead of at their positions BK. For example, if the coded signals for line 11 are to be rejected the switches 12UA and 13TA are set to their positions 1, and if the information for line 27 is also to be rejected the switch 12UB is set at its position 7 and the switch 13TB is set at its position 2. With the switches 12UA and 13TA set at their positions 1, a pulse is provided through the AND circuit 14A1 to the circuit 14G1. The AND circuit 14A1 is enabled because its terminal 2 is connected through the terminals 3 and 1 of section 5 of the switch 15GI to the junction of resistors 15R4 and 15R5. The resistor 15R4 is grounded and the resistor 15R5 is connected to the positive battery 15B3. As described above, the stepper 12ST is driven by the pulses from the input section 3IN1 through the upper section of the cathode follower 4CF1 and the upper section of the amplifier 12MS. The set pulse is provided to terminal S of the stepper 12ST before the traffic information in tracks 2 and 3 for line 11 is decoded by the diode matrix 5DM. With the AND circuit 14A1 enabled a positive 30-volt pulse is provided to the circuit 14GI. As described above in the description of the individual line analysis, the positive pulse to the circuit 14GI results in a count pulse to leads 14L3 and 14BC. These leads, however, are connected respectively to sections 2 and 3 of the switch 15GI which is set at its group position. With the switch 15GI set at its group position, count pulses do not pass through the section 2 and 3 to the count register circuits 8A and 24B. The left cathode of tube 14GA, however, is connected to terminal 18 of section 5 of the switch 15GI. With the switch 15GI at its group position, the potential from the circuit 14GI is provided through terminals 18 and 16 of section 5 of the switch 15GI, the varistor 15V2 and the lead 15RJ to terminal 3 of the AND circuit 5A1. The change in potential disables the AND circuit 5A1 so that the diode matrix 5DM is disabled when the enabling potential is provided from the multivibrator 4G to terminal 1 of the AND circuit 5A1.

The varistor 15V2 is one of five varistors 15V1–5 which from an OR circuit which is connected to the disabling lead 15RJ. A disabling potential is provided through the circuits 14G1–5 and the OR circuit consisting of the five varistors 15V1–5 under control of the switches 12UA–E and 13TA–E. The varistors 15V1–5 are connected respectively to ground through the resistors 15R7–11.

In this manner coded signals corresponding to specific lines may be rejected.

*Consecutive number of scans of simultaneously busy lines*

As described above, there are three types of group analyses of which two have been described. The third type of group analysis is to determine the distribution of scanning cycles for which a predetermined number of lines are simultaneously busy. The predetermined number is determined by the setting of the switch 20NCTR and the distribution of scans is determined by the setting of the switches 23A–D and 23BSA–D. The setting of the various switches in the automatic data reader is the same as that described above for determining the distribution of busy lines per scanning cycle, except that the switch 20SW1 is set at its "SPAN" positions 2, 6, etc. instead of the "SIM" positions 3, 7, etc. The panel 37DT is set in a similar manner to that described above for the "CCS of group traffic" and also for the "SIM SPAN DXTBN" which is shown in Table B of Fig. 40. Any one of the busy indications may be considered to determine the distribution of the number of scans that predetermined numbers of lines are simultaneously busy. For example, intragroup busy indications may be considered or revertive busy indications may be considered or the sum of the two types of busy indications may be considered. Assume that all busy indications are considered so that the lead 13AB from the translator 300 is connected or patched to the lead G from the circuit 1200. The sequence of operations for providing count pulses to the stepper 23U is the same as that described above for the other two types of group analyses.

The negative pulse from the time and scan program circuit 1000 is utilized to reset the circuits 22ST1–4 and by operating the amplifier 20PS to transfer the accumulated data in the circuits 22ST1–4 to the count register circuit 8A. The difference provided by setting the switch 20SW1 at the "SPAN" position instead of the "SIM" position is that the flip-flop circuit 21RTHR is bistabled for the SPAN position and monostable for the SIM position. As described above, when the switch 20SW1 is set to its SIM position, a capacitor 20C12 is connected between its terminals S1 and 1. With the switch 20SW1 in the SPAN position the capacitor 20C12 does not function to convert the circuit 21RTHR to monostable operation. When the circuit 21RTHR is set, therefore, it remains set until a reset pulse is provided thereto. As described above, the flip-flop circuit 21RTHR is set when the AND circuit 21A2 is enabled by the binary counter consisting of the circuits 21TH1, etc. The setting of the switch 20NCTR determines when the AND circuit 21A2 is enabled. Assume, for example, that the switch 20NCTR is set at its position 5 to provide for the determination of the distribution of scans for which five of the lines in the group are busy. The distribution of the scans is determined, as described above, by the setting of the switches 23A–D and the switches 23BSA–D. Assume, for example, that the switches 23A–D are set at their 0 positions and the switches 23BSA–D are set respectively at positions 3, 4, 5 and 6.

With the switch 20NCTR set at its position 5, when five negative pulses are received through the lead G from the panel 37DT the AND circuit 21A2 is enabled to provide a set pulse to the circuit 21RTHR and a count pulse through the amplifier 21N to the stepper 23U. When the flip-flop circuit 21RTHR is set it disables the diode gate 21DG to inhibit subsequent pulses through lead G for the same scan. In other words once five busy pulses for one scan are counted the rest of the busy pulses for that scan are ignored. When the flip-flop circuit 21RTHR is set it reverse biases the varistor 20V8 to inhibit the transmission of a pulse from the anode of tube 20NRA to the control grid of tube 20RSA and to the amplifier 20C2.

When the control pulse is provided from the multivibrator 10MV in the circuit 1000 at the beginning of the next scan it is coupled through the resistor 21R4, capacitor 21C5 and varistor 21V3 to reset the flip-flop circuit 21RTHR. The control pulse through lead 10L4 is also coupled through the capacitor 20C22, resistor 20R6, terminals 2 and 4 of section 5 of switch 20SW1, tube 20RNA and the amplifier 20RSB to reset the circuits 21TH1, etc. in the binary counter. A control pulse is not provided from tube 20RNA to reset the stepper 23U and any operated ones of the circuits 22ST1–4 because of the reverse bias of the varistor 20V8 by the circuit 21RTHR. The circuit 21RTHR resets after the conduction through the tube 20RNA.

In this manner for each scan that five of the lines in the group are busy, a count pulse is provided to the stepper 23U. The sequence of operations continues with the binary counter and the circuit 21RTHR being reset for each scan and a count pulse being provided to the stepper 23U until the stepper 23U reaches a count of 3. At the count of 3 the stepper 23U provides a set pulse through section 1 of the switch 23BSA to set the flip-flop circuit 23ST1; at the count of 4 the flip-flop circuit 22ST2 is set; at the count of 5 the flip-flop circuit 22ST3 is set; and at the count of 6 the flip-flop circuit 22ST4 is set. In this manner as long as five of the lines in the group are busy during each scan the stepper 23U is set to successively operate the circuits 22ST1–4. The sequence of operations is halted whenever there are less than five busy lines in the group and the information is read from the circuits 22ST1–4 and supplied to the register circuit 8A.

If less than five pulses are provided through the lead G before a control pulse is provided from the circuit 1000, the AND circuit 21A2 remains disabled and the flip-flop circuit 21RTHR remains in its reset condition. With the circuit 21RTHR reset, the control pulse through lead 10L4 resets the binary counter, as described above, and since the varistor 20V8 is not disabled, it also resets the circuits 22ST1–4 and the stepper 23U. The control pulse through the varistor 20V8 is also provided through the tube 20RSA, the amplifier 20PS, terminals 6 and 8 of section 5 of switch 20SW1, the amplifier 21RG and the capacitors 22C28, 22C30, 22C32 and 22C34. As described above, the capacitors 22C28, etc. are connected respectively to the terminals 2 of the AND circuits 22A4–7. The set ones of the circuits 22ST1–4 provide enabling potentials to their associated AND circuits 22A4–7. For example, if the circuits 22ST1–2 are set and the circuits 22ST3–4 are reset the circuits 22A4–5 are enabled and the circuits 22A6–7 are disabled. The control potential from the amplifier 21RG is provided through the enabled ones of the AND circuits 22A4–7 through the leads 21L1–4 and switch 15GI to the count registers 8A and 8B. The connections from the leads 22L–4 to the circuits 8A and 24B are described above. The circuits 22ST1 and 22ST2 are set and the circuits 22ST3 and 22ST4 are reset when only four successive scans are read that have five busy lines. The information is provided to the circuits 8A and 24B if the fifth scan has less than five busy lines.

In this manner the distribution of the number of scans for which a given number of lines is busy is determined. The data information and the heading for the data are printed in the same manner described above for the other types of group analyses.

It is to be understood that the above-described arrangements are illustrative of the application of the principles of this invention. Numerous other arrangements may be devised by those skilled in the art without departing from the spirit and scope of the invention. For example, the number of columns in each table may be increased or decreased, or the number of register circuits may be increased. The system is highly flexible as shown in Figs. 2–37 and the flexibility can of course be even further increased by increasing the number of components and circuits. It is evident therefore that numerous other arrangements may be devised by those skilled in the art without departing from the spirit and scope of the invention.

What is claimed is:

1. An automatic data reader for analyzing data in the form of coded signals recorded on a magnetic tape comprising a signal translator for decoding control potentials corresponding to the recorded signals on said tape, reading means for providing control potentials to said signal translator corresponding to the recorded signals on said tape, a timing circuit controlled by said translator for automatically controlling the duration for accumulating data, a control circuit for selecting some of the decoded signals from said translator, registers controlled by said control circuit for accumulating said selected decoded signals in the form of analog potentials, a program circuit for translating analog signals to binary signals, a selector controlled by said timing circuit for successively connecting said analog potentials from said registers to said program circuit, and a teletypewriter controlled by said program circuit for providing a typewritten message corresponding to said binary signals.

2. An automatic data reader for analyzing data in the form of coded signals recorded on a multitrack magnetic tape comprising a signal translator for decoding control potentials corresponding to the recorded signals on said tape, means for providing to said signal translator control potentials corresponding to the recorded signals on said tape, a programming circuit controlled by said signal translator having manual switches for determining the duration of a data accumulation period, a data analysis and control circuit controlled by said programming circuit and including manual switches for selecting some of said decoded signals from said translator, registers for accumulating said selected decoded signals, output apparatus, and a printing selector controlled by said programming circuit for supplying said accumulated signals to said output apparatus at the end of said accumulation period.

3. An automatic data reader for analyzing serially arranged magnetically recorded coded data comprising means for decording the magnetically recorded coded data and for providing serially arranged decoded signals in accordance therewith, first means for selecting said decoded signals occupying predetermined positions in the serial arrangement of said decoded signals, second means for selecting said decoded signals derived from said coded data having a predetermined coding independent of the position of said data in the serial arrangement of said data, a register circuit, means controlled by said first and said second means and effective upon a coincidence of selection by said first and said second means for providing a count pulse to said register circuit.

4. An automatic data reader in accordance with claim 3 comprising in addition a teletypewriter, and means controlled by said decoding means for periodically providing to said teletypewriter the information registered in said register circuit.

5. An automatic data reader for analyzing data in the form of coded signals recorded on a multitrack magnetic tape comprising a signal translator for decoding control potentials corresponding to the recorded signals on said tape and for providing a serial arrangement of decoded signals, reading means for providing control potentials to said signal translator corresponding to the recorded signals on said tape, a timing circuit controlled by said translator for automatically controlling the duration for accumulating data, a data analysis and control circuit for selecting said decoded signals occupying predetermined positions in said serial arrangement, a patch circuit for selecting said decoded signals based upon said recorded signals having a predetermnied code, registers for accumulating count pulses and for providing analog potentials corresponding to the number of accumulated count pulses, means effective upon the selection of one of said decoded signals from said translator by said data analysis and control circuit and by said patch circuit for supplying a count pulse to said registers, a print program circuit for translating analog signals to binary signals, a printing selector controlled by said timing circuit for successively connecting said analog potentials from said registers to said print program circuit, and a teletypewriter controlled by said print program circuit for providing a typewritten message corresponding to said binary signals.

6. In a system for analyzing groups of successively recorded coded signals, means for successively reading and decoding said coded signals in each of said groups of signals, means controlled by said reading and decoding means for counting the number of coded signals in each of said groups of signals, means controlled by said reading and decoding means for counting the number of said groups of coded signals, first means for selecting said coded signals occupying predetermined time positions in each of said groups of coded signals, second means for selecting said decoded signals based upon said coded signals having a predetermined code, means jointly controlled by said first selecting means and by said second selecting means for counting the number of simultaneous selections by said first and said second means, an output device, and means controlled by said group counting means and effective when a predetermined number of said groups is counted for supplying the accumulated information in said simultaneous selection counting means to said output device.

7. An automatic data reader for analyzing groups of recorded representations of coded signals which correspond to a group of devices comprising means for successively reading said recorded representations so that each occupies an individual time position, means controlled by said reading means for counting the number of recorded representations in each of said groups and the number of groups of recorded representations, means for inhibiting the reading of said recorded representations occupying predetermnied ones of said time positions in each of said groups, means controlled by said reading means for selecting some of said recorded representations independent of the time positions occupied thereby, means controlled by said inhibiting and said selecting means for registering the number of said selected recorded representations in each of said groups which are not inhibited, and means controlled by said counting means for periodically supplying an output indication corresponding to the registration of said register means.

8. An automatic traffic analyzer for reading and analyzing traffic information recorded on a magnetic tape comprising means for reading the traffic information recorded on said magnetic tape and for successively providing groups of coded signals in accordance therewith, means for recognizing predetermined ones of said coded signals, means controlled by said recognizing means for determining the number of successive groups of said coded signals which have more than a predetermined number of said predetermined coded signals, and means for registering said determined number of successive groups.

9. An automatic data reader for analyzing magnetically recorded data relating to a group of lines where the data for each line is indicated by any one of a number of coded indicia comprising means for reading the magnetically recorded data, means controlled by said reading means for sorting said data in accordance with the various coded indicia, means controlled by said sorting means for selecting said data, indicated by a predetermined one of said number of coded indicia, means controlled by said reading means for selecting said data corresponding to predetermined ones of said lines, means effective upon a concurrence of selection by said coded indicia selecting means and by said line selecting means for registering an indiciation thereof, and means controlled by said reading means for periodically printing the data registered in said register means.

10. An automatic data analyzer comprising in combination a magnetic tape having successive entries arranged in groups recorded thereon, each entry being a coded indicia associated with one of a group of lines, means for reading said entries successively, means controlled by said reading means for counting the number of said entries in each group and for counting the number of said groups of entries, means controlled by said reading means for recognizing only a predetermined coded indicia, means controlled by said recognizing means for counting the number of said recognized coded indicia of each of said groups of entries, means controlled by said coded indicia counting means for determining the distribution of the number of said recognized coded indicia in each of said groups of entries, means controlled by said determining means for registering said determined distributions, and means controlled by said entry counting means for periodically printing the accumulated distributions registered in said registering means.

11. An automatic data analyzer in accordance with claim 10 comprising in addition means controlled by said entry counting means for inhibiting the recognition of coded indicia associated with predetermined lines.

12. An automatic data reader for analyzing data in the form of successively recorded coded indicia some of which are associated individually with a plurality of lines comprising in combination means for successively reading said recorded indicia, first means controlled by said reading means and settable for selecting some of said indicia, second means controlled by said first selecting means and settable for selecting some of said selected indicia, means controlled by said second means for counting the number of said indicia selected by said second means, means settable for inhibiting said second means from selecting indicia associated with predetermined ones of said lines, and means controlled by said counting means for registering said number of selected indicia by said second means.

13. An automatic data reader for analyzing data in the form of successively recorded coded indicia some of which are individually associated with a plurality of lines comprising in combination means for successively reading the recorded indicia, first means controlled by said reading means and settable for selecting some of said indicia, second means controlled by said first selecting means and settable for selecting some of said selected indicia, means controlled by said second means for counting the number of said indicia selected by said second means, means controlled by said reading means for counting the number of said recorded indicia, means controlled by said indicia counting means for inhibiting the operation of said second means when said indicia associated with preselected ones of said lines are read, means controlled by said selected indicia counting means for providing analog potentials corresponding to the numbers of selected indicia, and means effective when said recorded indicia counting means counts to a predetermined number for converting said analog potentials to a typewritten message.

14. An automatic data reader for analyzing data in the form of a number of coded signals each representative of a time division recorded on a magnetic tape comprising a signal translator for decoding control potentials corresponding to the recorded signals on said tape, reading means for providing control potentials to said signal translator corresponding to the recorded signals on said tape, a timing circuit controlled by said translator for automatically controlling the duration for accumulating data, a control circuit for selecting said decoded signals from said translator representative of predetermined time divisions and predetermined codes, registers controlled by said control circuit for accumulating said selected decoded signals in the form of analog potentials, a program circuit for translating analog signals to binary signals, a selector controlled by said timing circuit for successively connecting said analog potentials from said registers to said program circuit, and a teletypewriter controlled by said program circuit for providing a typewritten message corresponding to said binary signals.

15. An automatic data reader for analyzing data in the form of coded signals recorded on a magnetic tape comprising a signal translator for decoding control potentials corresponding to the recorded signals on said tape, means for providing to said signal translator control potentials corresponding to the recorded signals on said tape, means controlled by said providing means for counting said recorded signals, a programming circuit controlled by said counting means having manual switches for determining the duration of a data accumulation period, a control circuit controlled by said programming circuit and including manual switches for selecting some of said decoded signals from said translator, registers for accumulating said selected decoded signals, output apparatus, and a printing selector controlled by said programming circuit for supplying said accumulated signals to said output apparatus at the end of said accumulation period.

16. An automatic data reader for analyzing data in the form of successively recorded indicia on a magnetic tape comprising a magnetic tape having recorded thereon a plurality of successive lines of coded signals arranged in groups wherein each line represents the traffic condition of one of a group of lines at a particular time and each group of signals represents the traffic conditions of the group of lines during a particular sampling interval, means for successively reading the recorded indicia, means controlled by said reading means for counting the number of lines in each group of lines, means controlled by said reading means for counting the number of groups of lines on said tape, means controlled by said reading means for selecting indicia representing predetermined traffic conditions, means controlled by said selecting means and said group counting means for determining the number of successive groups of lines in which more than a predetermined number of said indicia indicate said predetermined traffic conditions, and means controlled by said determining means for registering said determined number.

17. An automatic data reader for analyzing data in the form of coded signals each representative of a time division comprising means for decoding the coded signals, first means for selecting said decoded signals representative of predetermined time divisions, second means for selecting said decoded signals indicating a predetermined coding, and means controlled by said first and said second means for registering an indication of a simultaneous selection of said decoded signals by said first and said second means.

18. An automatic data reader in accordance with claim 17 comprising in addition means controlled by said decoding means for automatically controlling the duration for registering indications by said register means, means for providing a printed message corresponding to said register indication, and means controlled by said duration controlling means for supplying said indication from said register means to said providing means.

19. An automatic data analyzer comprising in combination a magnetic tape having successively recorded indicia arranged in groups, each indicia being a coded representation of the traffic condition of one of a group of lines at a particular time, means for reading said indicia successively, means controlled by said reading means for counting the number of said indicia in each group and for counting the number of said groups of indicia, means controlled by said reading means for selecting indicia representing a predetermined traffic condition, means controlled by said selecting means for counting the number of said selected indicia in each of said groups of indicia, means controlled by said recorded indicia counting means for inhibiting the operation of said selecting means for indicia representative of preselected ones of said lines, means controlled by said selecting means for registering an indication of the number of said selected indicia, and means controlled by said recorded indicia counting means for periodically providing a printed record of the accumulated registered indication in said registering means.

20. In a system for analyzing groups of successively recorded coded signals which relate to a group of apparatus where the coded signals are successively recorded during discrete intervals of time, means for successively reading and decoding said coded signals, means controlled by said reading and decoding means for counting the number of coded signals in each of said groups of signals, means controlled by said reading and decoding means for counting the number of said groups of coded signals, first means for selecting said coded signals in each of said groups of signals recorded during predetermined ones of said intervals, second means for selecting decoded signals having a predetermined coding, means jointly controlled by said first selecting means and by said second selecting means for counting the number of simultaneous selections by said first and said second means, means jointly controlled by said simultaneous counting means and by said group counting means for counting the first of said simultaneous selections in each group of simultaneous selections where the group of simultaneous selections includes only simultaneous selections relating to a particular one of said apparatus and the selections occur in successive groups of coded signals, an output device, and means controlled by said group counting means and effective when a predetermined number of said groups is counted for supplying the accumulated information in said first and said second-mentioned simultaneous selection counting means to said output device.

21. An automatic data reader for analyzing data in the form of successively recorded indicia representing the traffic conditions of a plurality of lines comprising in combination means for successively reading the recorded indicia, first means controlled by said reading means and settable for selecting predetermined ones of said indicia, second means controlled by said first selecting means and settable for recognizing predetermined ones of said selected indicia, means controlled by said second means for counting the number of said recognized selected indicia, means for counting said selected indicia, and means for registering the information counted by said recognized indicia counting means and by said selected indicia counting means.

22. An automatic data reader for analyzing data in the form of successively recorded indicia on a magnetic tape having recorded thereon a plurality of successive lines of coded signals arranged in groups wherein each line represents the traffic condition of one of a group of circuits at a particular time and each group of signals represents the traffic conditions of a group of circuits during a particular sampling interval comprising reading means for providing control potentials corresponding to said recorded indicia, timing means controlled by some of said control potentials provided by said reading means for controlling the duration for accumulating data, first means for sorting said control signals in accordance with their time positions as read by said reading means, and means controlled by said sorting means for counting said control signals corresponding to predetermined ones of said circuits.

23. An automatic data reader for analyzing data in the form of successively recorded indicia on a magnetic tape having recorded thereon a plurality of successive lines of coded signals arranged in groups wherein each line represents the traffic condition of one of a group of circuits at a particular time and each group of signals represents the traffic conditions of a group of circuits during a particular sampling interval comprising reading means for providing control potentials corresponding to said recorded indicia, timing means controlled by some of said control potentials provided by said reading means for controlling the duration for accumulating data, first means for sorting said coded signals in accordance with their time positions as read by said reading means, means for decoding said coded signals whereby the traffic conditions indicated thereby may be determined, and means for sorting said decoded coded signals.

24. An automatic data reader for analyzing data in the form of successively recorded indicia on a magnetic tape having recorded thereon a plurality of successive lines of coded signals arranged in groups wherein each line represents the traffic condition of one of a group of circuits at a particular time and each group of signals represents the traffic conditions of a group of circuits during a particular sampling interval comprising reading means for providing control potentials corresponding to said recorded indicia, timing means controlled by some of said control potentials provided by said reading means for controlling the duration for accumulating data, first means for sorting said coded signals in accordance with their time positions as read by said reading means, means for decoding said coded signals to determine the traffic conditions indicated thereby, second means for sorting said decoded coded signals, and means controlled jointly by said first and said second-mentioned sorting means for counting some of said decoded signals corresponding to predetermined ones of said circuits.

25. An automatic data reader for analyzing data in the form of coded signals recorded on a magnetic tape comprising a signal translator for decoding control potentials corresponding to the recorded signals on said tape, reading means for providing control potentials to said signal translator corresponding to the recorded signals on said tape, a timing circuit controlled by said translator for automatically controlling the duration for accumulating data, a control circuit for selecting some of the decoded signals from said translator, registers controlled by said control circuit for accumulating said selected coded signals, and means controlled by said timing circuit for printing a message corresponding to said accumulated coded signals.

No references cited.